United States Patent
Wells et al.

(10) Patent No.: US 9,910,524 B1
(45) Date of Patent: Mar. 6, 2018

(54) DEVICES AND METHODS FOR PROCESSING AND DISAMBIGUATING TOUCH INPUTS USING INTENSITY THRESHOLDS BASED ON PRIOR INPUT INTENSITY

(71) Applicant: Apple Inc., Cupertino, CA (US)

(72) Inventors: Nicole M. Wells, San Francisco, CA (US); Leah M. Gum, San Francisco, CA (US); Kenneth L. Kocienda, San Jose, CA (US); Camille Moussette, Los Gatos, CA (US); Jean-Pierre M. Mouilleseaux, San Francisco, CA (US); Joshua B. Kopin, Berkeley, CA (US); Jules K. Fennis, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/270,789

(22) Filed: Sep. 20, 2016

Related U.S. Application Data

(60) Provisional application No. 62/384,053, filed on Sep. 6, 2016.

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G06F 3/0485* (2013.01);
(Continued)

(58) Field of Classification Search
CPC . G06F 3/00; G06F 3/041; G06F 3/044; G06F 3/0482; G06F 3/0354; G06F 3/016;
(Continued)

(56) References Cited

U.S. PATENT DOCUMENTS

| 2006/0132455 A1 | 6/2006 | Rimas-Ribikauskas et al. |
| 2006/0132456 A1 | 6/2006 | Anson |

(Continued)

FOREIGN PATENT DOCUMENTS

| AU | 2016100293 A4 | 4/2016 |
| AU | 2016100292 A4 | 5/2016 |

(Continued)

OTHER PUBLICATIONS

Office Action (Search Report), dated Dec. 19, 2016, received in Danish Patent Application No. 2016-70722, which corresponds with U.S. Appl. No. 15/270,789.

(Continued)

*Primary Examiner* — Ilana Spar
*Assistant Examiner* — Nguyen H Truong
(74) *Attorney, Agent, or Firm* — Morgan, Lewis & Bockius LLP

(57) ABSTRACT

An electronic device detects a change in intensity of an input on an input element that includes detecting an increase in intensity followed by a decrease in intensity, and recognizes at least a portion of the change in intensity of the input as a first input event that is associated with a first operation, for example a single click operation. After recognizing the first input event, the device delays performance of the first operation while monitoring subsequent changes in intensity of the input for a second input event, wherein the delay is limited by a default delay time period. If the second event is recognized before default delay time period has elapsed, a second operation is performed and the first operation is not performed. However, if early-confirmation criteria for the first input event are met before the default delay period elapses, the first operation is performed.

51 Claims, 66 Drawing Sheets

(51) Int. Cl.
*G06F 3/0481* (2013.01)
*G06F 3/0485* (2013.01)
*G06F 3/0488* (2013.01)

(52) U.S. Cl.
CPC ...... *G06F 3/04817* (2013.01); *G06F 3/04883* (2013.01); *G06F 2203/04101* (2013.01); *G06F 2203/04104* (2013.01); *G06F 2203/04105* (2013.01)

(58) Field of Classification Search
CPC .......... G06F 3/02; G06F 3/033; G06F 3/0481; G06F 3/0484; G06F 3/0346; G06F 3/0487; G06F 3/048
See application file for complete search history.

(56) References Cited

U.S. PATENT DOCUMENTS

| | | |
|---|---|---|
| 2007/0291009 A1 | 12/2007 | Wright et al. |
| 2008/0048997 A1 | 2/2008 | Gillespie et al. |
| 2010/0161833 A1* | 6/2010 | Blewett ............... G06F 9/4446 710/6 |
| 2011/0050608 A1 | 3/2011 | Homma et al. |
| 2012/0105367 A1 | 5/2012 | Son et al. |
| 2013/0089066 A1* | 4/2013 | Murakami ......... G07C 9/00309 370/330 |
| 2013/0328803 A1* | 12/2013 | Fukushima ........... G06F 3/0414 345/173 |
| 2014/0028554 A1* | 1/2014 | De Los Reyes .... G06F 3/04883 345/158 |
| 2015/0084874 A1 | 3/2015 | Cheng et al. |
| 2015/0193140 A1* | 7/2015 | Zhang ................ G06F 3/04883 715/863 |
| 2015/0205384 A1 | 7/2015 | Osterhout et al. |
| 2016/0307189 A1* | 10/2016 | Zarakas ............... G06Q 20/352 |
| 2017/0060298 A1* | 3/2017 | Hwang ................ A61B 5/6807 |

FOREIGN PATENT DOCUMENTS

| | | |
|---|---|---|
| AU | 2016101201 A4 | 8/2016 |
| EP | 2 375 307 A1 | 10/2011 |

OTHER PUBLICATIONS

Office Action, dated Jul. 6, 2017, received in Danish Patent Application No. 2016-70722, which corresponds with U.S. Appl. No. 15/270,789, 4 pages.

Office Action, dated Oct. 12, 2017, received in Australian Patent Application No. 2017100980, which corresponds with U.S. Appl. No. 15/270,789, 6 pages.

Office Action, dated Oct. 18, 2017, received in Australian Patent Application No. 2017100980, which corresponds with U.S. Appl. No. 15/270,789, 4 pages.

Office Action, dated Nov. 3, 2017, received in Danish Patent Application No. 2016-70722, which corresponds with U.S. Appl. No. 15/270,789, 2 pages.

Office Action, dated Nov. 16, 2017, received in Danish Patent Application No. 2016-70722, which corresponds with U.S. Appl. No. 15/270,789, 2 pages.

International Search Report and Written Opinion, dated Dec. 1, 2017, received in International Patent Application No. PCT/US2017/041758, which corresponds with U.S. Appl. No. 15/270,789, 15 pages.

Innovation Patent, dated Aug. 3, 2017, received in Australian Patent Application No. 2017100980, which corresponds with U.S. Appl. No. 15/270,789, 4 pages.

\* cited by examiner

A method, performed at an electronic device with a display and an intensity sensitive input element for detecting intensity of user inputs with the input element: 600

602 Detect a first increase in intensity of an input on the input element that meets a down-click detection criteria 604 The input on the input element comprises an input on a touch-sensitive surface 606 For the first increase in intensity, the down-click detection criteria require that the intensity of the input increase above a first down-click intensity threshold in order for the down-click detection criteria to be met 608 After detecting the first increase in intensity of the input on the input element, detect a first decrease in intensity of the contact 610 In response to detecting the first decrease in intensity of the input:

612 Determine whether the first decrease in intensity of the input meets up-click detection criteria, wherein: for the first decrease in intensity, the up-click detection criteria require that the intensity of the input decrease below a first up-click intensity threshold in order for the up-click detection criteria to be met, and the first up-click intensity threshold is selected based on the intensity of the input during the first increase in intensity of the contact that was detected prior to detecting the first decrease in intensity of the input 632, 634, 636, 638, 640 (Figure 6C) (C)

(A)

614 After determining that the first decrease in intensity of the input meets the up-click detection criteria, detect a second increase in intensity of the input (B)

632 The first up-click intensity threshold is time varying, in accordance with a low pass filtering of the detected intensity of the input during the first decrease in intensity of the contact 634 The up-click intensity threshold is determined in accordance with a multiplier, having a value greater than zero and less than one, applied to a characteristic intensity of the input 636 The multiplier changes in accordance with the characteristic intensity of the input 638 The multiplier smoothly varies from a predefined maximum value to a predefined minimum value as the characteristic intensity of the input varies between a first intensity value and a second intensity value, wherein the first intensity value is less than the second intensity value 640 The first up-click intensity threshold is the greater of a predefined minimum up-click intensity threshold and a value determined in accordance with a multiplier, having a value greater than zero and less than one, applied to a characteristic intensity of the input.

642 A ratio of the up-click intensity threshold to an intensity value that represents the intensity of the contact changes based on the intensity value that represents the intensity of the contact such that:
when the up-click intensity is based on a first intensity value that represents the intensity of the contact, the ratio of the up-click intensity threshold to the first intensity value has a first value; and
when the up-click intensity is based on a second intensity value that represents the intensity of the contact that is greater than the first intensity value, the ratio of the up-click intensity threshold to the second intensity value has a second value that is different from the first value

---

644 The magnitude of the up-click intensity threshold is set by multiplying the intensity value that represents the intensity of the contact by an adjustment value that is determined based at least in part based on the magnitude of the intensity value that represents the intensity of the contact

---

646 The ratio of the up-click intensity threshold to an intensity value that represents the intensity of the contact changes in accordance with the maximum characteristic intensity of the input.

---

648 The ratio of the up-click intensity threshold to an intensity value that represents the intensity of the contact varies smoothly from a predefined maximum value to a predefined minimum value as the intensity value that represents the intensity of the contact varies between the first intensity value and the second intensity value, wherein the first intensity value is less than the second intensity value.

---

649 The up-click intensity threshold is no less than a predefined minimum up-click intensity threshold

662 After detecting the second increase in intensity of the input on the input element, detecting a second decrease in intensity of the contact;

in response to detecting the second decrease in intensity of the input:

in accordance with a determination that the second decrease in intensity of the input meets the up-click detection criteria, provide third feedback indicating that the second decrease in intensity was recognized as an up-click input, wherein:

for the second decrease in intensity, the up-click detection criteria require that the intensity of the input decrease below a second up-click intensity threshold in order for the up-click detection criteria to be met; and the second up-click intensity threshold is selected based on the intensity of the input during the second increase in intensity of the contact; and in accordance with a determination that the second decrease in intensity of the input does not meet the up-click detection criteria, forgo providing the third feedback

Figure 6F

A method, performed at an electronic device with a display and an intensity sensitive input element for detecting intensity of user inputs with the input element: 700

702 Detect a change in intensity of an input on the input element that includes an increase in intensity of the input on the input element followed by a decrease in intensity of the input on the input element > 704 The input on the input element comprises an input on a touch-sensitive surface > 706 Detecting a change in intensity of the input on the input element includes continuously detecting the input on the input element 708 Recognize at least a portion of the change in intensity of the input as a first input event that is associated with a first operation 710 After recognizing the first input event, delay performance of the first operation while monitoring subsequent changes in intensity of the input for a second input event, wherein the delay is limited by a default delay time period 712 After delaying performance of the first operation:

> 714 In accordance with a determination that the second input event has been recognized before the default delay time period has elapsed, perform a second operation and forgo performance of the first operation > 716 In accordance with a determination that early-confirmation criteria for the first input event have been met before the default delay time period has elapsed without the second input event being recognized, perform the first operation before the default delay time period has elapsed
>
> (A)

> 718 In accordance with a determination that the default delay time period has elapsed without the early-confirmation criteria for the first input event being met and without the second input event being recognized, perform the first operation once the default delay time period has elapsed (B)

720 The early-confirmation criteria for the first input event comprise criteria that the intensity of the input remains below a confirmation intensity threshold for more than an early confirmation time threshold (D)

732 Determine the confirmation intensity threshold in accordance with a peak characteristic intensity of the input detected during the detected increase in intensity of the input, prior to detecting the decrease in intensity of the input on the input element 734 The confirmation intensity threshold is independent of a peak characteristic intensity of the input detected during the detected increase in intensity of the input 736 Monitor a duration of a default timeout period starting when the first input event is recognized 738 Monitor a duration of a default timeout period starting when the intensity of the input decreases to an up-click intensity threshold 712 After delaying performance of the first operation:

(B)

739 In accordance with a determination that a second input event has been recognized after the default delay time period has elapsed, performing a third operation 740 In accordance with a determination that the first input event meets long press input criteria before the second input event has been recognized, performing a third operation and forgoing performance of the first operation

Figure 7C

A method, performed at an electronic device with a display and an intensity sensitive input element for detecting intensity of user inputs with the input element: 800

802 Detect an input sequence that includes detecting an increase in intensity of an input that corresponds to a first input event 804 The input on the input element comprises an input on a touch-sensitive surface 806 In response to detecting the input sequence:

808 In accordance with a determination that a second input event, including a decrease in intensity of the input after the first input event, is detected within a first time period after the first input event is detected, perform a first operation 809 In accordance with a determination that the second input event is not detected within a second time period that is longer than the first time period and that the input had a characteristic intensity above a respective intensity threshold between when the first input event was detected and when the second time period elapsed, perform a second operation once the second time period has elapsed, wherein the second time period is determined based at least in part on an intensity of the input after the first input event is detected 810 In accordance with a determination that the second input event is not detected within a third time period that is longer than the second time period and that the input did not have a characteristic intensity above the respective intensity threshold between when the first input event was detected and when the second time period elapsed, perform the second operation once the third time period has elapsed 812 In accordance with a determination that the second input event is not detected within the second time period and that the input did not have a characteristic intensity above the respective intensity threshold between when the first input event was detected and when the second time period elapsed, forgo performance of the second operation until at least the third time period has elapsed

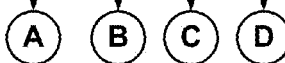

Figure 8A

DEVICES AND METHODS FOR PROCESSING AND DISAMBIGUATING TOUCH INPUTS USING INTENSITY THRESHOLDS BASED ON PRIOR INPUT INTENSITY

RELATED APPLICATION

This application claims priority to U.S. Provisional Application Ser. No. 62/384,053, filed Sep. 6, 2016, which is incorporated by reference herein in its entirety.

TECHNICAL FIELD

This relates generally to electronic devices with one or more intensity sensitive input elements, including but not limited to electronic devices with touch-sensitive displays and optionally other input elements to detect intensity of contacts on touch-sensitive surfaces.

BACKGROUND

The use of intensity sensitive input elements, including but not limited to touch-sensitive surfaces, as input devices for computers and other electronic computing devices has increased significantly in recent years. Exemplary intensity sensitive input elements include buttons that include a contact intensity sensor, and touchpads and touch-screen displays that include contact intensity sensors. Touch inputs on such surfaces are used to manipulate user interfaces and user interface objects on a display.

Exemplary user interface objects include digital images, video, text, icons, control elements such as buttons and other graphics. Exemplary manipulations include adjusting the position and/or size of one or more user interface objects or activating buttons or opening files/applications represented by user interface objects, scrolling or changing user interfaces within an application or otherwise manipulating user interfaces. Certain manipulations of user interface objects or user interfaces are associated with certain types of touch inputs, which are referred to as gestures.

Conventional methods and interfaces for processing touch inputs are inefficient in disambiguating certain touch inputs to determine intended gestures and intended manipulations of user interface objects. Thus, it would be desirable to have a framework for improved processing and disambiguation of touch inputs.

SUMMARY

Accordingly, there is a need for electronic devices with faster, more efficient methods and interfaces for processing and disambiguating touch inputs. Such methods and interfaces optionally complement or replace conventional methods for processing and disambiguating touch inputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method, which is performed at an electronic device with a display and an intensity sensitive input element (e.g., a hardware button, a touch-sensitive surface, or a region of a device that is associated with one or more intensity sensors) for detecting intensity of user inputs with the input element, includes detecting a first increase in intensity of an input on the input element that meets a down-click detection criteria, and after detecting the first increase in intensity of the input on the input element, detecting a first decrease in intensity of the contact. The method further includes determining whether the first decrease in intensity of the input meets up-click detection criteria, wherein: for the first decrease in intensity, the up-click detection criteria require that the intensity of the input decrease below a first up-click intensity threshold in order for the up-click detection criteria to be met, and the first up-click intensity threshold is selected based on the intensity of the input during the increase in intensity of the contact that was detected prior to detecting the first decrease in intensity of the input. The method also includes, in accordance with a determination that the first decrease in intensity of the input meets up-click detection criteria, providing first feedback indicating that the first decrease in intensity of the input was recognized as an up-click input, and in accordance with a determination that the decrease in intensity of the input does not meet the up-click detection criteria, forgoing providing the first feedback.

In accordance with some embodiments, a method, which is performed at an electronic device with a display and an intensity sensitive input element (e.g., a hardware button, a touch-sensitive surface, or a region of a device that is associated with one or more intensity sensors) for detecting intensity of user inputs with the input element, includes detecting a change in intensity of an input on the input element that includes an increase in intensity of the input on the input element followed by a decrease in intensity of the input on the input element; recognizing at least a portion of the change in intensity of the input as a first input event that is associated with a first operation; and after recognizing the first input event, delaying performance of the first operation while monitoring subsequent changes in intensity of the input for a second input event, wherein the delay is limited by a default delay time period. The method further includes, after delaying performance of the first operation: in accordance with a determination that the second input event has been recognized before the default delay time period has elapsed, performing a second operation and forgoing performance of the first operation; in accordance with a determination that early-confirmation criteria for the first input event have been met before the default delay time period has elapsed without the second input event being recognized, performing the first operation before the default delay time period has elapsed; and in accordance with a determination that the default delay time period has elapsed without the early-confirmation criteria for the first input event being met and without the second input event being recognized, performing the first operation once the default delay time period has elapsed.

In accordance with some embodiments, a method, which is performed at an electronic device with a display and an intensity sensitive input element (e.g., a hardware button, a touch-sensitive surface, or a region of a device that is associated with one or more intensity sensors) for detecting intensity of user inputs with the input element, includes detecting an input sequence that includes an increase in intensity of an input that corresponds to a first input event. The method further includes, in response to detecting the input sequence: in accordance with a determination that a second input event, including a decrease in intensity of the input after the first input event, is detected within a first time period after the first input event is detected, performing a first operation. The method further includes, in accordance with a determination that the second input event is not detected within a second time period that is longer than the first time period and that the input had a characteristic intensity above a respective intensity threshold between when the first input event was detected and when the second time period elapsed, performing a second operation once the second time period has elapsed, wherein the second time period is determined based at least in part on an intensity of the input after the first input event is detected. The method further includes, in accordance with a determination that the second input event is not detected within a third time period that is longer than the second time period and that the input did not have a characteristic intensity above the respective intensity threshold between when the first input event was detected and when the second time period elapsed, performing the second operation once the third time period has elapsed.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein.

In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, one or more touch-sensitive surfaces and one or more sensors to detect intensity of contacts with the touch-sensitive surface are provided with faster, more efficient methods and interfaces for processing and disambiguating touch inputs, thereby increasing the effectiveness, efficiency, and user satisfaction with such devices. Such methods and interfaces may complement or replace conventional methods for processing and disambiguating touch inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams illustrating a method of processing and disambiguating touch inputs in accordance with some embodiments.

FIGS. 7A-7E are flow diagrams illustrating a method of processing and disambiguating touch inputs in accordance with some embodiments.

FIGS. 8A-8C are flow diagrams illustrating a method of processing and disambiguating touch inputs in accordance with some embodiments.

DESCRIPTION OF EMBODIMENTS

In electronic devices that display graphical user interfaces and have an intensity sensitive input element, it is challenging to both accurately and quickly detect and distinguish between multiple distinct gestures, such as a deep press gesture, a long press gesture, a single click gesture, a double click gesture, and possible a triple click gesture. Such gestures involve an input having time varying intensity. Distinguishing between such gestures requires analysis of both the intensity of an input on the input element, as well as analysis of timing aspects or features of the input. Furthermore, some users have a "heavier touch" than others, putting more pressure, on average, than other users. Similarly, some users enter gestures at higher speed than other users. Despite these different patters or styles of user inputs, the electronic device needs to accurately discern user intent, and must do so with low latency, so that the operations the user is requesting or commanding occur quickly in response to the user's touch inputs. In some embodiments, to achieve such accuracy and touch input processing performance, one or more intensity thresholds, used for detecting a gesture or portions of a gesture, vary in accordance with the intensity of the user's input during one or more preceding portions of the gesture. Furthermore, in some embodiments, to achieve such accuracy and touch input processing performance, one or more time periods used in the analysis of a touch input varies in accordance with the intensity of the touch input, thereby enabling faster recognition of certain gestures when predefined criteria are satisfied.

In another aspect, haptic feedback, also called tactile outputs, can be used to facilitate user input, confirm the recognition of various user inputs, and alert the user to the occurrence of various events, various input conditions, and the like. As the number and complexity of haptic feedback events in a device increases, it becomes important to ensure that specific tactile outputs be consistently generated, even when the detection criteria for triggering those tactile outputs vary (e.g., the detection criteria for triggering a long press tactile output may differ from one application to another, or from one context in an application to another context in the same application).

Figure 3:
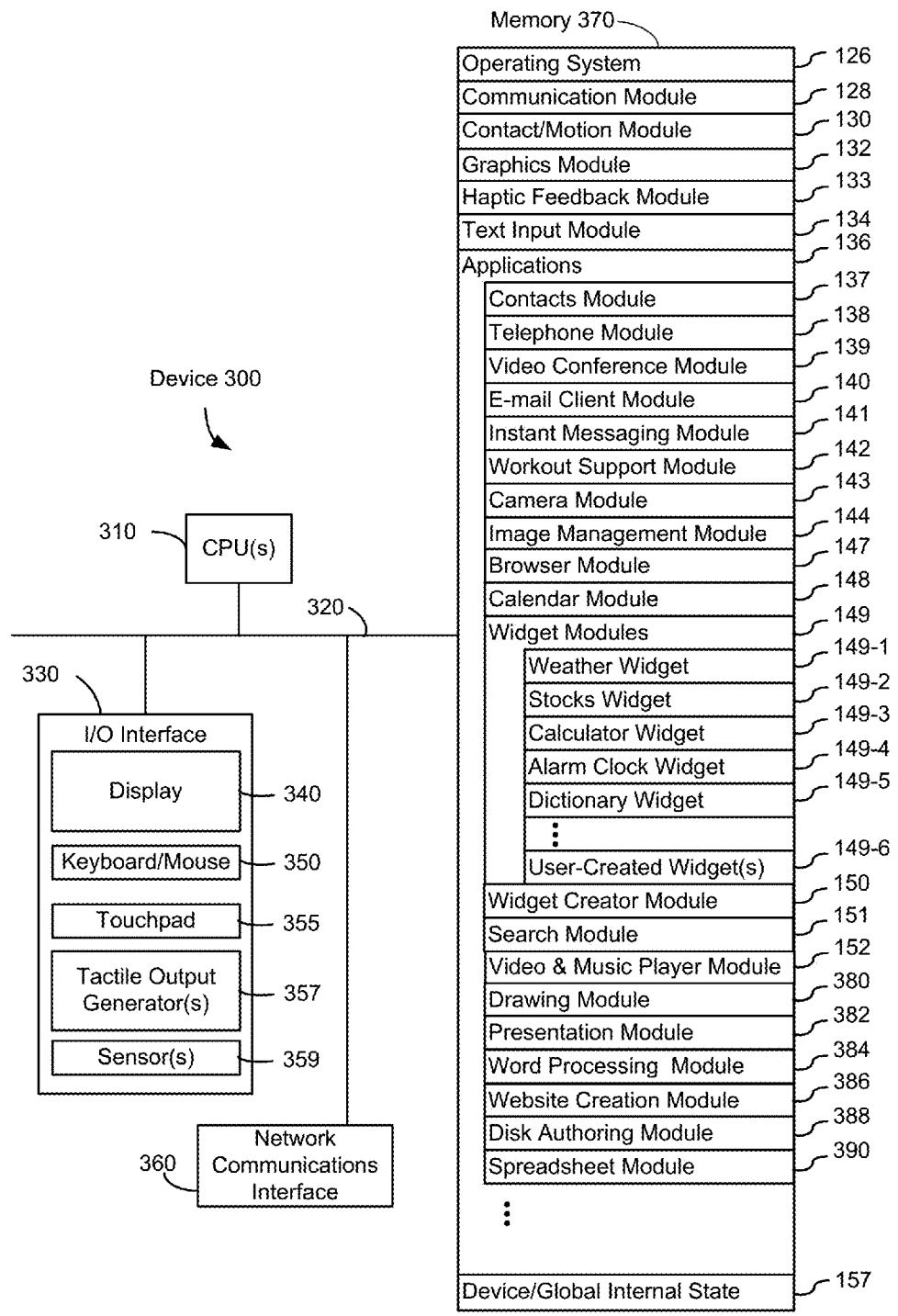
FIG. 3 is a block diagram of an example multifunction device with a display and a touch-sensitive surface in accordance with some embodiments.
Figure 4A:
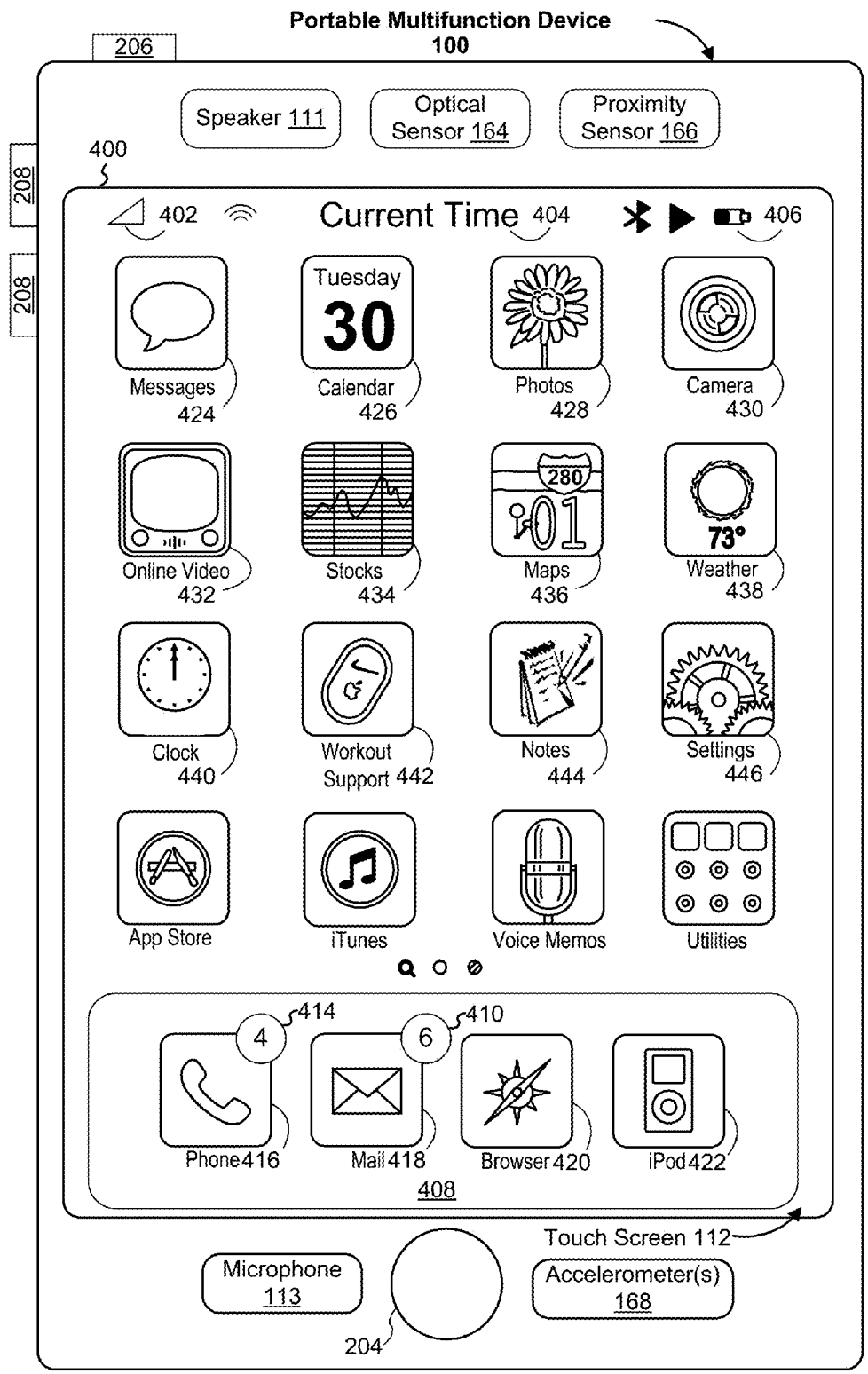
FIG. 4A illustrates an example user interface for a menu of applications on a portable multifunction device in accordance with some embodiments.
Figure 4B:
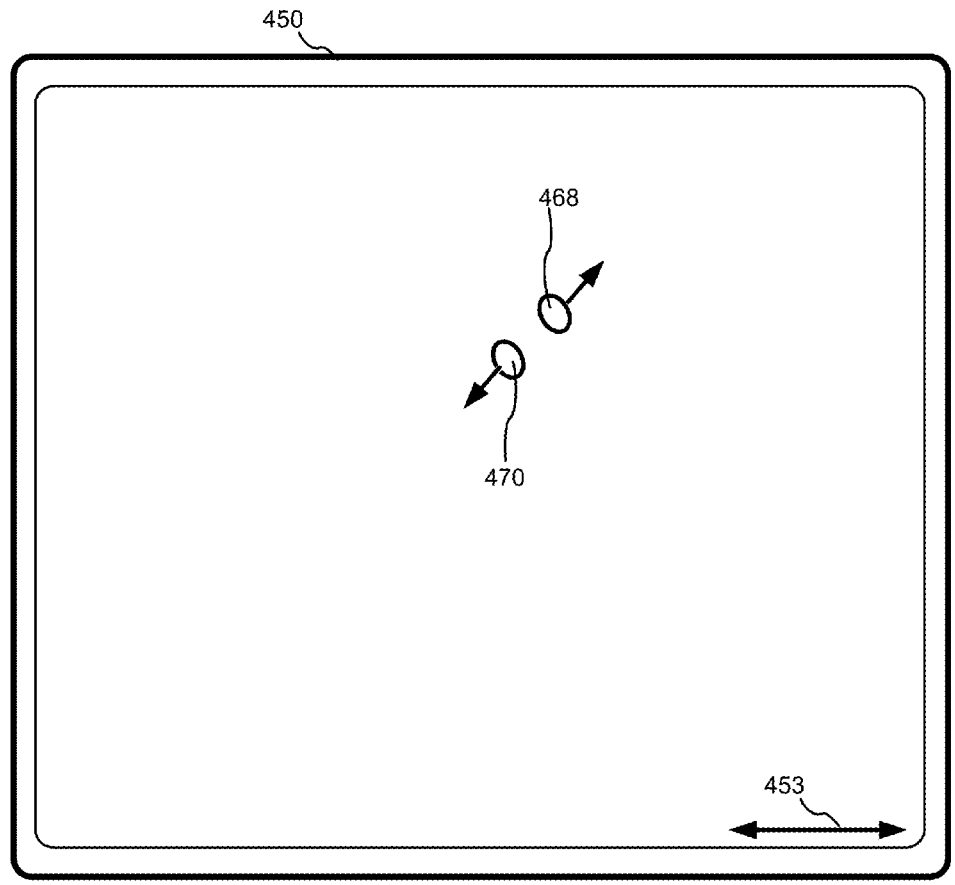
FIG. 4B illustrates an example user interface for a multifunction device with a touch-sensitive surface that is separate from the display in accordance with some embodiments.
Figure 4B:
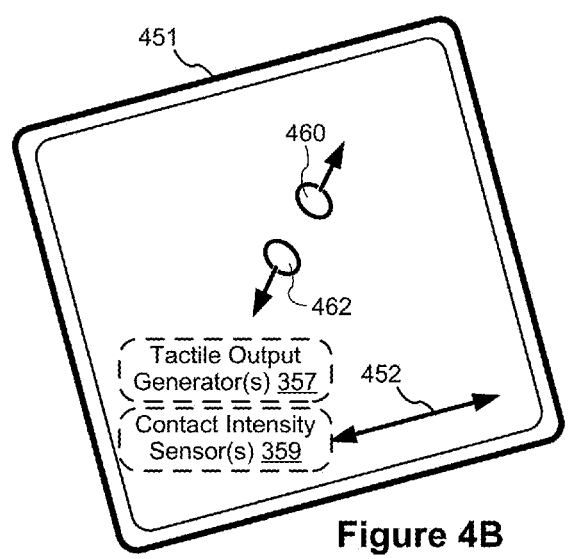
Figure 5A:
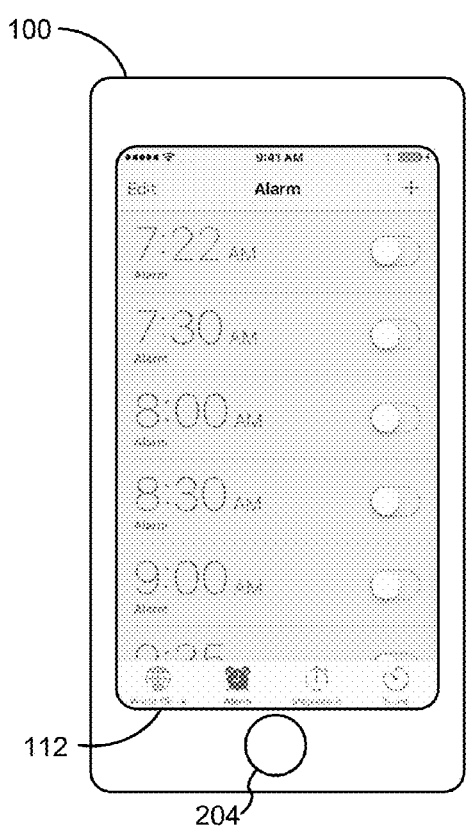
FIGS. 5A-5II illustrate example user interfaces and a variety of timeout periods and intensity thresholds used for detecting gestures in accordance with some embodiments.
Figure 5A:
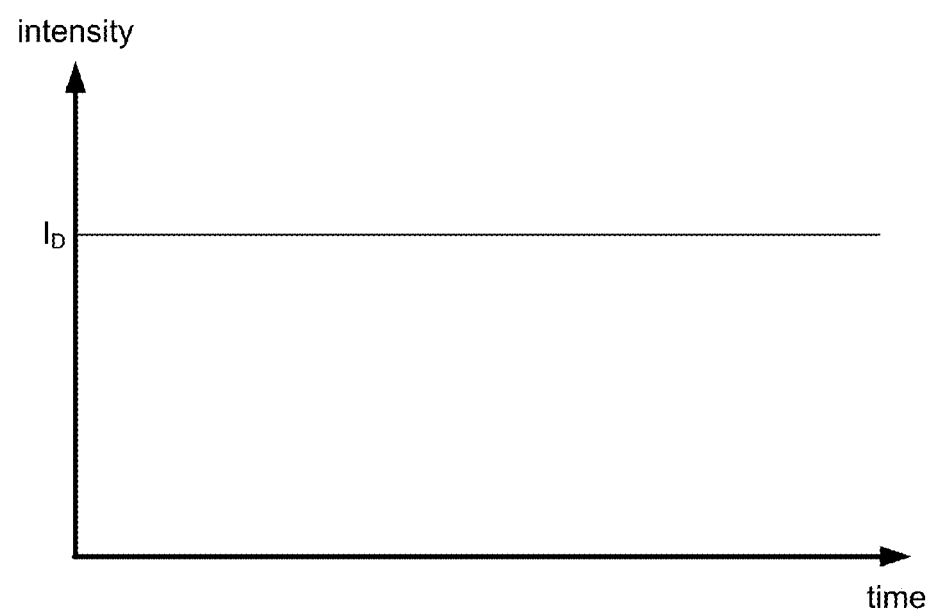
Figure 5B:
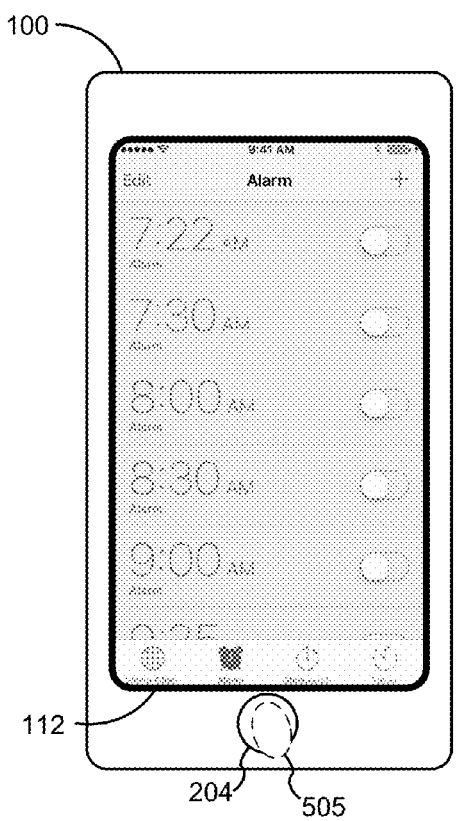
Figure 5B:
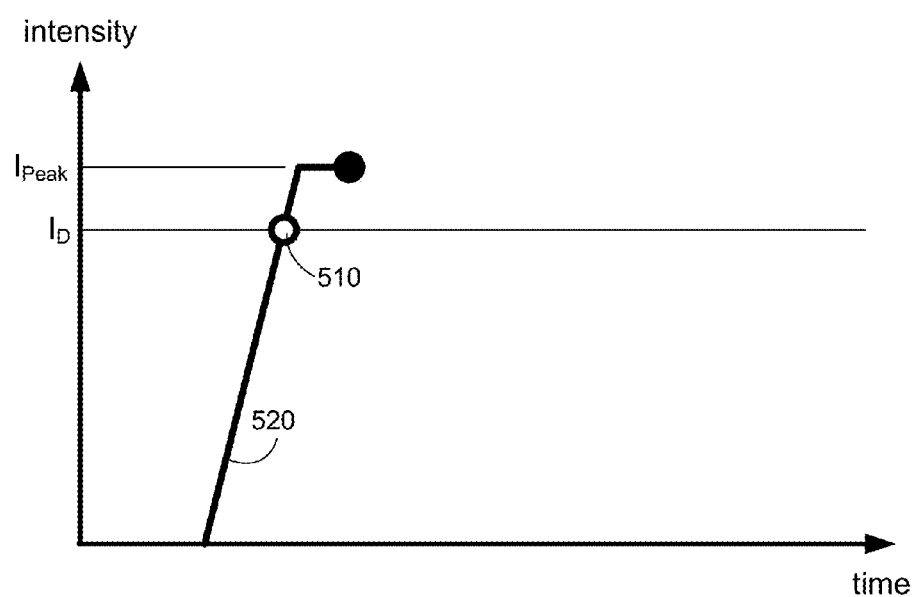
Figure 5C:
Figure 5C:
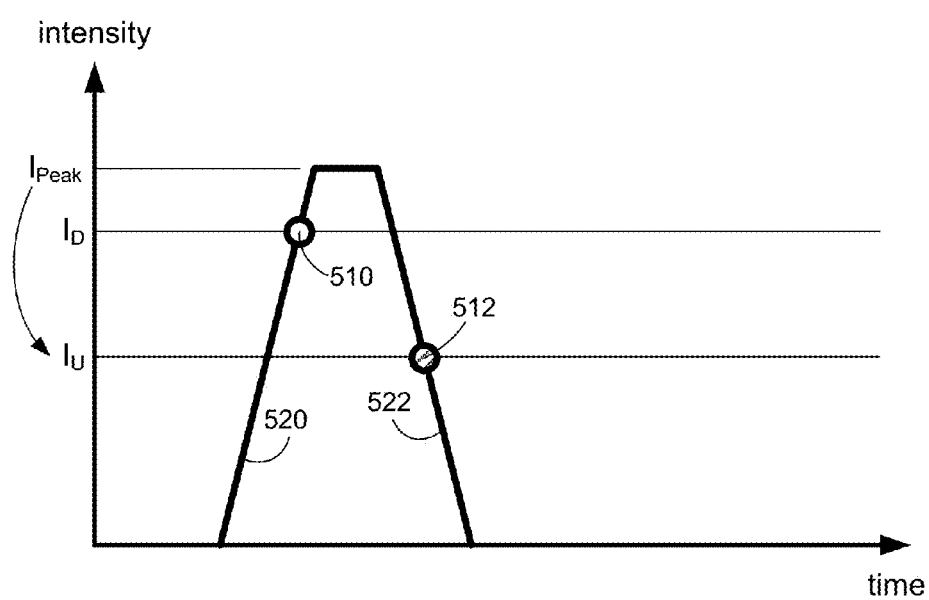
Figure 8B:
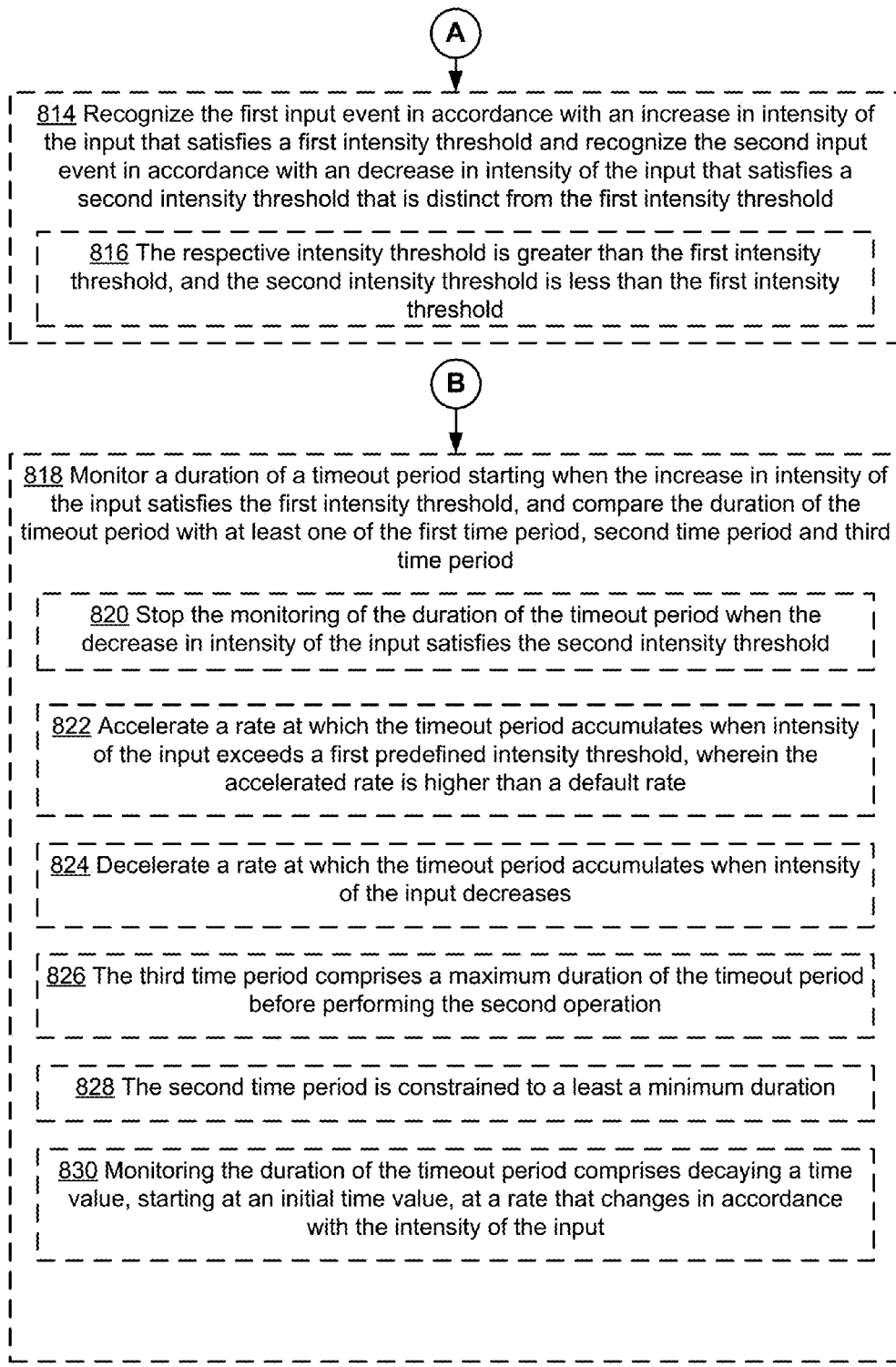
Figure 8C:
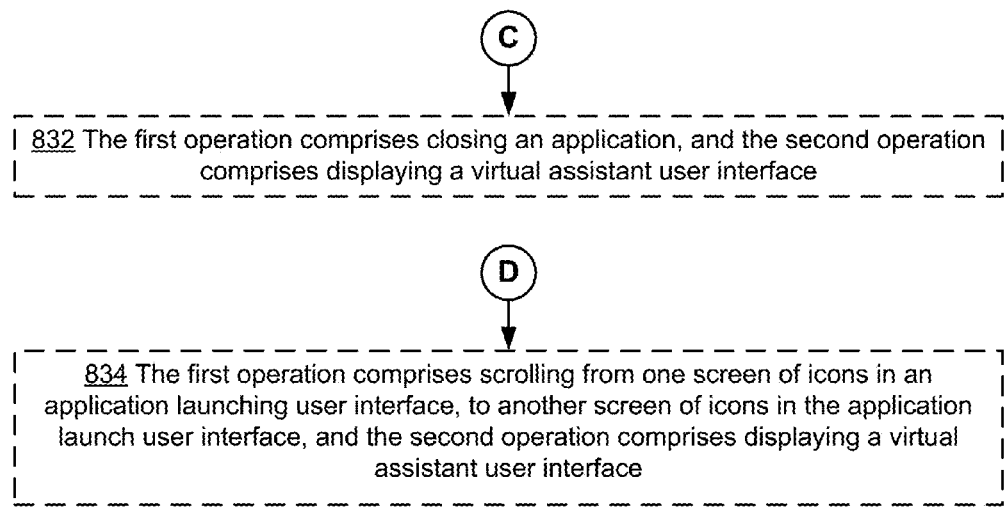

Below, FIGS. 1A-1B, 2, and 3 provide a description of example devices. FIGS. 4A-4B, and 5A-5II illustrate example user interfaces of an electronic device configured to monitor an input on an intensity sensitive input element and detect various events, such as up-clicks, down-clicks, single clicks, double clicks, deep press inputs, and long press inputs, using a variety of input intensity criteria and timing criteria for fast and efficient determination of user inputs. FIGS. 6A-6F illustrate a flow diagram of a method of monitoring an input on an intensity sensitive input element, and detecting an up-click and/or a down-click in the monitored input using one or more intensity thresholds that are based on prior input intensity of the input. FIGS. 7A-7E illustrate a flow diagram of a method of monitoring changes in intensity of an input and applying early-confirmation criteria for recognizing single click inputs, as distinguished from double click inputs, on an expedited basis. FIGS. 8A-8C illustrate a flow diagram of a method of monitoring changes in intensity of an input and applying intensity-sensitive criteria for recognizing long press inputs on an expedited basis. The user interfaces in FIGS. 5A-5N are used to illustrate the processes in FIGS. 6A-6F. The user interfaces in FIGS. 5O-5Y are used to illustrate the processes in FIGS. 7A-7E. The user interfaces in FIGS. 5Z-5II are used to illustrate the processes in FIGS. 8A-8C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
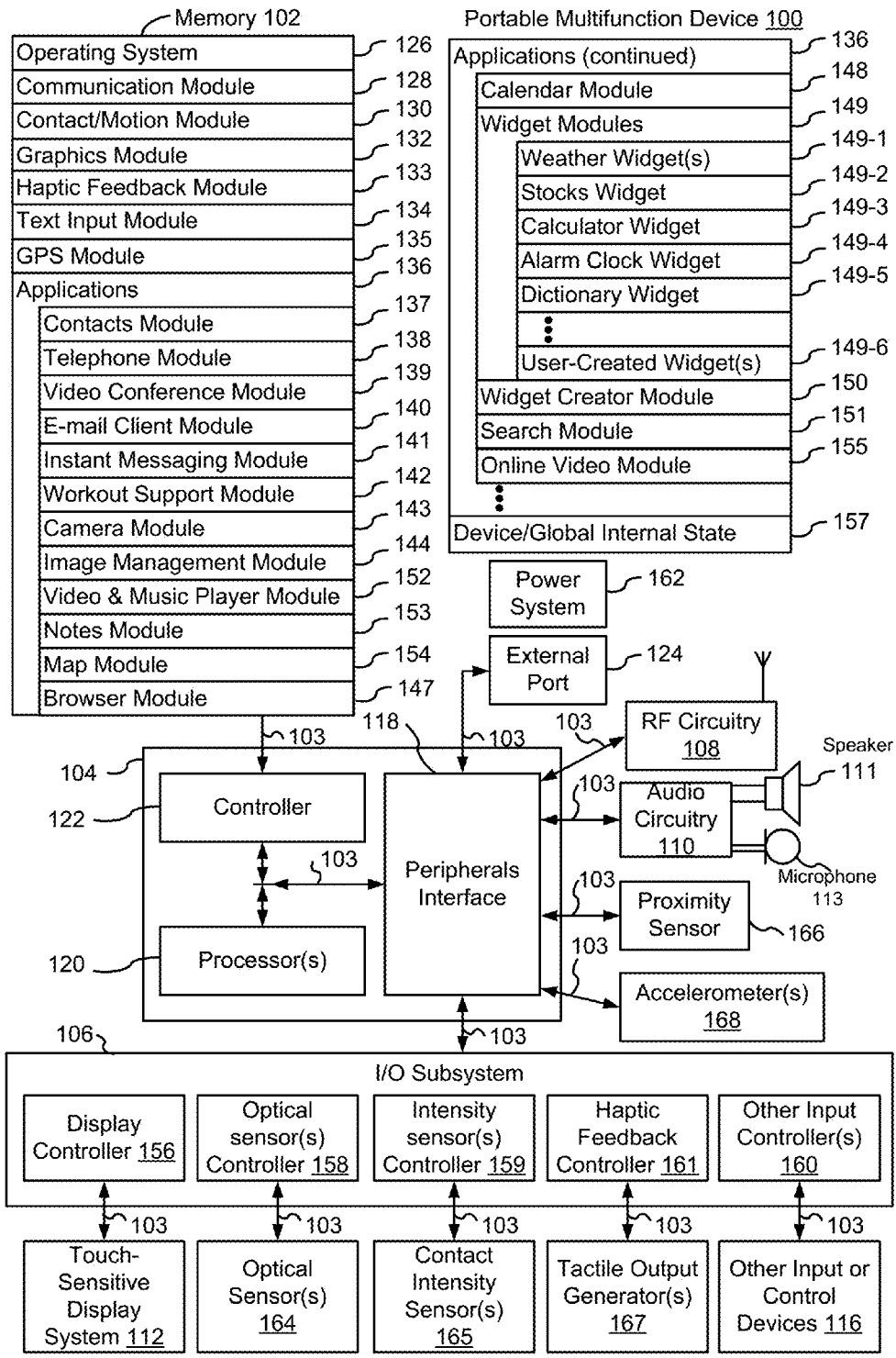
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4C:
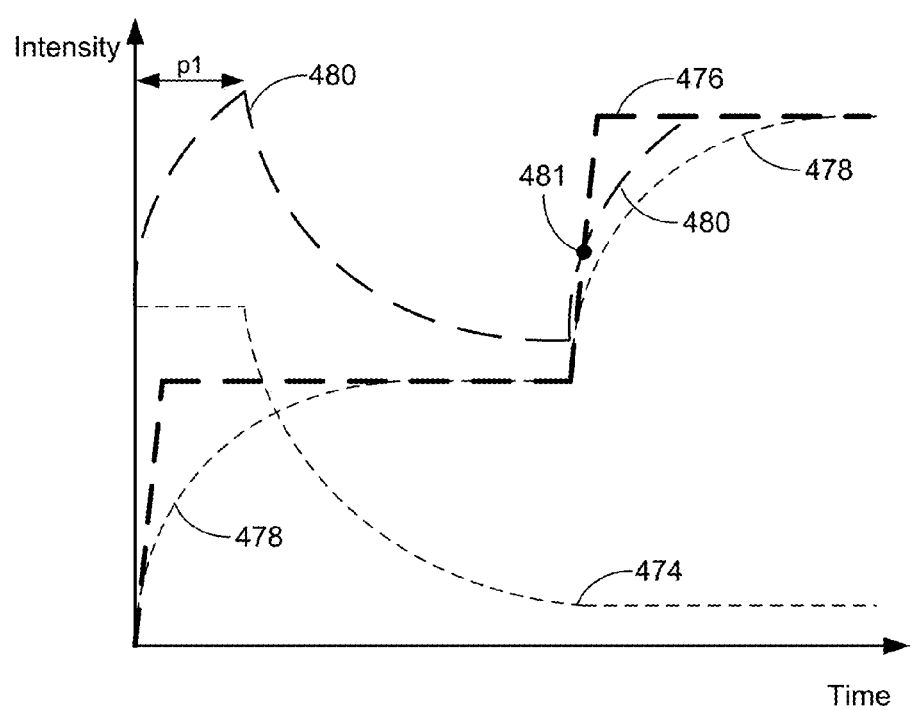
FIGS. 4C-4E illustrate examples of dynamic intensity thresholds in accordance with some embodiments.
Figure 4D:
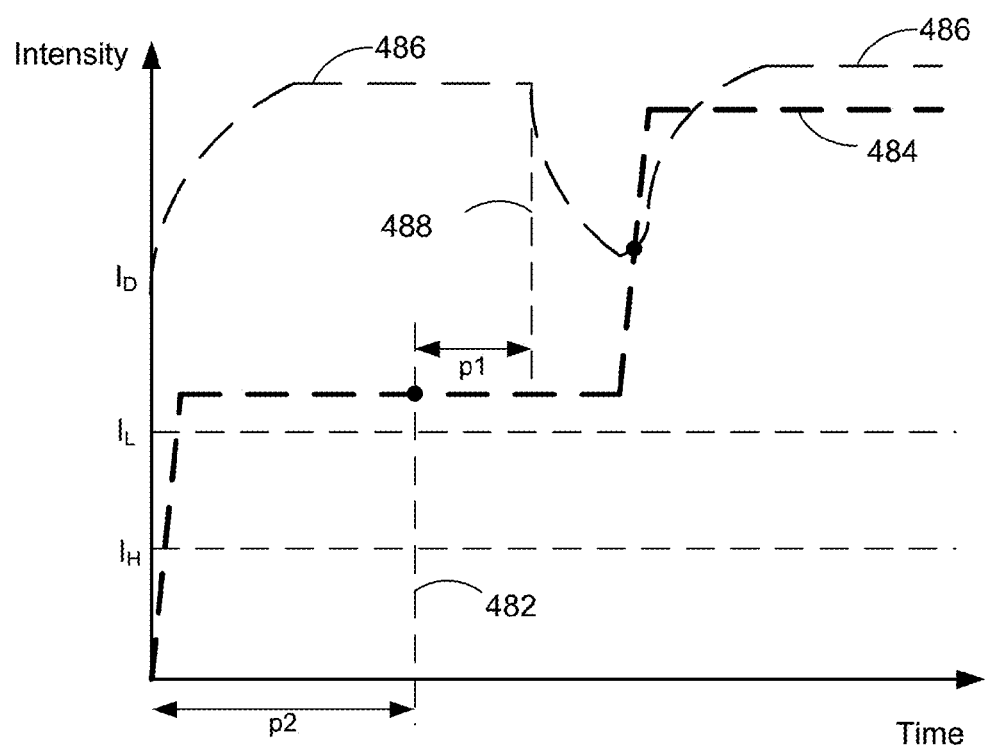
Figure 4E:
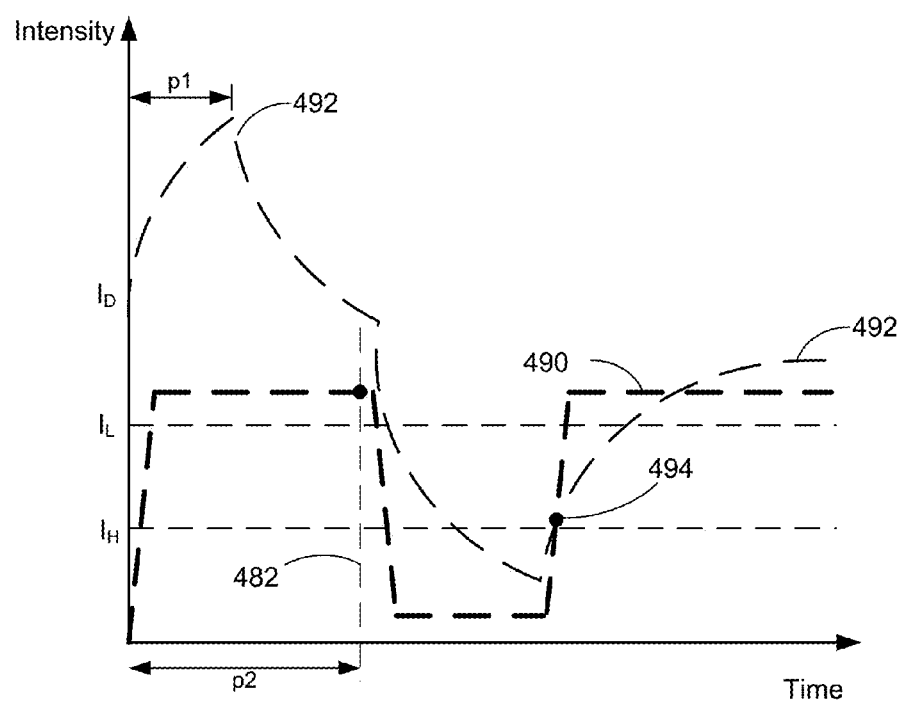
Figure 4F:
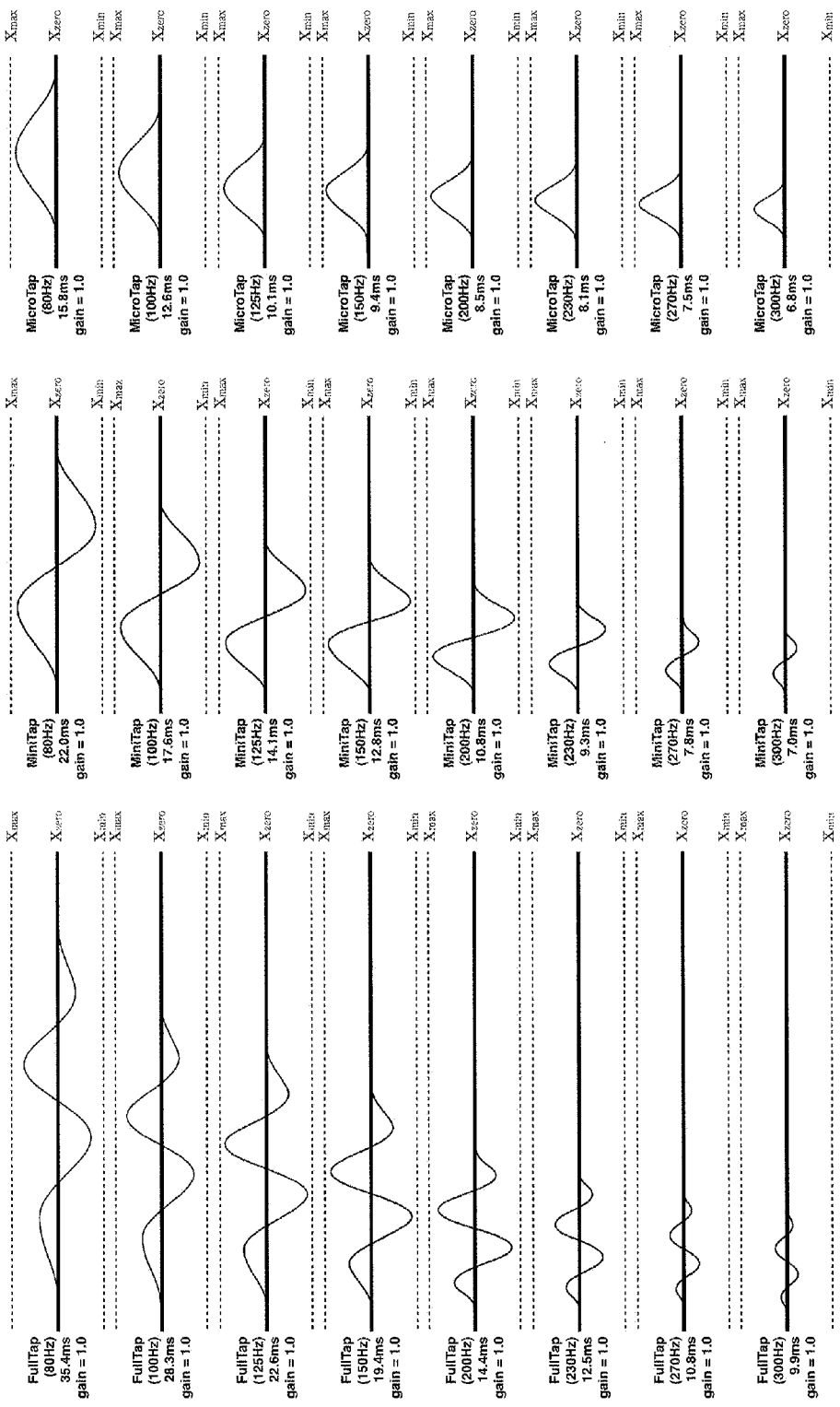
FIGS. 4F-4G illustrate a set of sample tactile output patterns in accordance with some embodiments.
Figure 4G:
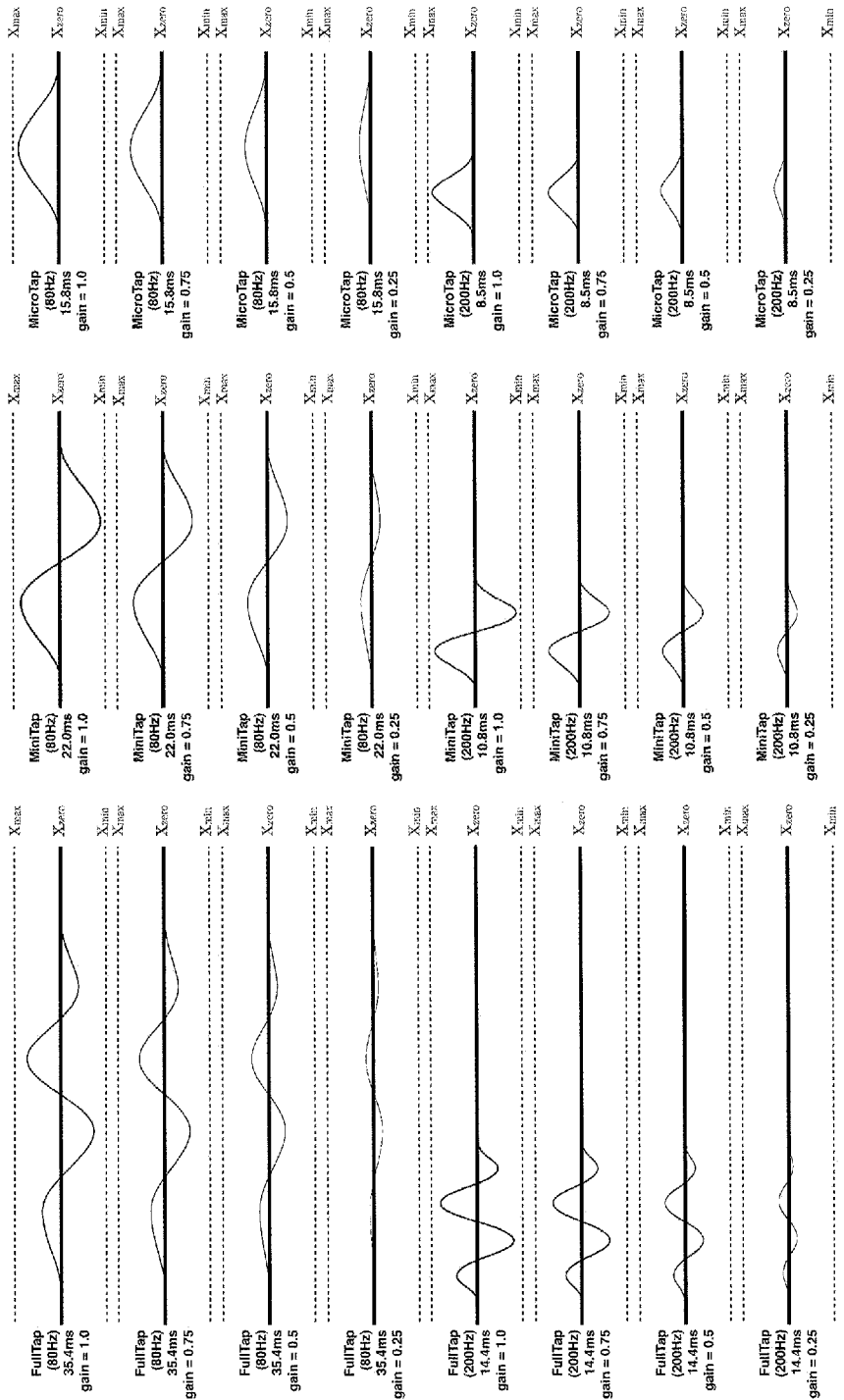

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F-4G include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in 1 dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

TABLE 1

| Behavior Configuration | Feedback Configuration | Examples |
| --- | --- | --- |
| User Interface Haptics | | |
| Retarget Default | MicroTap High (270 Hz) Gain: 0.4 Minimum Interval: 0.05 | Drag calendar event across day boundary Retarget in orb quick action menu Sliding over origin point in a scrubber Reaching 0 degrees when cropping/ straightening Rearranging a list when items snap together |
| Retarget Strong | MicroTap High (270 Hz) Gain: 0.5 Minimum Interval: 0.05 | Retarget in A-Z scrubber |
| Retarget Picker | MicroTap High (270 Hz) Gain: 0.4 Minimum Interval: 0.05 | Spinning a wheel in the wheels of time user interface |
| Impact Default | MicroTap Medium (150 Hz) Gain max: 0.8 Gain min: 0.0 | Changing scrubbing speed when adjusting a slider Creating a new calendar event by tapping and holding Activating a toggle switch (changing the switch from on to off or off to on) Reaching a predefined orientation on a compass (e.g., every 45 degrees from North) Reaching a level state (e.g., 0 degrees tilt in any axis for 0.5 seconds) Dropping a pin in a map Sending or receiving a message with an emphasis animation (e.g., "slam" effect) Sending or receiving an acknowledgment of a message Snapping a ruler to different orientations (e.g., every 45 degrees) Crossing over a suggested photo while scrubbing through a burst of photos Crossing over a detent in a scrubber (e.g., text size, haptic strength, display brightness, display color temperature) Transaction failure notification (ApplePay Failure) |
| Impact Light | MicroTap Medium (150 Hz) Gain max: 0.6 Gain min: 0.0 | Picking up an existing item (e.g., a calendar event, a favorite in web browser) Moving a time selector over a minor division of time (e.g., 15 min) in sleep alarm |
| Impact Strong | MicroTap Medium (150 Hz) Gain max: 1.0 Gain min: 0.0 | Moving a time selector over a major division of time (e.g., 1 hour) in sleep alarm |
| Edge Scrubber | MicroTap Medium (150 Hz) Gain max: 0.6 Gain min: 0.3 | Dragging a brightness scrubber to an edge of the scrubber Dragging a volume scrubber to an edge of the scrubber |
| Edge Zoom | MicroTap High (270 Hz) Gain: 0.6 | Reaching maximum zoom level when zooming into a photo Re-centering a map |
| Drag Default | MicroTap High (270 Hz) Gain Pickup: 1.0 Gain Drop: 0.6 | Pickup and drop an event in calendar |
| Drag Snapping | MicroTap High (270 Hz) Gain Pickup: 1.0 Gain Drop: 0.6 Gain Snap: 1.0 | Rearrange lists in weather, contacts, music, etc. |
| States Swipe Action | Swipe in: MiniTap High (270 Hz) Gain: 1.0 Swipe out: MicroTap High (270 Hz) Gain: 0.55 | Swipe to delete a mail message or conversation Swipe to mark a mail message as read/unread in mail Swipe to delete a table row (e.g., a document in a document creation/viewing application, a note in a notes application, a location in a weather application, a podcast in a podcast application, a song in a playlist in a music application, a voice memo in a voice recording application Swipe to delete a message while displaying a pressure-triggered preview Swipe to mark a message as read/unread while displaying a pressure-triggered preview Swipe to delete a news article Swipe to favorite/love a news article |
| Button Default | MicroTap High (270 Hz) Gain: 0.9 | Reply to message/conversation Adding a bookmark in an electronic book reader application Activating a virtual assistant Starting to record a voice memo Stopping recording a voice memo |
| Button Destructive | MiniTap Low (100 Hz) Feedback Intensity: 0.8 | Delete message/conversation |

TABLE 1-continued

| Behavior Configuration | Feedback Configuration | Examples |
|---|---|---|
| Event Success | FullTap | Confirmation that a payment has been made |
| | Medium (200 Hz) Gain: 0.7 | Alert that authentication is needed to make a payment (e.g., biometric authentication or passcode authentication) |
| | MiniTap High (270 Hz) Gain: 1.0 | Adding a payment account to an electronic wallet application |
| Event Error | MiniTap High (270 Hz) Gain: 0.85 Gain: 0.75 | Failure to process a payment transaction Failure to authenticate a fingerprint detected on a fingerprint sensor Incorrect passcode/password entered in a passcode/password entry UI |
| | FullTap Medium (200 Hz) Gain: 0.65 | |
| | FullTap Low (150 Hz) Gain: 0.75 | |
| Event Warning | FullTap High (300 Hz) Gain: 0.9 | Shake to undo |
| | FullTap Custom (270 Hz) Gain: 0.9 | |
| Force Press | | |
| States Preview | MicroTap Custom (200 Hz) Gain: 1.0 | Orb - Peek/Preview (e.g., peek at a mail message) |
| States Preview | FullTap Custom (150 Hz) Gain: 1.0 | Orb - Pop/Commit (e.g., pop into full mail message) |
| States Preview | MicroTap Custom (200 Hz) Gain: 1.0 | Orb - Unavailable (e.g., press hard on an app icon that doesn't have any associated quick actions) |
| System Haptics | | |
| Device Locked | MicroTap Medium (150 Hz) Gain: 1.0 | Press power button once to lock device |
| | MiniTap Medium (150 Hz) Gain: 1.0 | |
| Vibe on Attach | Vibe at 150 Hz that gradually increases in amplitude | Attach device to power source |
| Ringtones & Alerts | Custom tactile output using one or more of: Vibe 150 Hz MicroTap 150 Hz MiniTap 150 Hz FullTap 150 Hz | Receive phone call or text message |
| Solid-State Home Button | | |
| 1 ("Tick") | MiniTap 230 Hz Gain: 1.0 | Press home button with click option 1 selected |
| 2 ("Tak") | MiniTap 270 Hz Gain: 1.0 | Press home button with click option 2 selected |
| 3 ("Tock") | MiniTap 300 Hz Gain: 1.0 | Press home button with click option 3 selected |

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture (e.g., on touch-sensitive display system 112) depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy input criteria that are configured to be met even when the characteristic intensity of a contact does not satisfy a given intensity threshold. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is configured to detect a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected (e.g., on touch-sensitive display system 112) based on the satisfaction of criteria that are independent of intensities of contacts included in the gesture. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that gesture recognition criteria are configured to be met when a contact in a gesture has an intensity below a respective intensity threshold means that the gesture recognition criteria are capable of being satisfied even if the contact(s) in the gesture do not reach the respective intensity threshold. It should be understood, however, that this statement does not preclude the gesture recognition criteria from being satisfied in circumstances where one or more of the contacts in the gesture do reach or exceed the respective intensity threshold. For example, a tap gesture is configured to be detected if the finger-down and finger-up event are detected within a predefined time period, without regard to whether the contact is above or below the respective intensity threshold during the predefined time period, and a swipe gesture is configured to be detected if the contact movement is greater than a predefined magnitude, even if the contact is above the respective intensity threshold at the end of the contact movement.

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria are configured to be met when a contact in a gesture has an intensity below a respective intensity threshold does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which are configured to be met when a gesture has an intensity below a respective intensity threshold—are in competition with second gesture recognition criteria for a second gesture—which are dependent on the gesture reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture are still configured to be met when a contact in the gesture has an intensity below the respective intensity because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that are configured to be met when an intensity of a contact remains below a respective intensity threshold will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
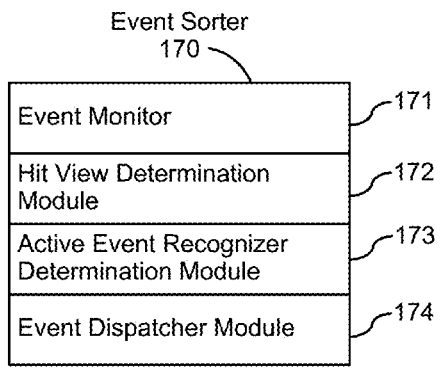
FIG. 1B is a block diagram illustrating example components for event handling in accordance with some embodiments.
Figure 1B:
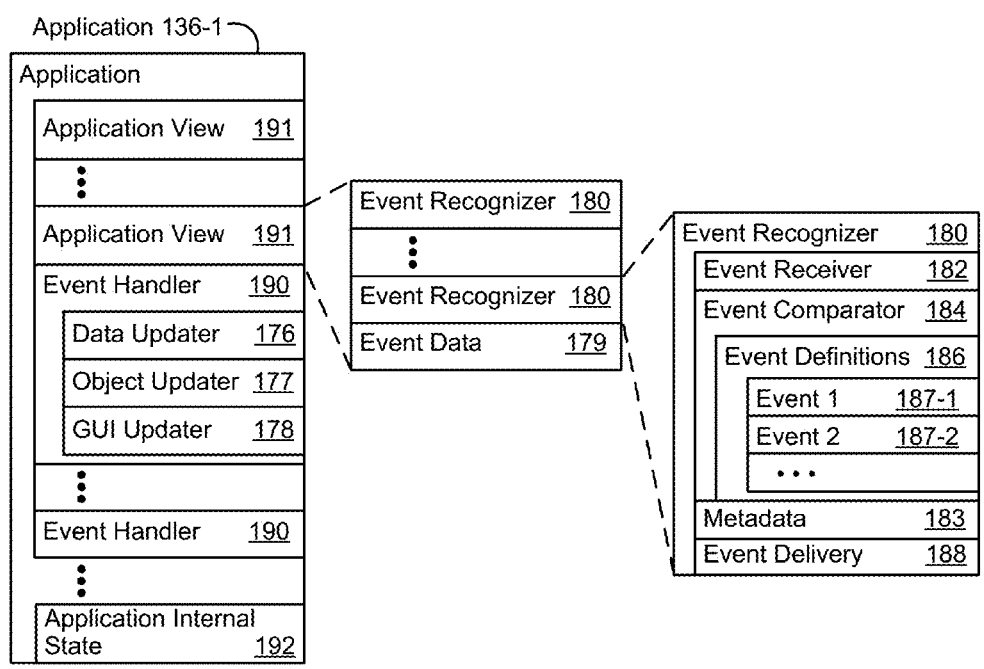

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
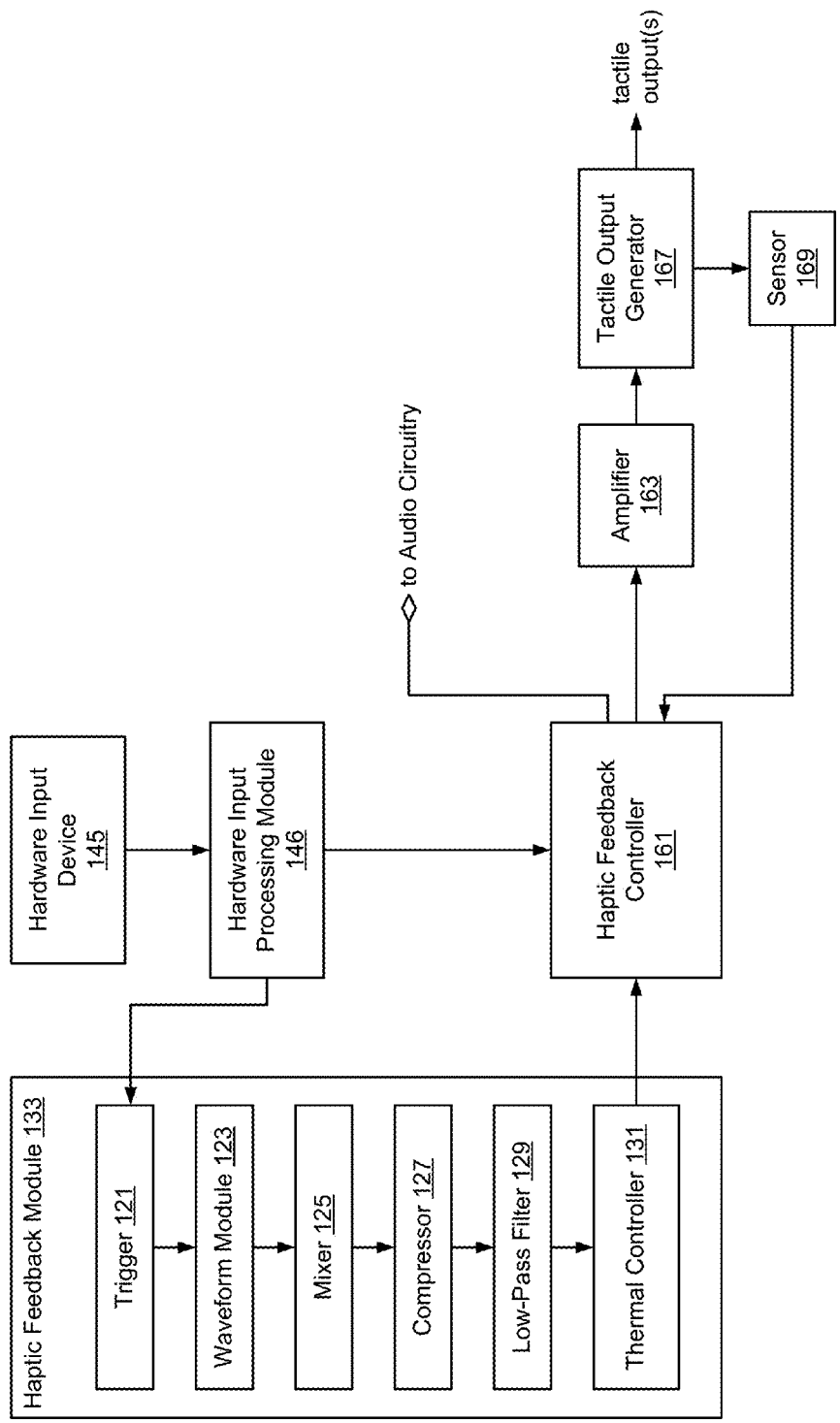
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., as shown in FIG. 2B or a home button with a mechanical actuator as illustrated in FIG. 2C). In some embodiments, hardware input device 145 consists of an intensity-sensitive home button (e.g., as shown in FIG. 2B or a home button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
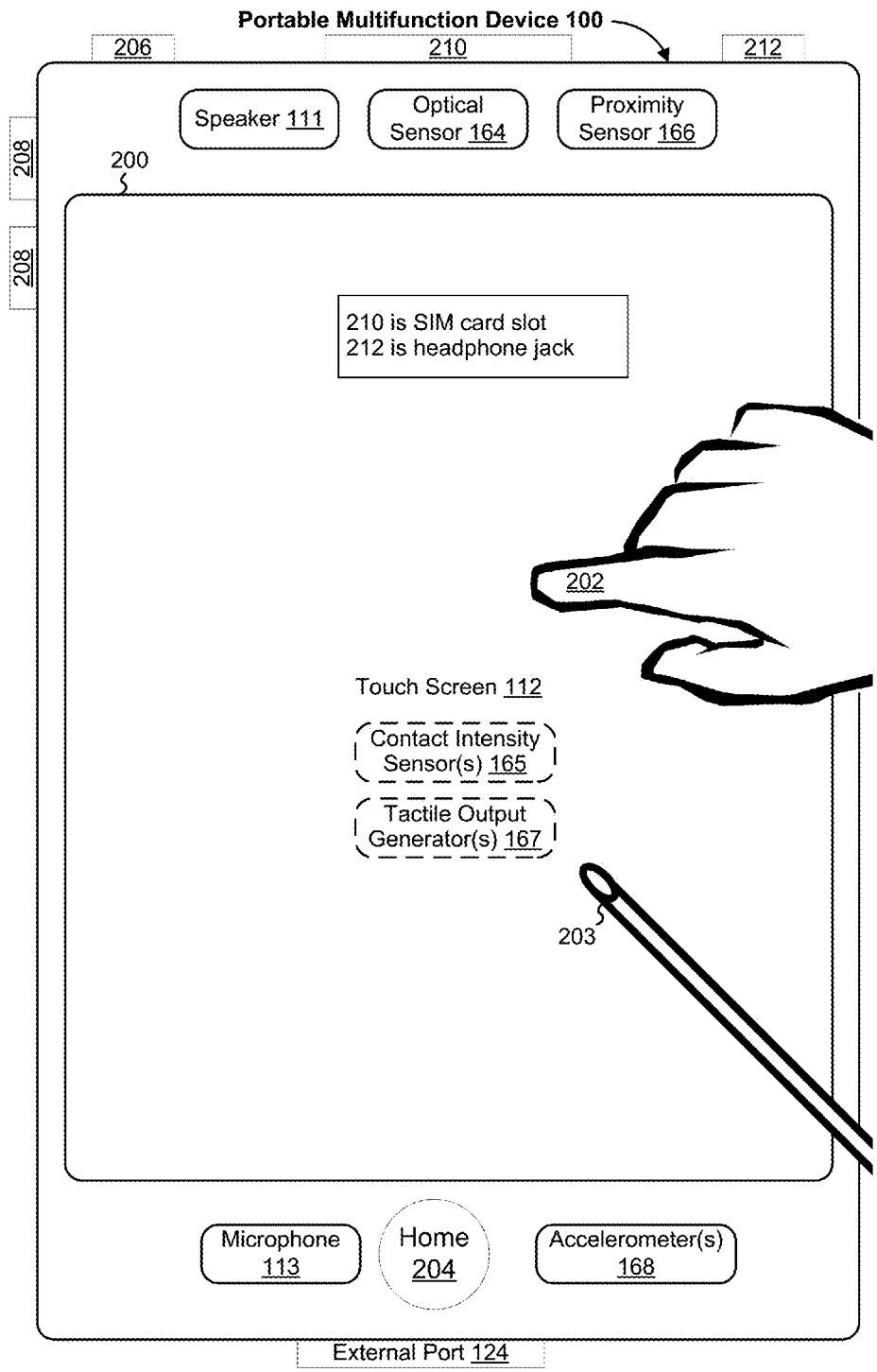
FIG. 2A illustrates a portable multifunction device having a touch screen in accordance with some embodiments.
Figure 2B:
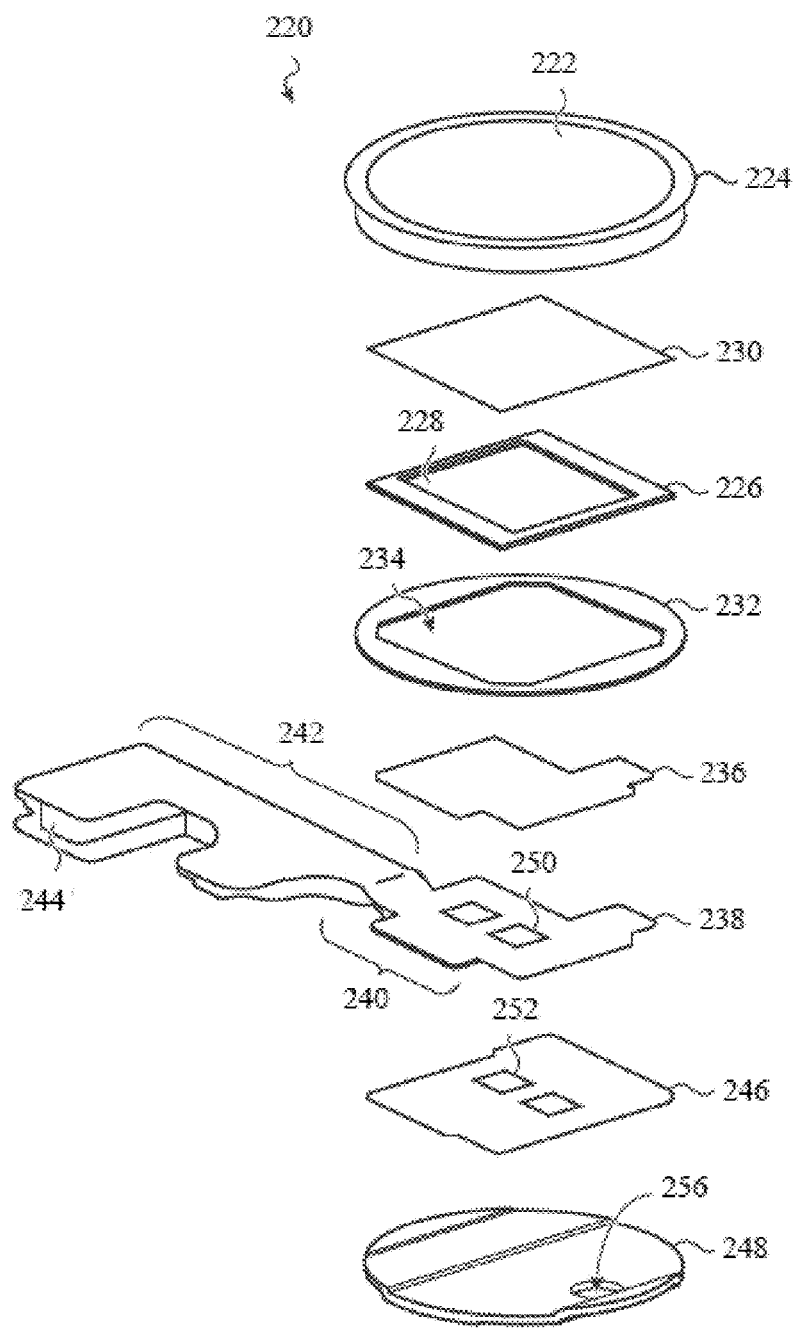
FIGS. 2B-2C show exploded views of an intensity-sensitive input device in accordance with some embodiments.
Figure 2C:
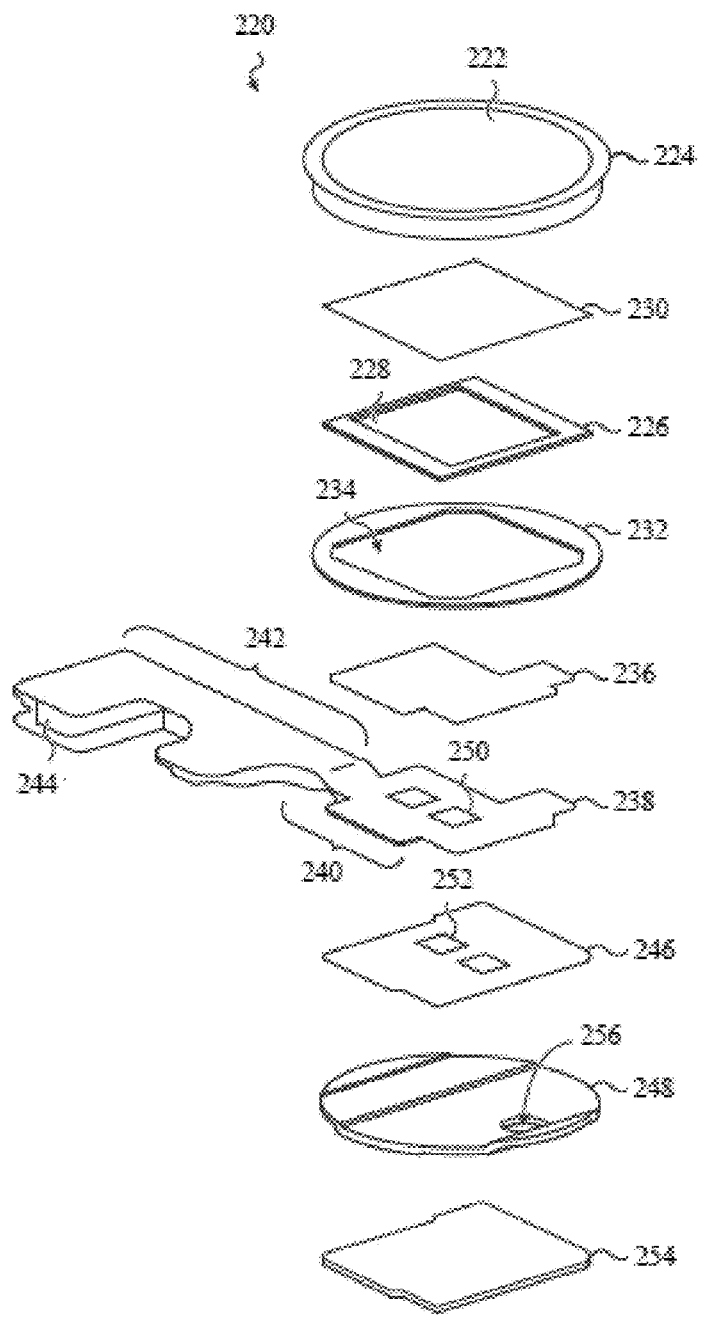

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive home button with capacitive sensors used to determine a range of intensity values that correspond to force applied to the intensity-sensitive home button. FIG. 2C shows an example of a home button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally or alternatively, the second circuit layer 238 may be operably connected to circuitry that transmits signals (e.g., sense signals) received from the intensity sensor component(s) in the first circuit section 240 to a processing device. Additionally or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220. The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor(s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222. In some embodiments the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- a Bluetooth indicator;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a stylus input). Similarly, when multiple user inputs are simultaneously detected, it should be understood that multiple finger contacts, or a combination of finger contacts and stylus input are used simultaneously.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, the dynamic intensity thresholds illustrated in FIGS. 4C-4E are used for inputs on touch-sensitive display system 112. In some embodiments, different criteria (e.g., criteria described with respect to FIGS. 5A-5II) are used for inputs on an intensity-sensitive input device, such as intensity-sensitive home buttons illustrated in FIGS. 2B and 2C. In some embodiments, the criteria described with respect to FIGS. 5A-5II are used for all inputs instead of the dynamic intensity thresholds illustrated in FIGS. 4C-4E.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Although only specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

FIGS. 5A-5II illustrate example user interfaces and a variety of timeout periods and intensity thresholds used for detecting gestures. Some of the intensity thresholds and timeout periods are based on prior input intensity (e.g., during input of a gesture, some intensity thresholds are based on a characteristic intensity or representative intensity of the input during the same gesture), in accordance with some embodiments. The user interfaces in these figures are used to illustrate the processes described below, including the processes in FIGS. 6A-6F, 7A-7E, and 8A-8C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5N illustrate user interfaces, user input intensities and corresponding intensity thresholds, for distinguishing between a number of gestures, such as single click, double click and long press gestures. FIGS. 5A-5C illustrate a single click gesture on a home button 204 of an electronic device that also includes a touch-sensitive display 112. In some embodiments, home button 204 is separate from the display and, optionally, includes a set of one or more intensity sensors that are separate from intensity sensors used to detect the intensity of inputs on the display. In some embodiments, home button 204 is a virtual home button that is displayed on the display (e.g., with a set of one or more intensity sensors that are separate from intensity sensors used to detect the intensity of inputs on the display or, optionally, using intensity sensors integrated into the display to determine an intensity of an input with the virtual home button). Home button 204 is associated with an intensity sensor that is used to measure the intensity of use inputs on the home button. FIG. 5A shows the electronic device 100, display 112 and home button 204, and also shows a first down-click intensity threshold $I_D$. As shown in FIG. 5B, a touch input 505 on home button 204 has an intensity that changes over time, including a first increase in intensity 520, sometimes called a first down-click, reaching a peak intensity, $I_{Peak}$, that is above a first down-click intensity threshold $I_D$ (e.g., because a user will typically overshoot the down-click intensity threshold when performing a down-click operation). As a result, the electronic device, or a module thereof (e.g., contact/motion module 130, FIG. 1A), detects that the increase in intensity meets down-click detection criteria, which requires that the intensity of the input increase above the first down-click intensity threshold $I_D$ in order for the down-click detection criteria to be met. In some embodiments, when the down-click intensity threshold is reached the device provides feedback (e.g., audio and/or tactile feedback) indicating that the down-click intensity threshold has been reached.

As shown in FIG. 5C, after the first increase in intensity, the intensity of the touch input on home button 204 decreases, and the electronic device detects a first decrease in intensity of the contact 522, sometimes called a first up-click. In the example shown in FIGS. 5B-5C, the first decrease in intensity of the input meets up-click detection criteria, which requires that the intensity of the input decrease below a first up-click intensity threshold $I_U$ in order for the up-click detection criteria to be met. As will be explained in more detail below, the first up-click intensity threshold $I_U$ is selected based on the intensity of the input during the first increase in intensity of the contact 520. As a result of the first decrease in intensity of the contact 522 meeting the up-click detection criteria, electronic device 100 provides first feedback. In the example shown in FIGS. 5B-5C, the first feedback is, or includes, switching from displaying the user interface of a first application (e.g., a timer application) to displaying an application launch user interface. In some embodiments, the user interface transition shown in FIGS. 5B-5C is accomplished by closing the application (e.g., a timer application), or ceasing to display the user interface of the application, in response to single click gesture on home button 204, the performance of which is detected when the first decrease in intensity of the input meets the up-click detection criteria. In some embodiments, when the up-click intensity threshold is reached the device provides feedback (e.g., audio and/or tactile feedback) indicating that the up-click intensity threshold has been reached. In some embodiments, the tactile output for the up-click is different from the tactile output for the down-click (e.g., the tactile output for the up-click has a reduced amplitude relative to the down-click tactile output, such as the MicroTap (270 Hz) tactile output pattern with a gain of 0.5 as opposed to a MicroTap (270 Hz) tactile output pattern with a gain of 1.0 for the down-click).

In contrast to the touch input-based gesture represented by FIGS. 5B-5C, a touch input-based gesture represented by FIGS. 5B and 5F corresponds to a touch input in which the first decrease in intensity of the input does not meet the up-click detection criteria (e.g., does not decrease below the first up-click intensity threshold $I_U$), and as a result, the electronic device forgoes providing the first feedback (e.g., the visual, audio and/or tactile feedback).

Figure 5D:
Figure 5D:
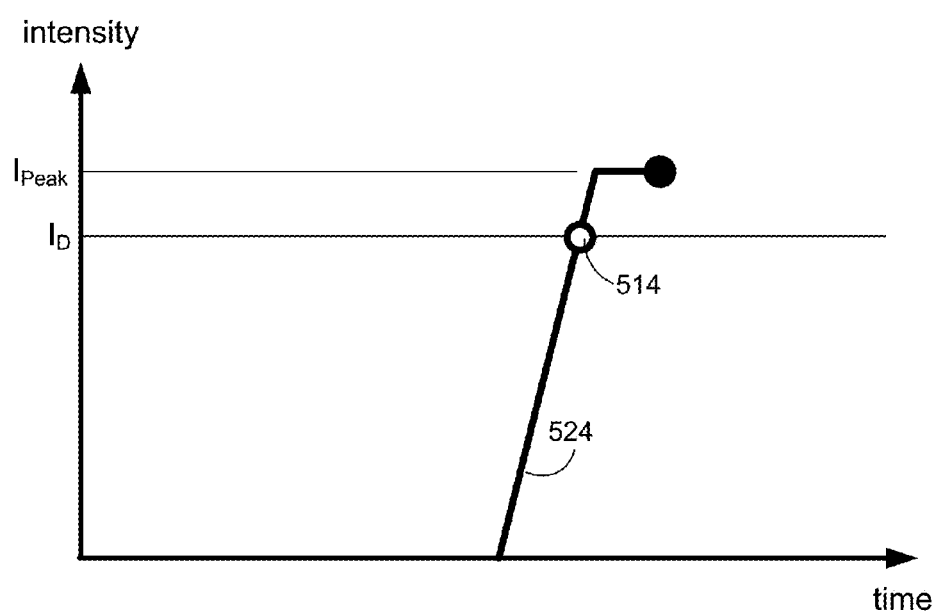
Figure 5E:
Figure 5E:
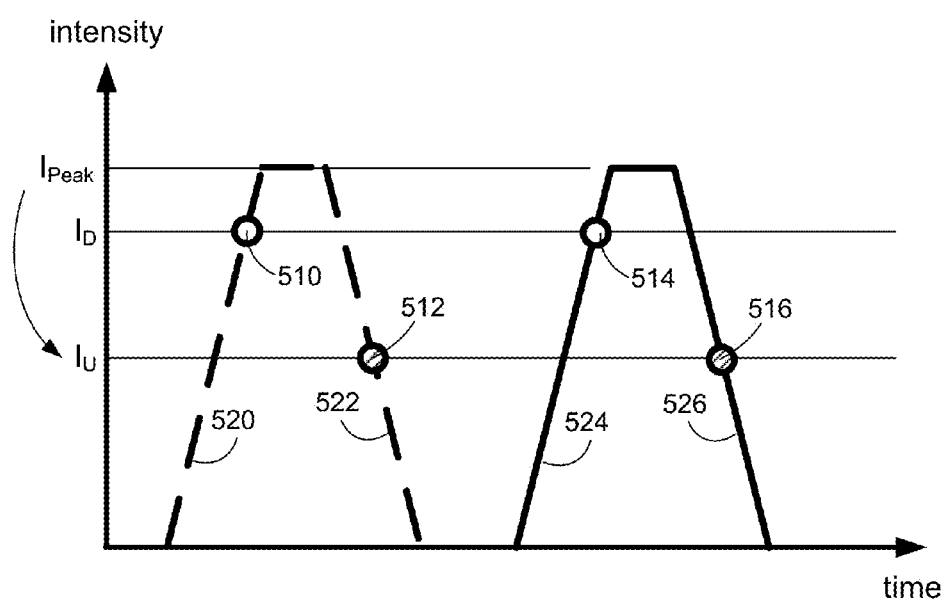
Figure 5F:
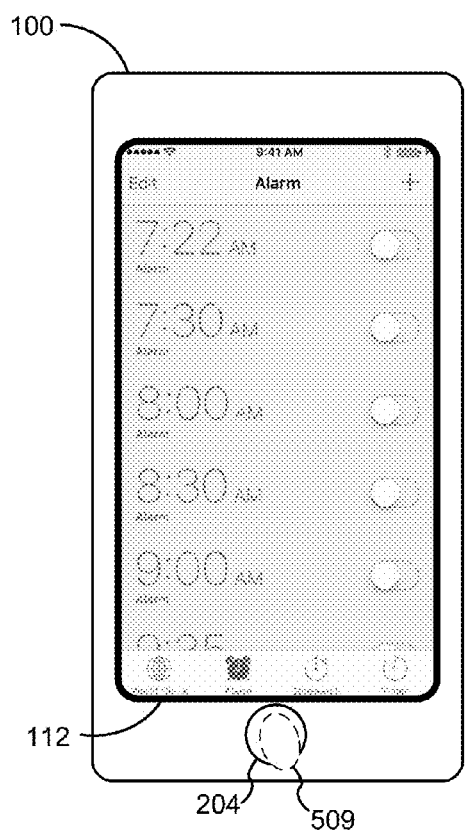
Figure 5F:
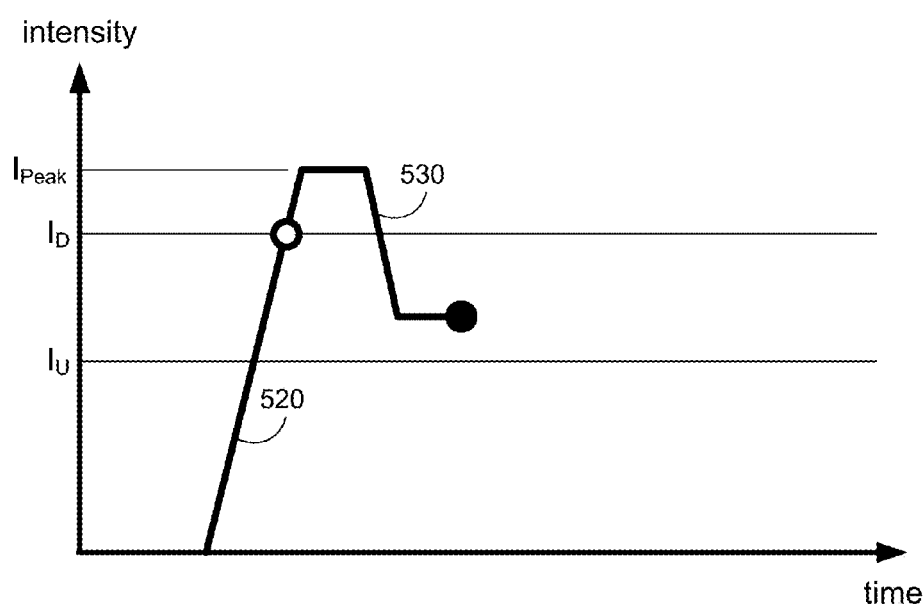

FIG. 5D-5E illustrate a second single click input. As shown in FIG. 5D, a second touch input 507 on home button 204, detected after the conclusion of the first touch input 505 (shown in FIG. 5C), has an intensity that changes over time, including an increase in intensity 524, reaching a peak intensity, $I_{Peak}$ that is above the first down-click intensity threshold $I_D$. As a result, the electronic device, or a module thereof (e.g., contact/motion module 130, FIG. 1A), detects that the increase in intensity 524 meets the down-click detection criteria. In some embodiments, when the down-click intensity threshold is reached the device provides feedback (e.g., audio and/or tactile feedback) indicating that the down-click intensity threshold has been reached.

As shown in FIG. 5E, after the increase in intensity 524 of the second input 507, the intensity of the touch input on home button 204 decreases, and the electronic device detects a decrease in intensity of the input 526. In the example shown in FIGS. 5D-5E, the decrease in intensity of the input meets up-click detection criteria, which requires that the intensity of the input decrease below the first up-click intensity threshold $I_U$ in order for the up-click detection criteria to be met. As a result of the decrease in intensity of the input meeting the up-click detection criteria, electronic device 100 provides feedback. In the example shown in FIGS. 5D-5E, the feedback is, or includes, scrolling from one screen of icons in an application launching user interface (as shown in FIG. 5D), including a first set of application launch icons, to another screen of icons in the application launch user interface, including a second set of application launch icons that include application launch icons not in the first set of application launch icons. In some embodiments, when the up-click intensity threshold is reached the device provides feedback (e.g., audio and/or tactile feedback) indicating that the up-click intensity threshold has been reached.

In FIGS. 5C, 5D and 5E, indicator 510 indicates the point in time at which the down-click detection criteria is met, indicator 512 indicates the point in time at which the up-click detection criteria is met, indicator 514 indicates the point in time at which the down-click detection criteria is met for a second time, and indicator 516 indicates the point in time at which the up-click detection criteria is met for a second time. In some embodiments, the electronic device or a module thereof (e.g., an application-independent module, such as contact/motion module 130, FIG. 1A) generates an event (e.g., a down-click event) in response to the down-click detection criteria being met, or generates an event (e.g., an up-click event) in response to the down-click detection criteria being met, or both. In some embodiments, the event (e.g., a down-click event or an up-click event) is delivered to one or more targets, such as an application, or a web page for processing by instructions in the web page, or to a web browser, which is a special case of an application, and/or a haptics feedback module, such as module 133, FIG. 1A. For example, as shown in FIG. 5C, in some embodiments, a tactile output 502 (e.g., a tactile output having the MicroTap (270 Hz) tactile output pattern, FIG. 4F) is generated in conjunction with the electronic device detecting that the decrease in intensity of the input meets the up-click criteria, sometimes called detecting an up-click or detecting a single click input. Furthermore, referring to FIGS. 5B, 5BB, 5DD, 5FF, 5HH and 5II, in some embodiments, a tactile output 502 or 504 is generated in conjunction with the electronic device detecting that the increase in intensity of the input meets the down-click criteria, sometimes called detecting a down-click or a long press, for example as discussed above with reference to FIGS. 5Z through 5II.

Figure 5G:
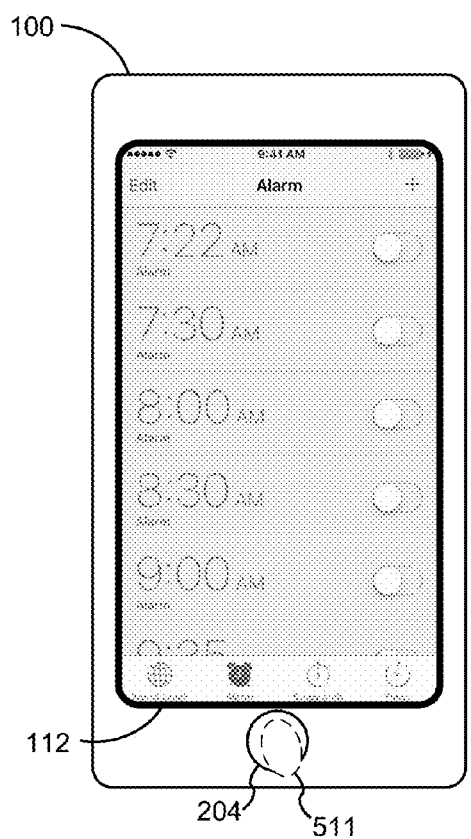
Figure 5G:
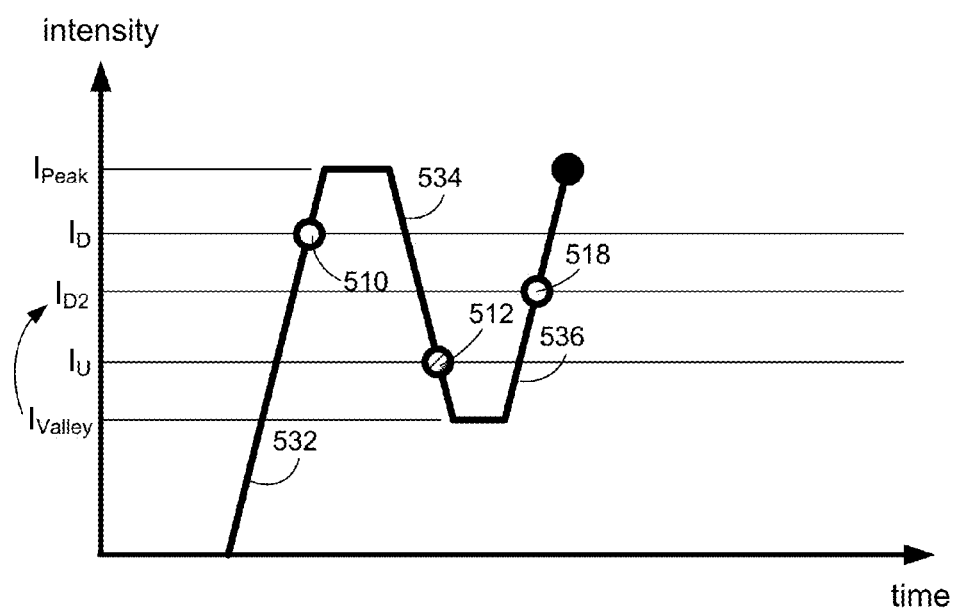
Figure 5H:
Figure 5H:
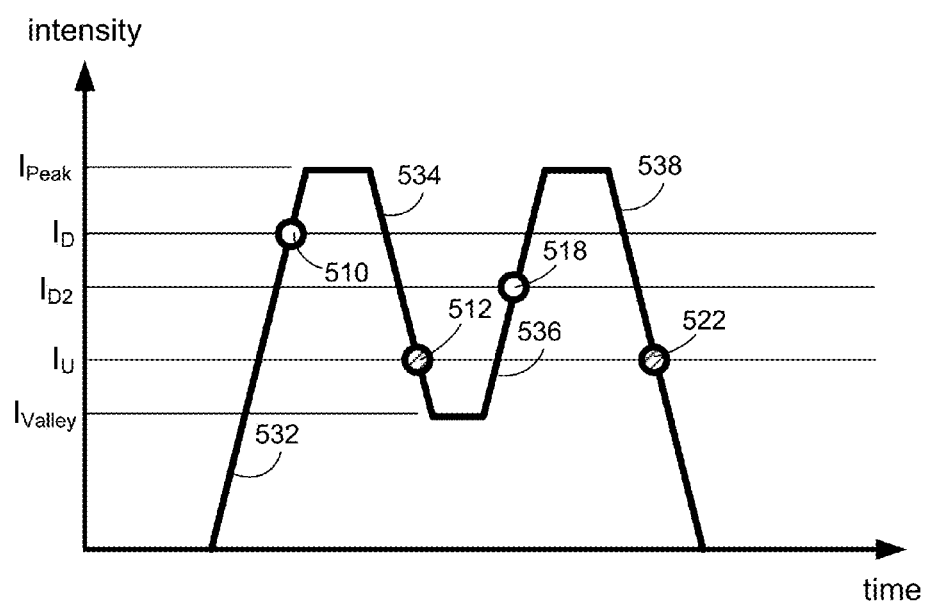
Figure 5I:
Figure 5I:
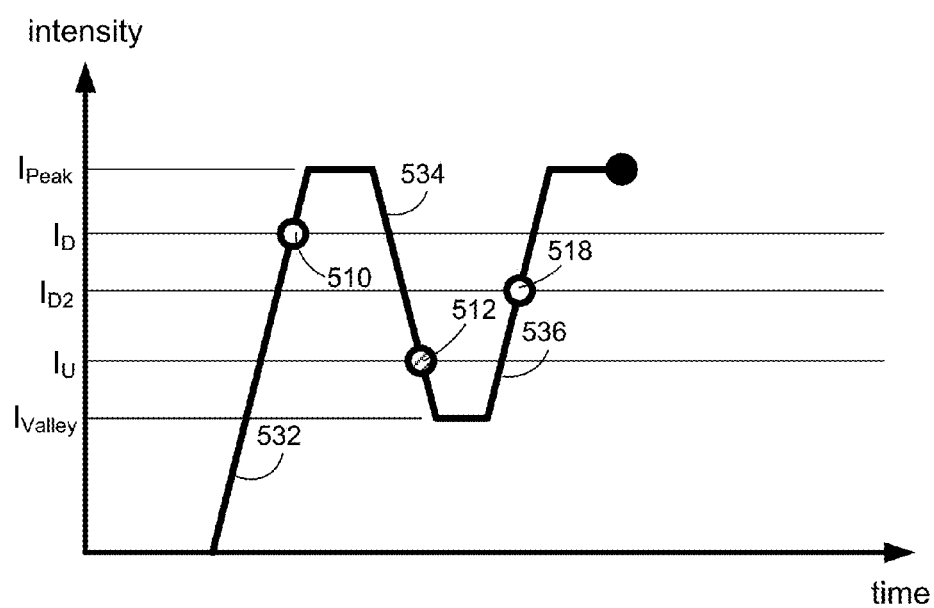

FIGS. 5G-5I illustrate two examples of double click inputs and the provision of corresponding feedback. In particular, FIG. 5G shows a touch input that includes a first increase in intensity 532, reaching a peak intensity, $I_{Peak}$ that is above a first down-click intensity threshold $I_D$. After reaching the peak intensity, $I_{Peak}$ the touch input includes a first decrease in intensity of the input 534, to a low intensity, $I_{Valley}$, that is below a first up-click intensity threshold $I_U$ in order for the up-click detection criteria to be met. As noted above, the first up-click intensity threshold $I_U$ is determined based on the intensity of the input during the first increase in intensity of the contact 532. Subsequent to the first decrease in intensity 534, the touch input includes a second increase in intensity 536 to an intensity above a second down-click intensity threshold $I_{D2}$. As will be explained in more detail below, the second down-click intensity threshold $I_{D2}$ is determined based on the intensity of the input during the first decrease in intensity of the contact. For example, in some embodiments the second down-click intensity threshold $I_{D2}$ is determined based on the minimum or lowest intensity of the input, $I_{Valley}$, during the first decrease in intensity of the contact.

In some embodiments, the input shown in FIG. 5G includes a first increase in intensity 532 that satisfies down-click detection criteria, as indicated by indicator 510, followed by a first decrease in intensity 534 that satisfies up-click detection criteria, as indicated by indicator 512, followed by a second increase in intensity 536 that satisfies the down-click detection criteria as indicated by indicator 518, where the down-click detection criteria includes a first down-click intensity threshold for the first increase in intensity and includes a second down-click intensity threshold for the second increase in intensity.

In some embodiments, represented by the transition from FIG. 5G to FIG. 5I, when the electronic device 101 determines that the first increase in intensity 532, first decrease in intensity 534 and second increase in intensity 536 of the input shown in FIG. 5G has satisfied the down-click detection criteria, up-click detection criteria, and down-click detection criteria, respectively, the electronic device produces second feedback (e.g., visual, audio and/or tactile feedback) indicating that the second increase in intensity was recognized as part of a double-click input, such as displaying a multitasking user interface as shown in FIG. 5H. In some embodiments, the second feedback is generated, or initiated, at or immediately following the time, indicated by indicator 518 in FIG. 5G and 5I, at which the second increase in intensity satisfies the down-click detection criteria. It is noted that in some embodiments, or in some circumstances, "one and a half clicks" (e.g., an input that includes, in sequence, first down-click, a first up-click and a second down-click) is treated as double click, which triggers performance of an action, such as producing the second feedback. In some embodiments, the second feedback is or includes transitioning to a multitasking user interface, as shown in FIG. 5I. In some embodiments, the second feedback is or includes generating a tactile output 503, as shown in FIGS. 5H and 5I. In some embodiments, tactile output 503 is a tactile output having the MiniTap (270 Hz) tactile output pattern, FIG. 4F).

In some embodiments, represented by the transition from FIG. 5G to FIG. 5H, the input shown in FIG. 5G continues, with a second decrease in intensity 538 that falls below the up-click intensity threshold $I_U$, and thereby meets the up-click detection criteria at the time indicated by indicator 522. While FIG. 5H shows the same up-click intensity threshold $I_U$ for both the first and second decreases in intensity, in some embodiments, or in some circumstances, the up-click intensity threshold for the second up-click (e.g., the second decrease in intensity) is different from the up-click intensity threshold for the first up-click (e.g., the first decrease in intensity). It is noted that in some embodiments, or in some circumstances, "two full clicks" (e.g., an input that includes, in sequence, first down-click 532, a first up-click 534, a second down-click 536, and a second up-click 538) is treated as double click, which triggers performance of an action, such as producing the second feedback (e.g., visual, audio and/or tactile feedback). In some embodiments, the second feedback is transitioning to a multitasking user interface, as shown in FIG. 5H.

Figure 5J:
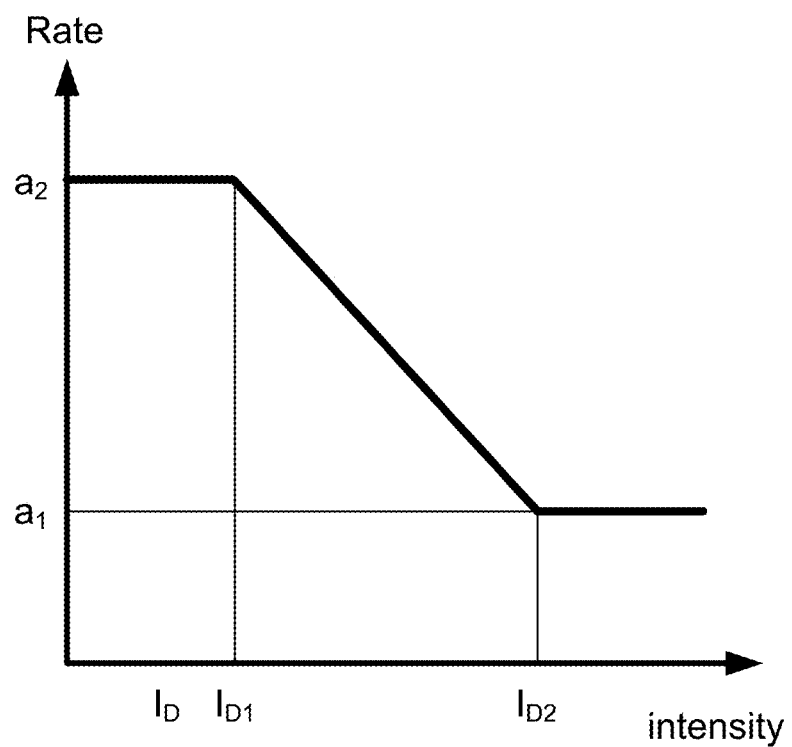

FIG. 5J shows, in graph form, how the ratio of the up-click intensity threshold $I_D$ (see FIG. 5C, and 5E-5I) to an intensity value that represents the intensity of the contact changes based on the intensity value that represents the intensity of the contact. As shown, the ratio has a maximum value, $a_2$, when the input intensity is $I_{D1}$, which is greater (e.g., higher) than the first down-click intensity threshold $I_D$, and has a minimum value, $a_1$, when the input intensity is $I_{D2}$, which is greater (e.g., higher) than $I_{D1}$. The ratio has a value between 0 and 1. In some embodiments, the ratio's maximum value, $a_2$, is equal to 0.73 and the ratio's minimum value, $a_1$, is equal to 0.6. In one example, when the low pass filtered current intensity of the contact (as discussed below with reference to FIG. 5K) is 500 g, the ratio is 0.6 and when the low-pass filtered current intensity of the contact is 300 g, the ratio is 0.73.

More generally, when the up-click intensity is based on a first intensity value that represents the intensity of the contact, the ratio of the up-click intensity threshold to the first intensity value has a first value; and when the up-click intensity is based on a second intensity value that represents the intensity of the contact that is greater than the first intensity value, the ratio of the up-click intensity threshold to the second intensity value has a second value that is different from (e.g., lower than or higher than) the first value.

In some embodiments, the ratio shown in FIG. 5J is multiplier that is applied to (e.g., multiplied with) a characteristic intensity of the input (e.g., a peak intensity of the input during the first increase in intensity, or an intensity value obtained by low-pass filtering the intensity during the first decrease in intensity) to determine the up-click intensity threshold $I_U$.

Figure 5K:
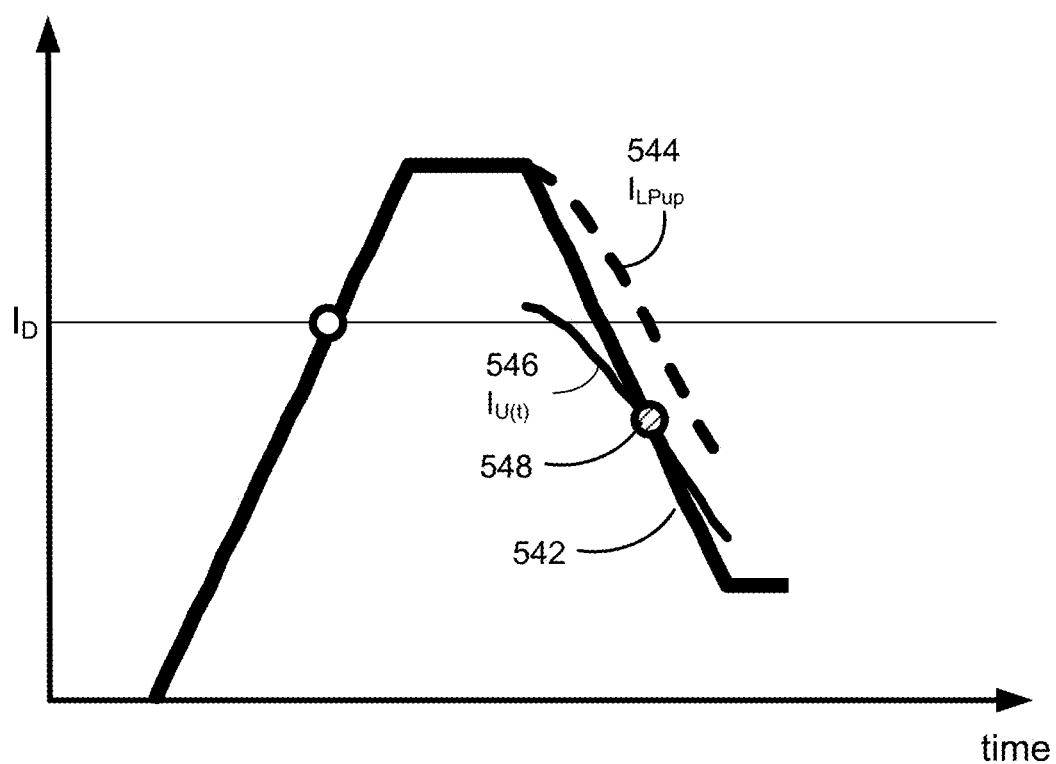

FIG. 5K illustrates the determination of an up-click intensity threshold $I_{U(t)}$ 546 that dynamically changes as intensity of the input changes during a first decrease in intensity 542, after the electronic device has detected a first increase in intensity 540. More specifically, during the first decrease in intensity 542, the intensity of the input is low pass filtered, producing a first time varying value $I_{LPup}$ 544. The first time varying value is then multiplied by either a fixed value, such as 0.7, or an intensity-based value, such as the ratio shown in FIG. 5J, to produce a time varying up-click intensity threshold $I_{U(t)}$, where the "(t)" symbol indicates that the value is time varying. When the intensity of the input matches or decreases below the time varying up-click intensity threshold $I_{U(t)}$, as shown at indicator 548, the up-click detection criteria are satisfied.

Figure 5L:
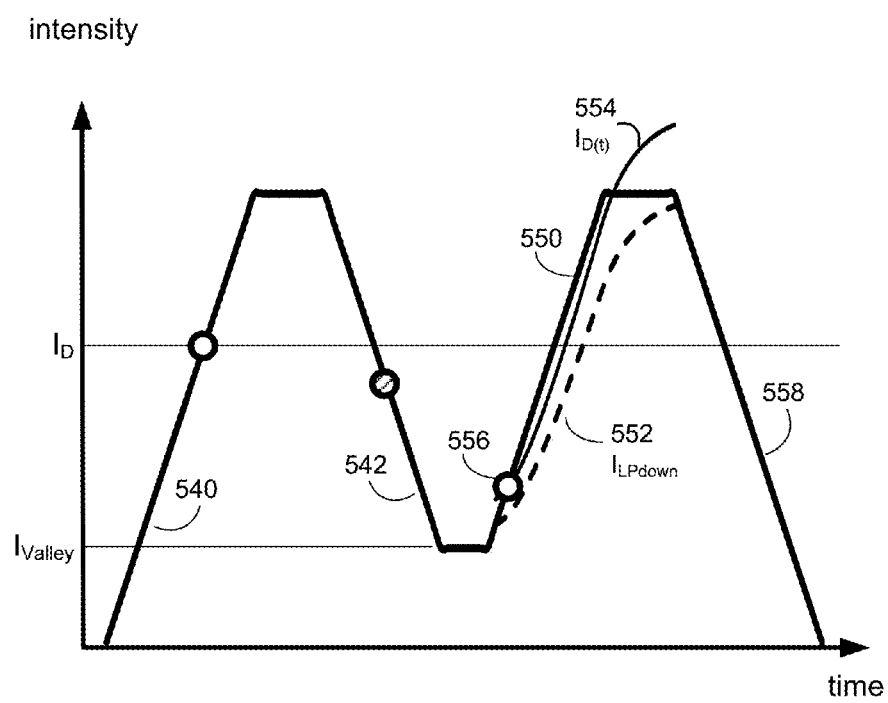

FIG. 5L illustrates the determination of a down-click intensity threshold $I_{D(t)}$ 554 that dynamically changes as intensity of the input changes during a second increase in intensity 550, after the electronic device has detected a first increase in intensity 540 and a first decrease in intensity 542. More specifically, during the second increase in intensity 550, the intensity of the input is low pass filtered, producing a second time varying value $I_{LPdown}$ 552. In some embodiments, the low pass filtered intensity ($I_{LPdown}$ 552) of the detected intensity of the input during the second increase 550 in intensity of the contact is initially set, at the start of the second increase 550 in intensity of the contact, to the lowest intensity, $I_{Valley}$, of the input during the first decrease 534 in intensity of the contact.

The second time varying value $I_{LPdown}$ 552 is then multiplied by either a fixed value, such as 1.4, (or, alternatively, divided by a fixed value, such as 0.7) or an intensity-based value, such as the ratio shown in FIG. 5J, to produce a time varying up-click intensity threshold $I_{U(t)}$ 554, where the "(t)" symbol indicates that the value is time varying. When the intensity of the input matches or increases above the time varying down-click intensity threshold $I_{D(t)}$ 554, as shown at indicator 556, the down-click detection criteria are met.

Figure 5M:
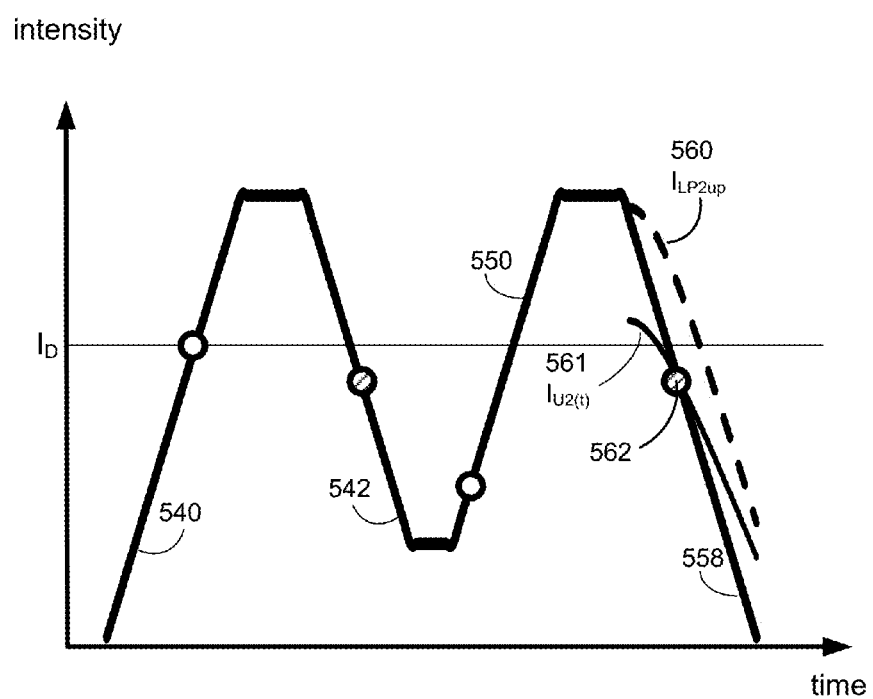
Figure 5N:
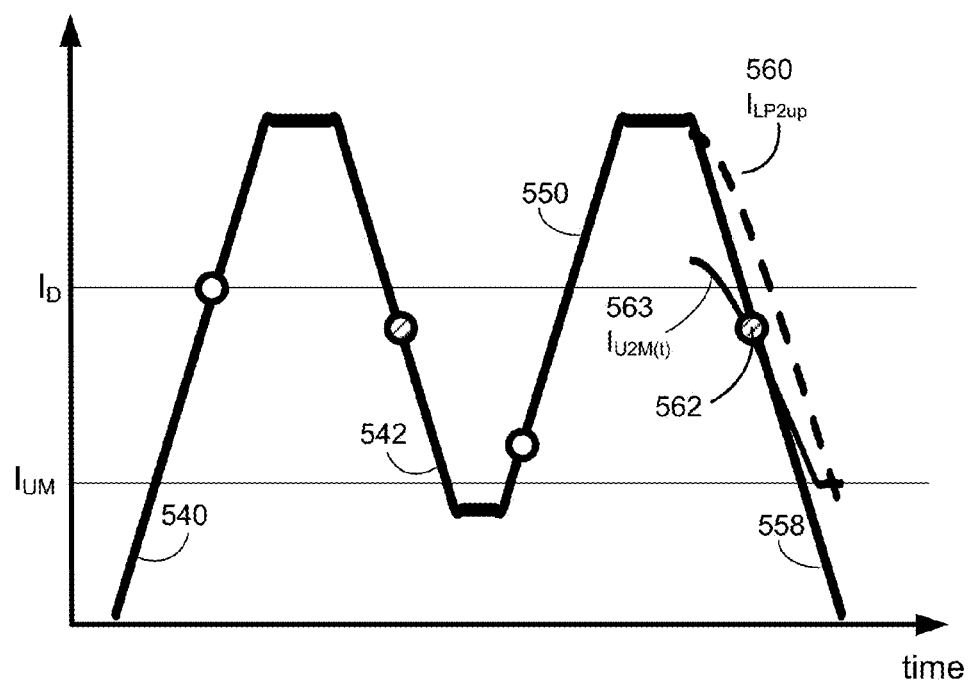

FIG. 5M illustrates the determination of an up-click intensity threshold $I_{U2(t)}$ 561 that dynamically changes as intensity of the input changes during a second decrease in intensity 558 (sometimes called a second up-click), after the electronic device has detected a second increase in intensity 550. More specifically, during the second decrease in intensity 558, the intensity of the input is low pass filtered, producing a second time varying value $I_{LP2up}$ 560. The second time varying value is then multiplied by either a fixed value, such as 0.7, or an intensity-based value, such as the ratio shown in FIG. 5J, to produce a time varying up-click intensity threshold $I_{U2(t)}$ 561, where the "(t)" symbol indicates that the value is time varying. When the intensity of the input matches or decreases below the time varying up-click intensity threshold $I_{U2(t)}$ 561, as shown at indicator 562, the up-click detection criteria are satisfied.

FIG. 5N is similar to FIG. 5M, with the exception that a minimum up-click intensity threshold $I_{UM}$ is applied to the time varying up-click intensity threshold $I_{U2(t)}$ 561 of FIG. 5M, thereby producing a modified time varying up-click intensity threshold $I_{U2M(t)}$ 563. In other words, time varying up-click intensity threshold $I_{U2M(t)}$ 563 is, at each point in time, equal to the greater of time varying up-click intensity threshold $I_{U2(t)}$ 561 and the minimum up-click intensity threshold $I_{UM}$.

Figure 5O:
Figure 5O:
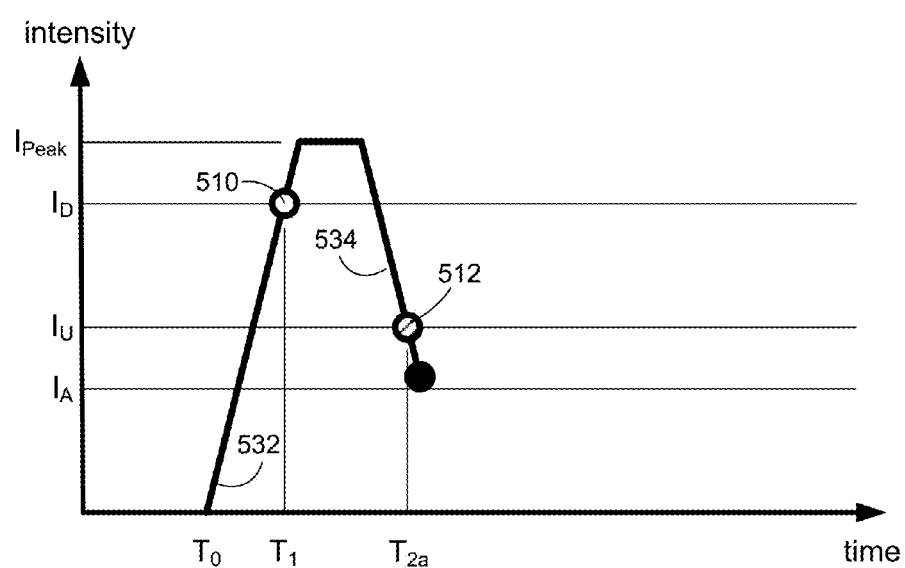
Figure 5P:
Figure 5P:
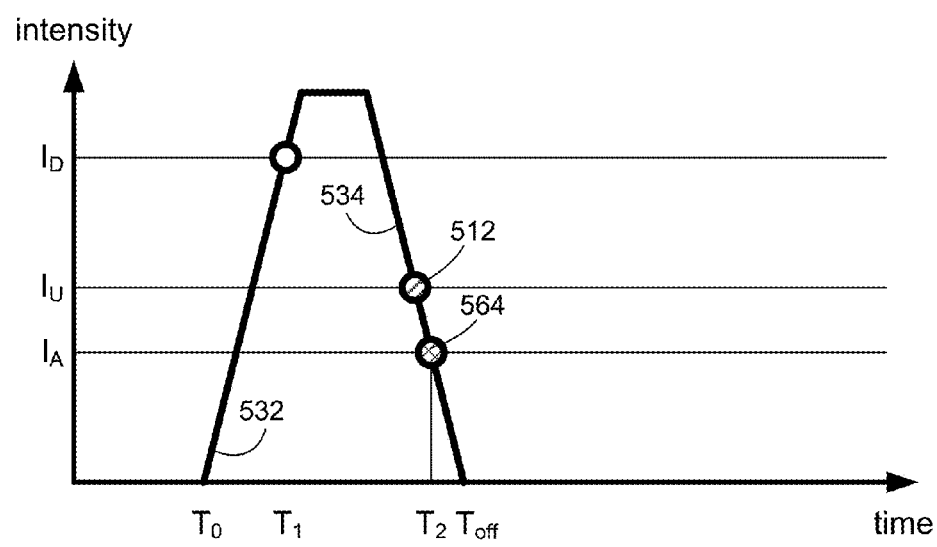

FIGS. 5O-5Y illustrate user interfaces, user input intensities and corresponding intensity thresholds, for distinguishing between single click inputs or gestures and double click inputs or gestures, with accelerated or expedited recognition of single click gestures (e.g., based on a determination that a double click input is not going to be performed). FIGS. 5O-5P illustrate a single click gesture, sometimes called a single tap or single tap gesture, on a home button 204 of an electronic device that also includes a touch-sensitive display 112. Home button 204 includes an intensity sensor for measuring the intensity of use inputs on the home button. FIG. 5O shows the electronic device 100, display 112 and home button 204, and also shows a first down-click intensity threshold $I_D$, a first up-click intensity threshold $I_U$, and an early confirmation threshold $I_A$, sometimes called the accelerated confirmation threshold. As shown in FIG. 5O, a touch input 523 on home button 204 has an intensity that changes over time, including a first increase in intensity 532, sometimes called a first down-click, reaching a peak intensity $I_{Peak}$, that is above a first down-click intensity threshold $I_D$. As a result, the electronic device, or a module thereof (e.g., contact/motion module 130, FIG. 1A), detects that the increase in intensity meets down-click detection criteria, as indicated by indicator 510 at time $T_1$, which requires that the intensity of the input increase above the first down-click intensity threshold $I_D$ in order for the down-click detection criteria to be met.

After the first increase in intensity 532, the intensity of the touch input 523 on home button 204 decreases, and the electronic device detects a first decrease in intensity of the contact 534, sometimes called a first up-click. In the example shown in FIG. 5O, the first decrease in intensity of the input meets up-click detection criteria, as indicated by indicator 512 at time $T_{2a}$, where the input meets up-click detection criteria requires that the intensity of the input decrease below a first up-click intensity threshold $I_U$ in order for the up-click detection criteria to be met. If the first increase in intensity meets the down-click detection criteria and the first decrease in intensity meets the up-click detection criteria, the device recognizes at least a portion of the change in intensity of the input as first event, for example a click event, sometimes called a first click.

If the current context of the electronic device 100 allows both single click and double click inputs on home button 204, the performance of a first operation associated with recognizing a single click is delayed until the device determines that the user is not inputting a double click, or equivalently, that the first click is not the first part of a double click. In some embodiments, the delay in performing the first operation is limited to a default delay time, such as 300 ms or 500 ms. However, if the electronic device can determine that the input satisfied early confirmation criteria, indicating that the input will not be a double click, prior to expiration of the default delay time, the electronic device can initiate performance of the first operation as soon as that determination is made.

In some embodiments, the early-confirmation criteria requires that the intensity of the input during the first decrease in intensity remains below a confirmation intensity threshold, $I_A$, for more than an early confirmation time threshold. For example, in some embodiments, the confirmation intensity threshold, $I_A$, is 100 g, while the up-click detection threshold, $I_U$, is 150 g, or 200 g, or more, and thus the confirmation intensity threshold, $I_A$, is lower than the up-click detection threshold.

In some embodiments, the confirmation intensity threshold, $I_A$, is determined in accordance with a peak characteristic intensity of the input, $I_{Peak}$, detected during the detected increase in intensity of the input, prior to detecting the decrease in intensity of the input on the input element. For example, in some embodiments, the up-click detection threshold, $I_U$, is determined in accordance with the peak characteristic intensity of the input, $I_{Peak}$, detected during the detected increase in intensity of the input, prior to detecting the decrease in intensity of the input on the input element, and the confirmation intensity threshold, $I_A$, is set in accordance with the up-click detection threshold, $I_U$. In some such embodiments, the confirmation intensity threshold, $I_A$, is set to a level that is a predefined amount less (e.g., 50 g less) than the up-click detection threshold, $I_U$, while in other such embodiments, the confirmation intensity threshold, $I_A$, is set to a level that is a predefined multiple or percentage of (e.g., 0.90 times or 90% of) up-click detection threshold, $I_U$. In some embodiments, the up-click threshold is a dynamically determined up-click threshold as described above with reference to FIGS. 5A-5N.

Optionally, a tactile output 502 (e.g., a tactile output having the MicroTap (270 Hz) tactile output pattern, FIG. 4F) is generated in conjunction with the electronic device detecting the increase in intensity of the input meets the down-click criteria, sometimes called detecting or recognizing a down-click, or in conjunction with the electronic device detecting the decrease in intensity of the input meets the up-click criteria, sometimes called detecting or recognizing an up-click or single click input. In some embodiments, the tactile output for the up-click is different from the tactile output for the down-click (e.g., the tactile output for the up-click has a reduced amplitude relative to a down-click tactile output, such as the MicroTap (270 Hz) tactile output pattern with a gain of 0.5 as opposed to a MicroTap (270 Hz) tactile output pattern with a gain of 1.0 for the down-click).

In FIG. 5P, the first decrease 534 of the input shown in FIG. 5O continues, passing the confirmation intensity threshold, $I_A$, at time $T_2$, as indicated by indicator 564. However, in this example, the input ends with liftoff of the finger or stylus at time $T_{off}$, thereby ending the gesture. In some embodiments, termination of the input by liftoff of the contact during the first decrease in intensity is treated as confirmation that the gesture is a single click (or, equivalently, single tap). As a result, the electronic device performs the first operation, which in this example includes ending display of the user interface of the application displayed prior to the single tap being received, and thus the display 112 of the electronic device transitions from displaying the user interface of a first application (e.g., a time application) to displaying a set of application launch icons in an application launching user interface.

Figure 5Q:
Figure 5Q:
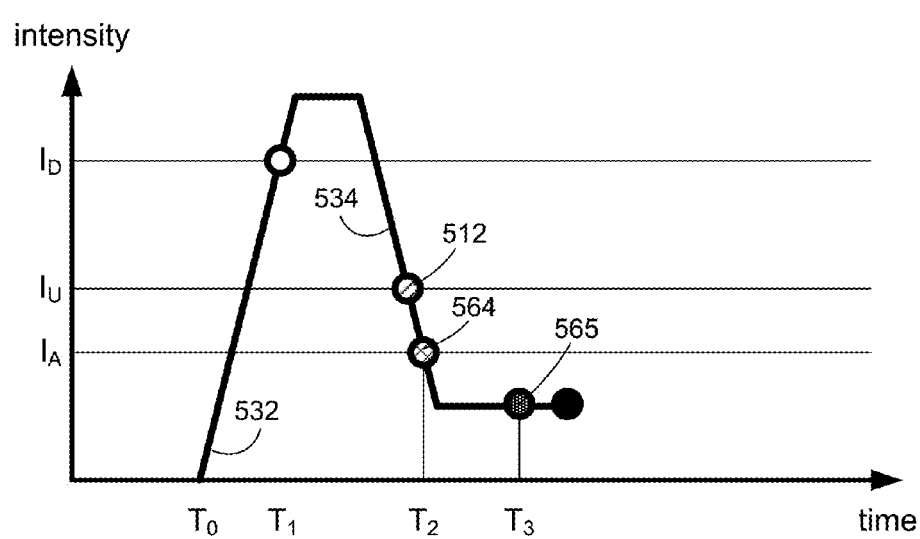

In FIG. 5Q, a touch input 525 detected (e.g., while an application user interface similar to the user interface illustrated in FIG. 5O is displayed on touch-sensitive display 112) on home button 204 has an intensity that changes over time, including a first increase in intensity 532, sometimes called a first down-click, followed by a first decrease 534 in intensity. Indicator 512 indicates the point in time at which the up-click detection criteria are met, and indicator 564 indicates the point in time at which the first decrease in intensity reaches the confirmation intensity threshold, $I_A$. In the example shown in FIG. 5Q, after reaching the confirmation intensity threshold, $I_A$, the input remains at an intensity below the confirmation intensity threshold, $I_A$, starting at time $T_2$ for a period of time that lasts at least the confirmation time threshold. A timeout period called the "fast timeout period" starts at time $T_2$, when the intensity of the input decreases below the confirmation threshold, $I_A$. When the duration of the fast timeout period reaches the confirmation time threshold, at time $T_3$, the input is confirmed to be a single click, as indicated by indicator 565. As a result of the fast timeout period reaching the confirmation time threshold, at time $T_3$ in the example in FIG. 5Q, the first operation (e.g., an operation associated with recognizing a single click) is performed, or performance of the first operation is initiated. As noted above, in these examples, the first operation includes ending display of the user interface of the application displayed prior to the single tap being received (e.g., an application user interface illustrated in FIG. 5O), and thus the display 112 of the electronic device transitions from displaying the user interface of a first application (e.g., a time application) to displaying a set of application launch icons in an application launching user interface.

Figure 5R:
Figure 5R:
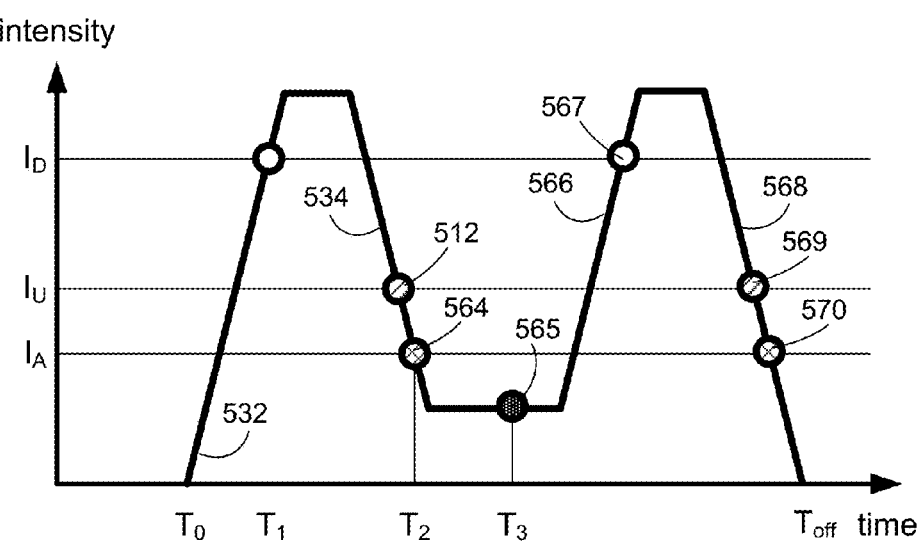

FIG. 5R illustrates a continuation of the input shown in FIG. 5Q. In this example, a second single tap is received by the electronic device, subsequent to confirmation (e.g., at time $T_3$) that the initial input was a single tap input and performance, or initiation of performance, of the first operation. In particular, the second single tap includes a second increase in intensity 566 that meets the down-click detection criteria, as indicated by indicator 567, and a second decrease in intensity 568 that meets the up-click detection criteria, as indicated by indicator 569. In this example, when the second single tap is detected, for example when the second decrease in intensity 568 meets the up-click detection criteria, another operation is performed. In the example shown in FIGS. 5Q and 5R, that operation includes scrolling from one screen of icons in an application launching user interface (as shown in FIG. 5Q), including a first set of application launch icons, to another screen of icons in the application launch user interface (as shown in FIG. 5R), including a second set of application launch icons that include application launch icons not in the first set of application launch icons.

It is noted that in the example shown in FIG. 5R, during the second decrease in intensity 568, the intensity also falls below the confirmation intensity threshold, $I_A$, as indicated by indicator 570. However, unless the electronic device is configured to detect, single click, double click and triple click inputs, the fact that the intensity has fallen below the confirmation intensity threshold, $I_A$, during the second decrease in intensity, may not trigger any additional actions by the electronic device. For further considerations in detecting multi-click gestures, see discussion of FIG. 5Y, below.

Figure 5S:
Figure 5S:
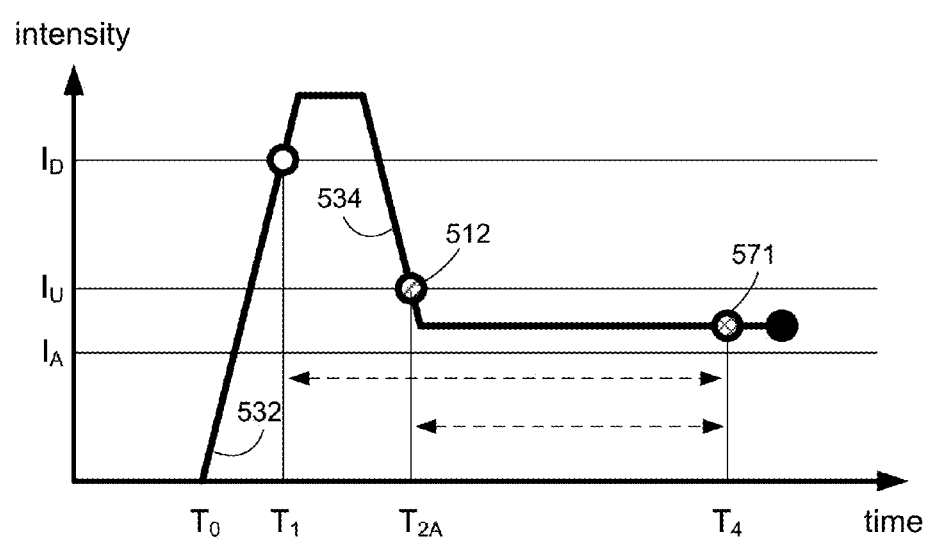

In FIG. 5S, a touch input 527 on home button 204 has an intensity that changes over time, including a first increase in intensity 532 and a first decrease in intensity 534 that decreases below an up-click intensity threshold $I_U$, at time $T_{2A}$, as indicated by indicator 512. After the intensity decreases below up-click intensity threshold $I_U$, which can be considered to be a first event, the intensity of touch input 527 remains at an intensity below the up-click intensity threshold $I_U$, but above below the confirmation intensity threshold, $I_A$. Performance of the first operation, in response to the first event, is delayed until a default delay time period elapses, for example at time $T_4$, as indicated by indicator 571. As noted above, in these examples, the first operation includes ending display of the user interface of the application displayed prior to the single tap being received, and thus the display 112 of the electronic device transitions from displaying the user interface of a first application (e.g., a time application) to displaying a set of application launch icons in an application launching user interface.

In some embodiments, a delay time is monitored or measured from the time at which a first down-click is detected, indicated as time $T_1$ in FIG. 5S. In some other embodiments, the delay time is measured from the time at which a first up-click is detected, indicated as time $T_{2A}$ in FIG. 5S. In some embodiments, measurement of the delay time stops and the measured delay time is reset to zero, if the intensity of the input increases above the up-click intensity threshold $I_U$ prior to the delay time reaching the default delay time period. The default delay time period is typically significantly longer than the early confirmation time threshold. For example, in some embodiments the default delay time period is a value between 300 ms and 500 ms while the early confirmation time threshold is a value between 100 ms and 200 ms.

Figure 5T:
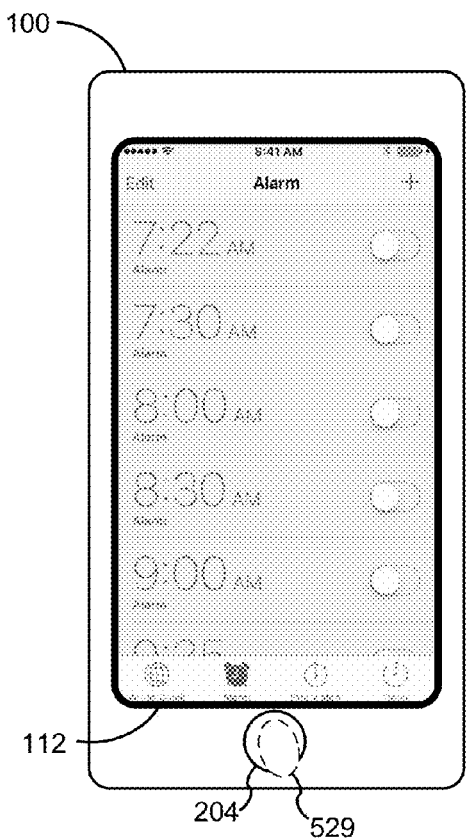
Figure 5T:
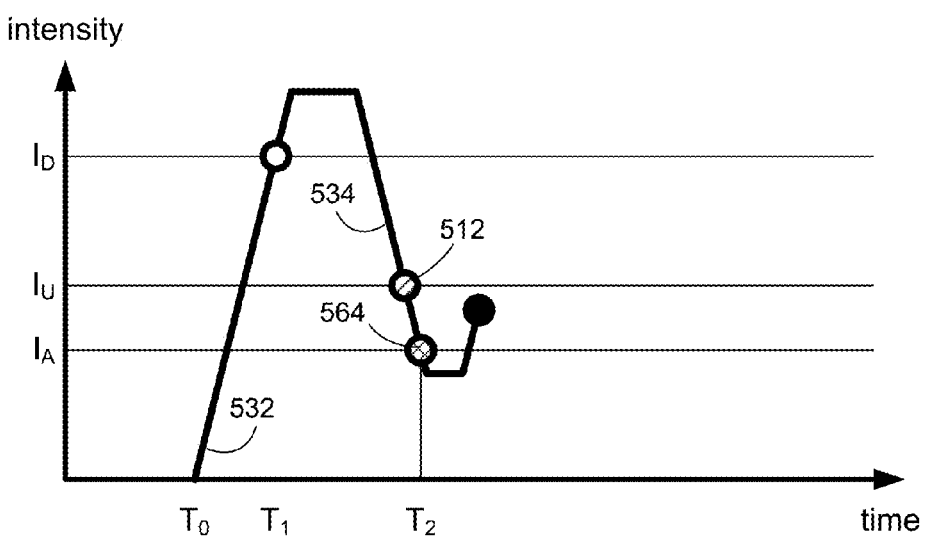
Figure 5U:
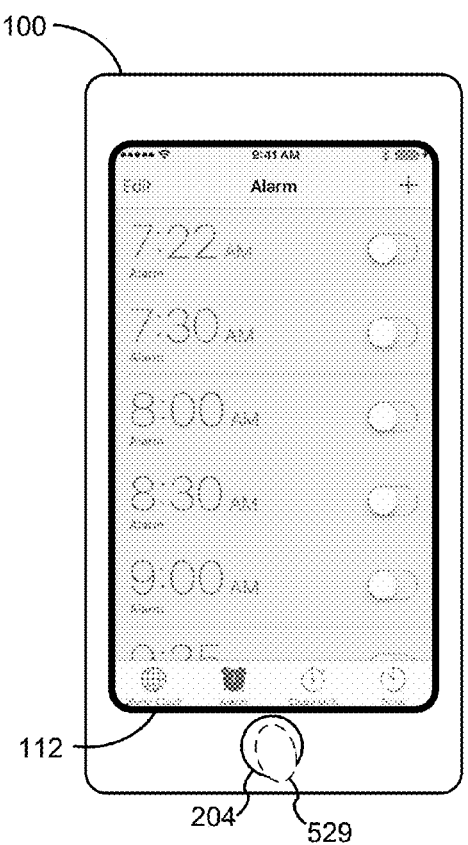
Figure 5U:
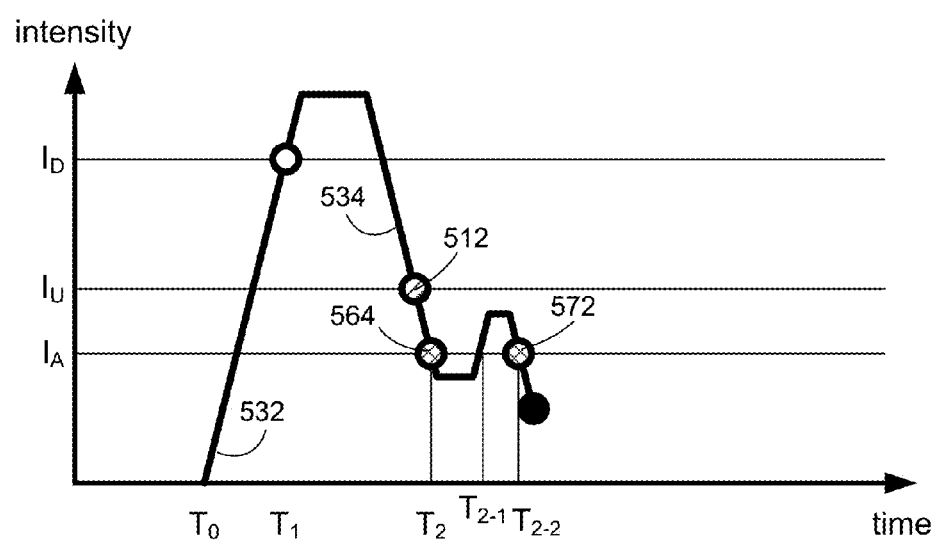
Figure 5V:
Figure 5V:
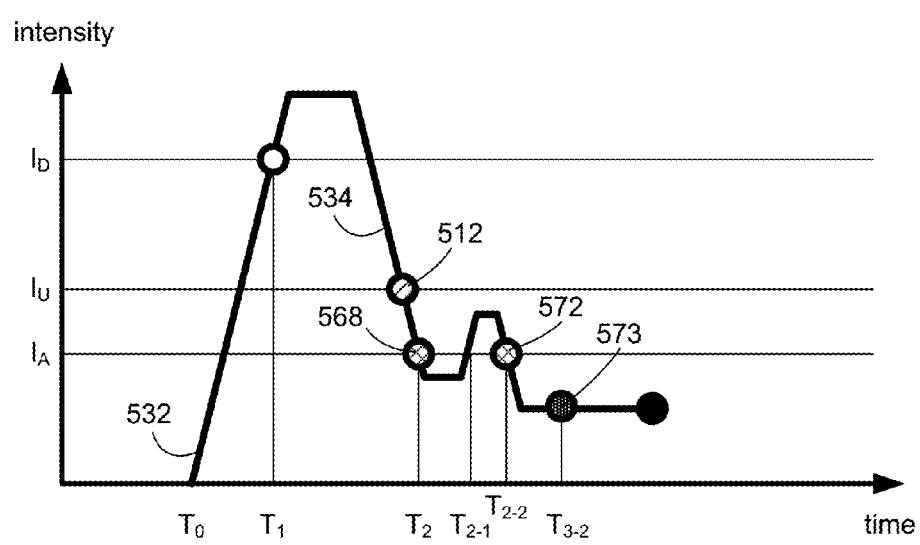

As shown in FIGS. 5T, 5U and 5V, in some embodiments the early confirmation criteria is satisfied when the cumulative amount of time that the intensity of the input is below the early confirmation threshold $I_A$ reaches the early confirmation time threshold. In the example shown in FIG. 5T, after the first increase in intensity 532 and first decrease in intensity 534, the intensity of the input decreases below the up-click intensity threshold $I_U$ and the early confirmation threshold $I_A$, at time $T_2$, as indicated by indicator 568, but then increases to a value above the early confirmation threshold $I_A$ at time $T_{2-1}$ without satisfying the early confirmation criteria. As shown in FIG. 5U, the intensity of the input again decreases below the early confirmation threshold $I_A$, as indicated by indicator 572, at time $T_{2-2}$, and then, as shown in FIG. 5V, remains below the early confirmation threshold $I_A$ until the cumulative amount of time that the input intensity has remained below the early confirmation threshold $I_A$ reaches the early confirmation time threshold, at time $T_{3-2}$, as indicated by indicator 573. Thus, at time $T_{3-2}$, the electronic device performs or initiates performance of the first operation. As noted above, in these examples, the first operation includes ending display of the user interface of the application displayed prior to the single tap being received, and thus the display 112 of the electronic device transitions from displaying the user interface of a first application (e.g., a time application) to displaying a set of application launch icons in an application launching user interface.

Figure 5W:
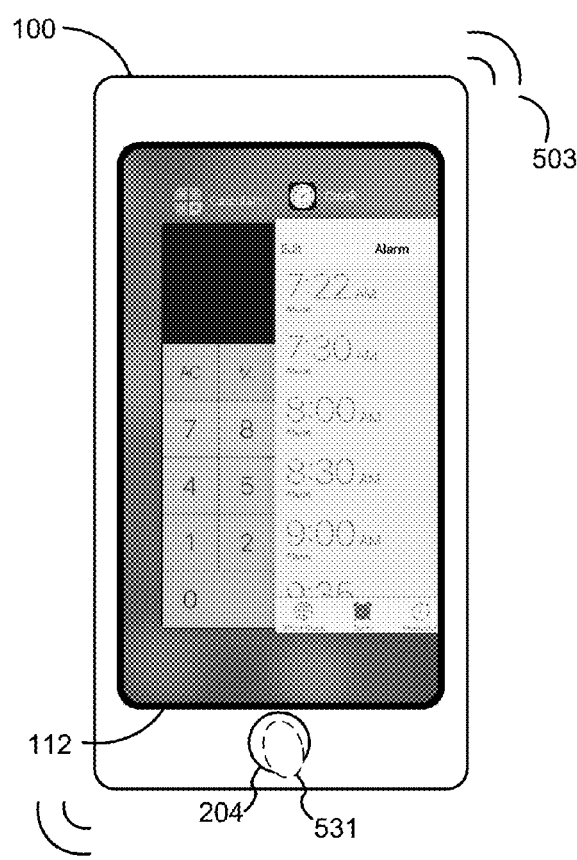
Figure 5W:
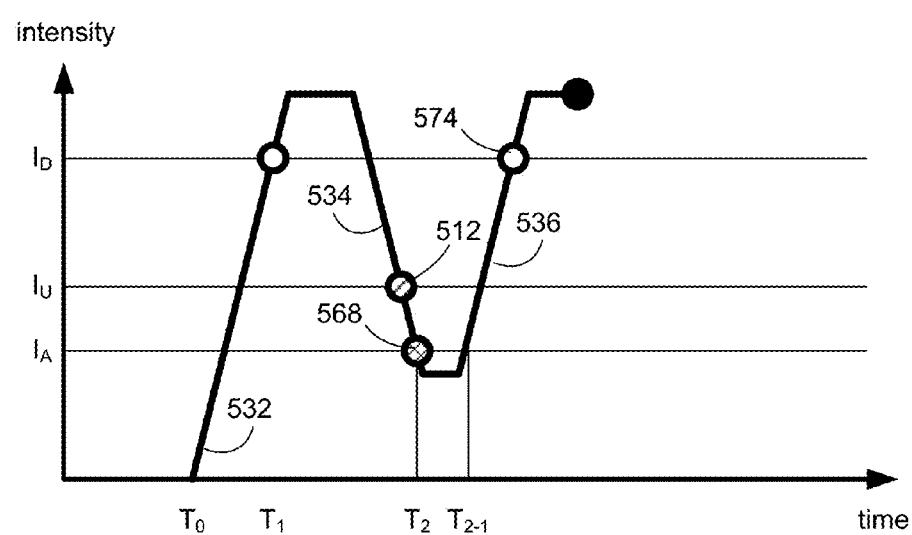

In FIG. 5W, a touch input 531 on home button 204 has an intensity that changes over time, including a first increase in intensity 532 and a first decrease in intensity 534 that decreases below an up-click intensity threshold $I_U$, as indicated by indicator 512, and then below early confirmation threshold $I_A$ at time T2, as indicated by indicator 568. The input then continues with a second increase in intensity 536 to an intensity above the down-click intensity threshold $I_D$ (or alternatively to an intensity above a second down-click intensity threshold $I_{D2}$ as shown in FIG. 5G), as indicated by indicator 574. The second increase in intensity 536 occurs prior to expiration of the default delay time period, and also prior to the intensity of the input satisfying the early confirmation criteria, and therefore the electronic device recognizes the second input event (e.g., a double click), and the first operation is not performed. In the example shown in FIG. 5W, the time period from time $T_2$, when the intensity falls below the early confirmation intensity threshold $I_A$ to time $T_{2-1}$, when the intensity rises above the early confirmation threshold $I_A$, is less than the early confirmation time threshold.

Instead, in response to the second increase in intensity 536 to an intensity above the down-click intensity threshold $I_D$, the electronic device transitions from displaying a previous user interface, such as the user interface of an application (as shown in FIG. 5O), to a displaying multitasking user interface, as shown in FIG. 5W.

Optionally, a tactile output 503, is generated in conjunction with the electronic device recognizing the second input event (e.g., detecting that the second increase in intensity 536 continues to an intensity above the down-click intensity threshold prior to expiration of the default delay time period). In some embodiments, tactile output 503 is a tactile output having the MiniTap (270 Hz) tactile output pattern, FIG. 4F).

Figure 5X:
Figure 5X:
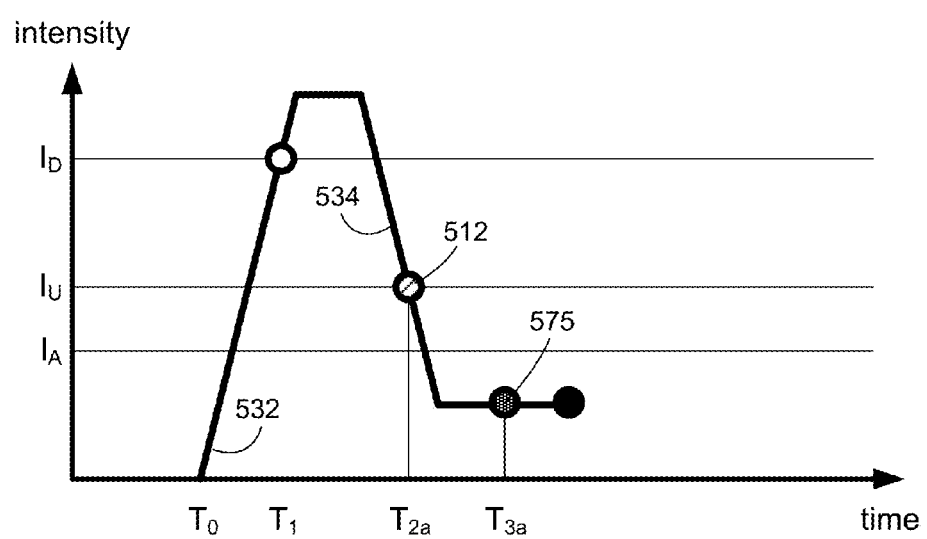

As shown in FIG. 5X, a touch input 533 on home button 204 has an intensity that changes over time, including a first increase in intensity 532 and a first decrease in intensity 534 that decreases below an up-click intensity threshold $I_U$, as indicated by indicator 512, and then below early confirmation threshold $I_A$. In some embodiments, measurement of the delay time (used for delaying performance of a first operation corresponding to a single click input), starts from a time at which the intensity of the input decreases below an up-click intensity threshold $I_U$, and continues to be measured so long as the input remains below the up-click intensity threshold $I_U$. Alternatively, in some embodiments, measurement of the delay time starts from a time at which the intensity of the input increases above a down-click intensity threshold $I_D$, as shown in FIG. 5S, and once an up-click is detected, continues to be measured so long as the intensity of the input 533 remains below the up-click intensity threshold $I_U$.

Figure 5Y:
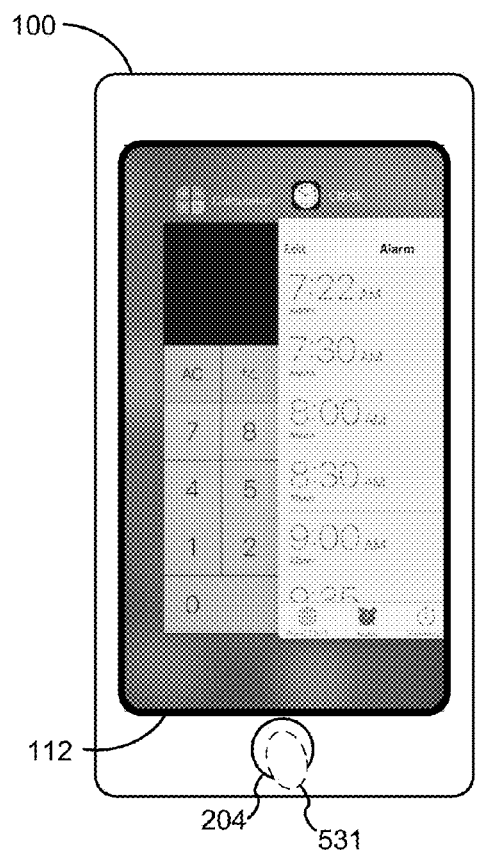
Figure 5Y:
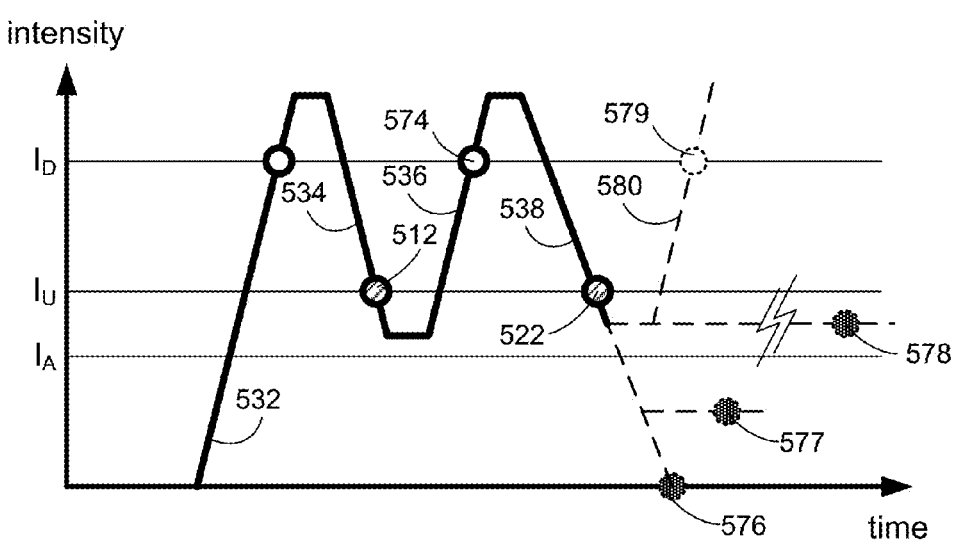

In FIG. 5Y, the electronic device determines whether the intensity of a touch input 531 satisfies double click criteria or triple click criteria, and thus determines whether the input is a double click or triple click. The touch input 531 (also shown in FIG. 5W) on home button 204 has an intensity that changes over time, including a first increase in intensity 532 and a first decrease in intensity 534 that decreases below an up-click intensity threshold $I_U$, as indicated by indicator 512, and then below early confirmation threshold $I_A$ at time T2, as indicated by indicator 568. Input 531 then continues with a second increase in intensity 536 to an intensity above the down-click intensity threshold $I_D$ (or alternatively to an intensity above a second down-click intensity threshold $I_{D2}$ as shown in FIG. 5G), as indicated by indicator 574, and a second decrease in intensity 538 to an intensity below the up-click intensity threshold $I_U$, as indicated by indicator 522.

At this point the intensity of input 531 has followed the changes required for a double click. Subsequent to this point, four possible continuations of input 531 are shown in FIG. 5Y. One possibility shown in FIG. 5Y is liftoff or discontinuation of the touch input 531, as indicated by indicator 576, which in some embodiments is sufficient to satisfy double click detection criteria.

A second possibility shown in FIG. 5Y is that the intensity of touch input 531 falls below and remains below the early confirmation threshold $I_A$ for at least an early confirmation time threshold, as indicated by indicator 577, and thereby satisfies the double click detection criteria. A third possibility shown in FIG. 5Y is that the intensity of touch input 531 falls below and remains below the up-click intensity threshold $I_U$ (and above the early confirmation threshold $I_A$) for at least a default delay time threshold, as indicated by indicator 578, and thereby satisfies the double click detection criteria. The electronic device, in response to detecting that input 531 satisfies the double click detection criteria, performs or initiates performance of a second operations, such as transitioning from a prior user interface to a multitasking user interface, as shown in FIG. 5Y.

A fourth possibility shown in FIG. 5Y is that, subsequent to the second decrease in intensity 538, and without touch input 531 satisfying the double click detection criteria, the intensity of touch input 531 has a third increase in intensity 580, during which the intensity increases above the down-click intensity threshold $I_D$ (or alternatively increases above a respective down-click intensity threshold $I_D$ that is based on historic intensity of the touch input 531), as indicated by indicator 579, and thereby satisfies triple click detection criteria. The electronic device, in response to detecting that input 531 satisfies the triple click detection criteria, performs or initiates performance of a third operation, such as transitioning from a prior user interface to a predefined user interface (e.g., a device settings interface) or transitioning into an accessibility mode. When there is a triple click operation that is configured to be detected in response to a change in intensity of a contact on the home button, the device optionally imposes a delay in detecting the double click operation after detecting the second up-click to ensure that a triple click will not be detected. The delay in detecting the double click optionally operates in a similar fashion to the delay in detecting a single click described above with reference to FIGS. 5O-5Y.

Figure 5Z:
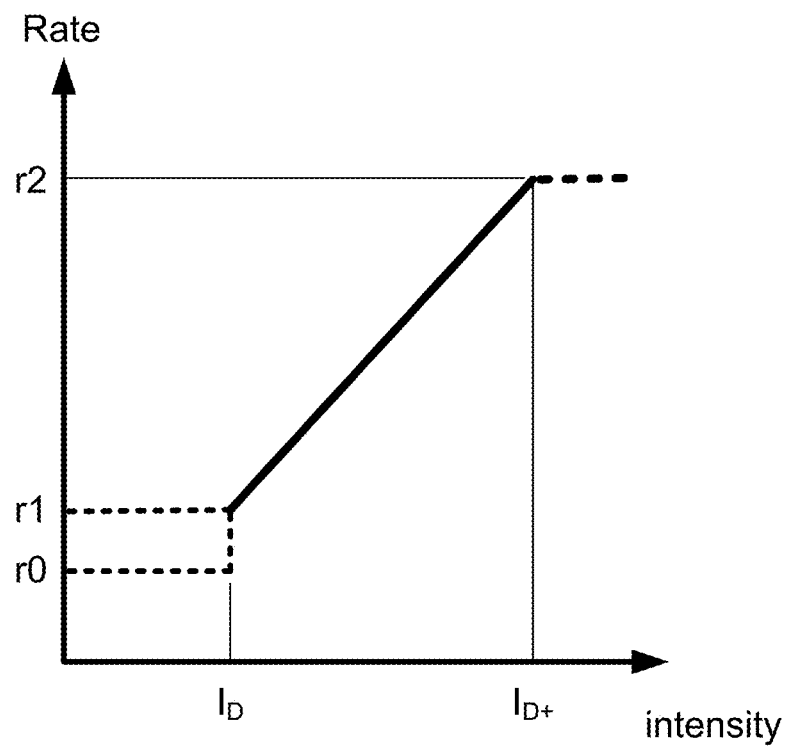
Figure 5A:
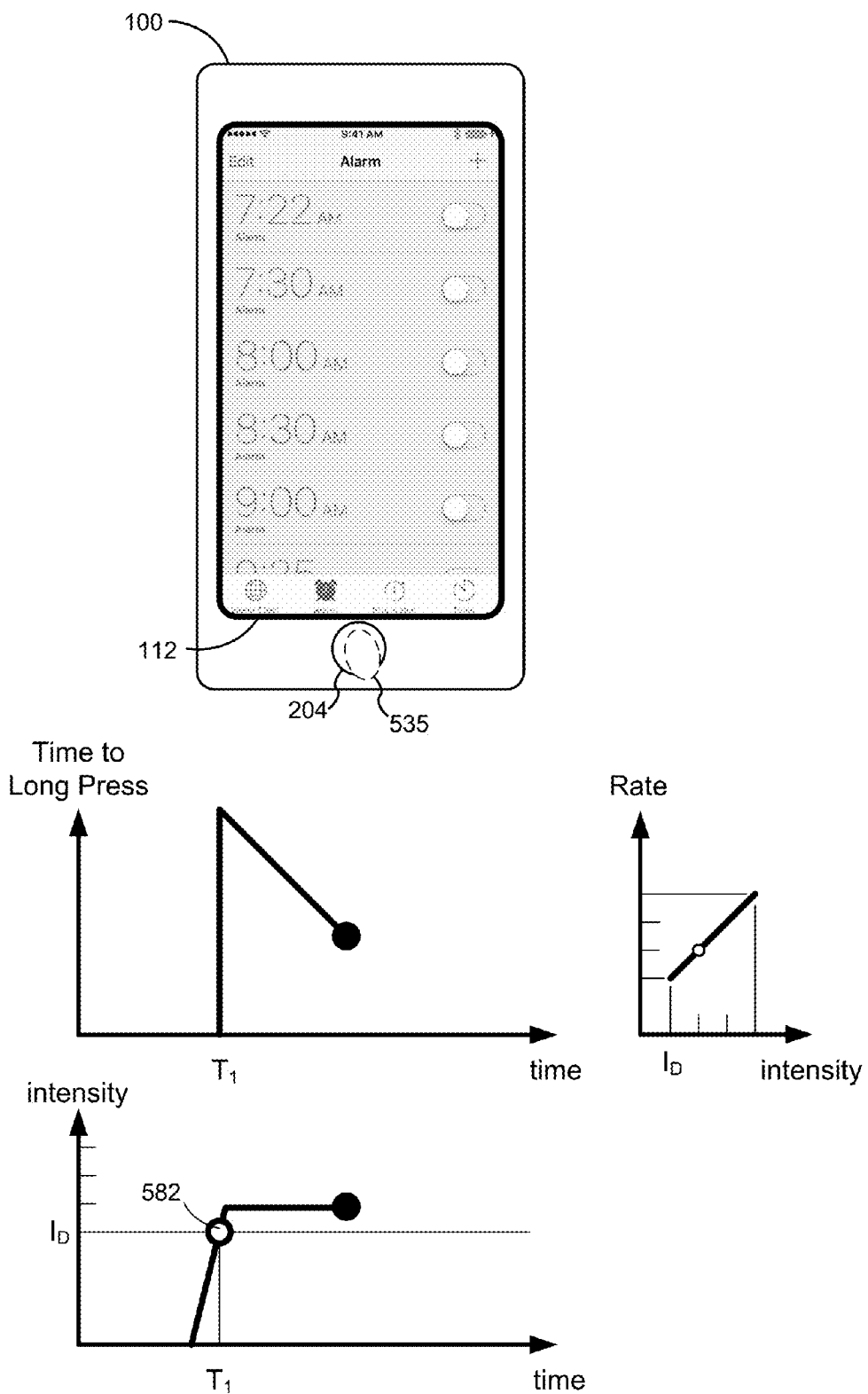
Figure 5B:
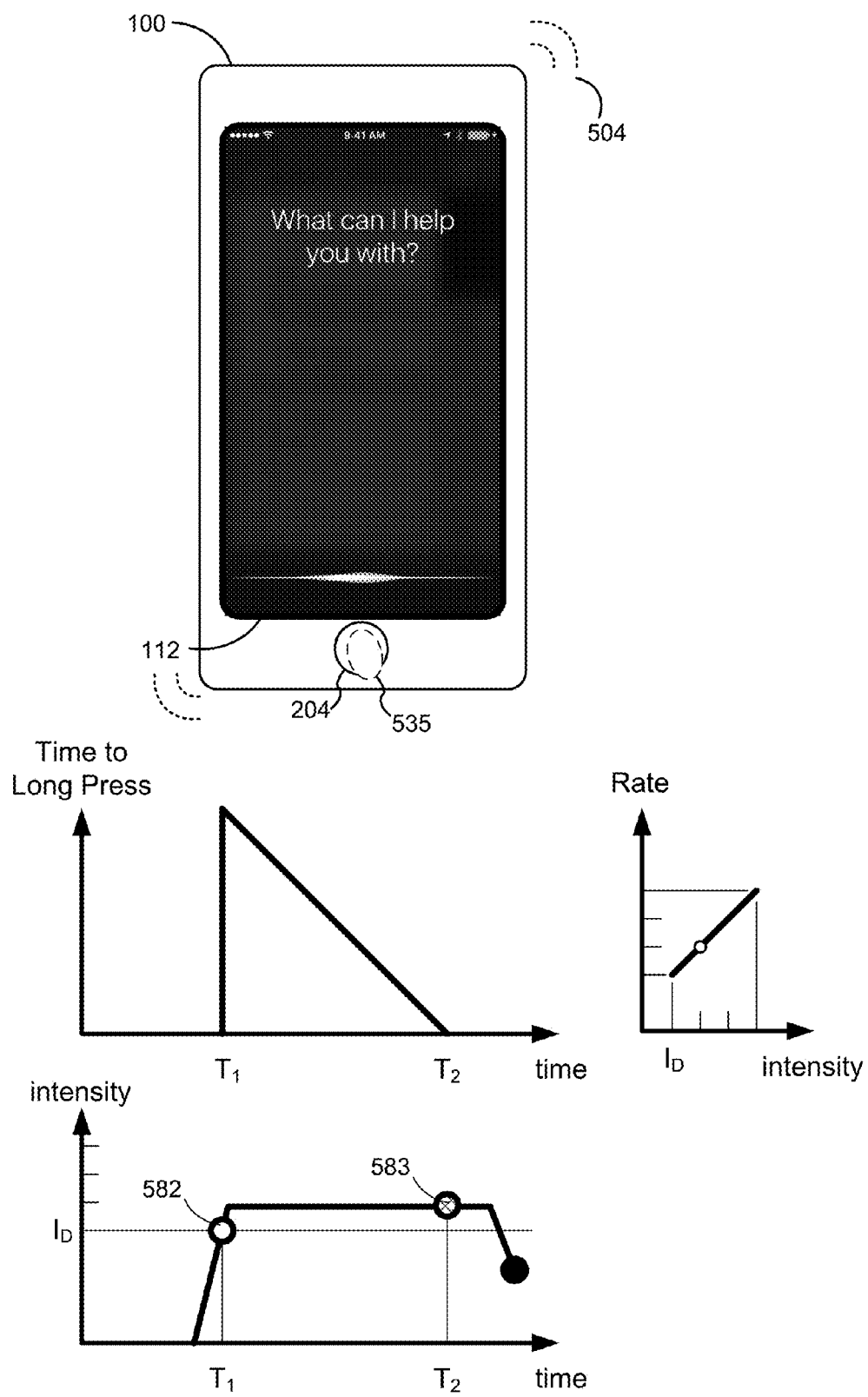
Figure 5C:
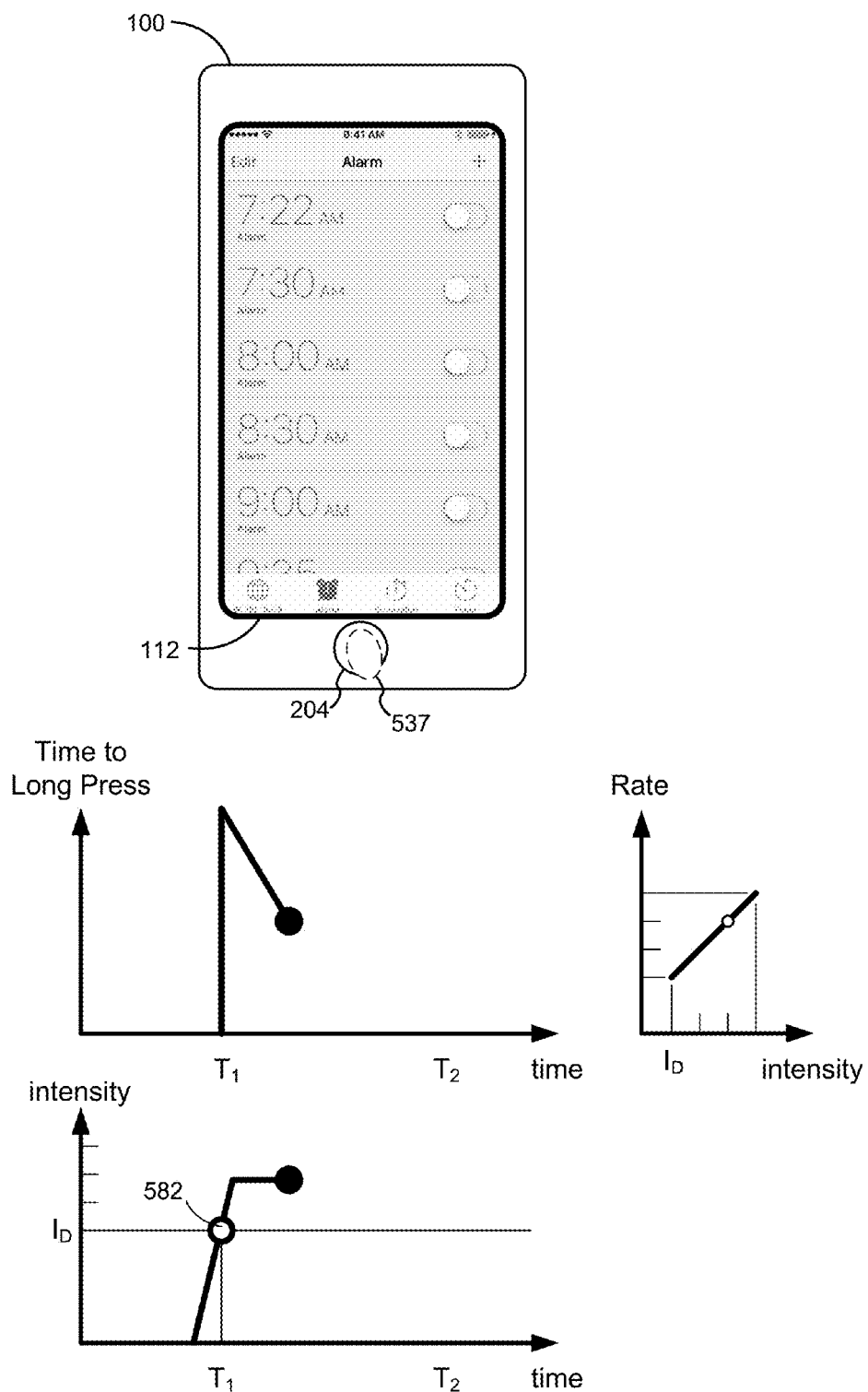
Figure 5D:
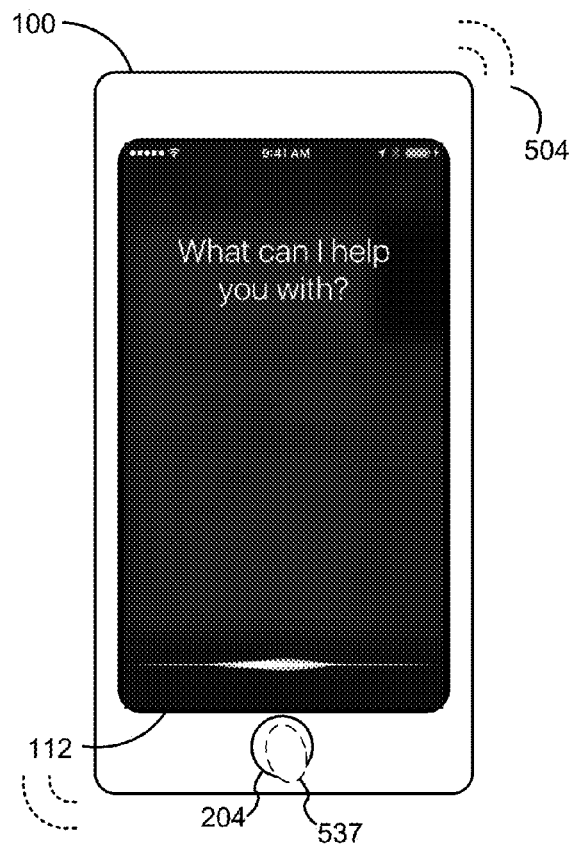
Figure 5D:
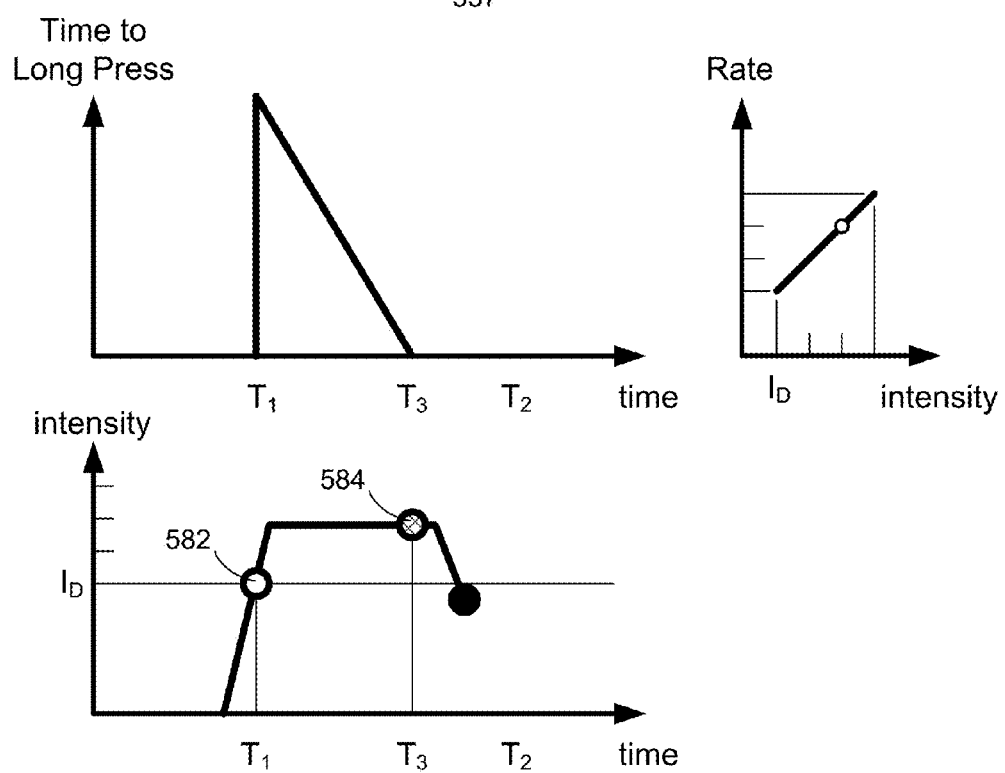
Figure 5E:
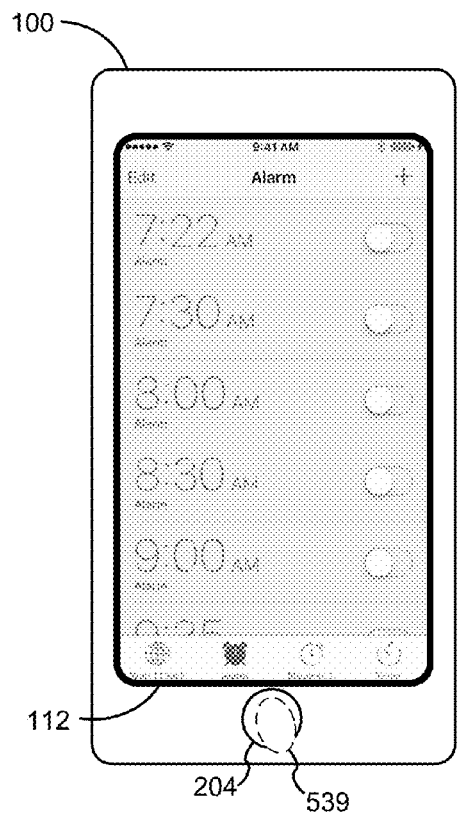
Figure 5E:
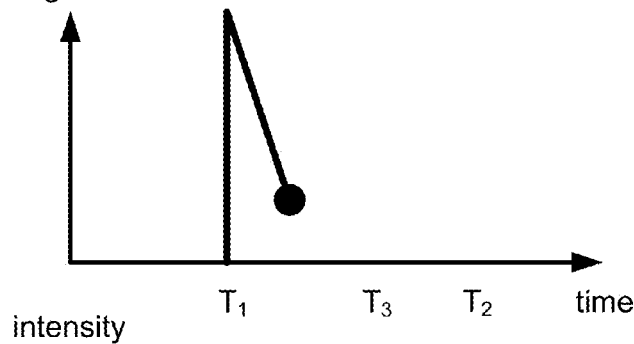
Figure 5E:
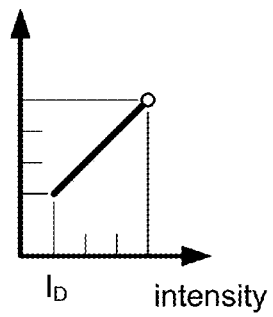
Figure 5E:
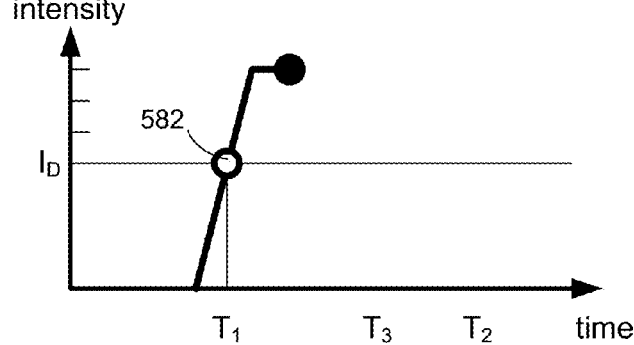
Figure 5F:
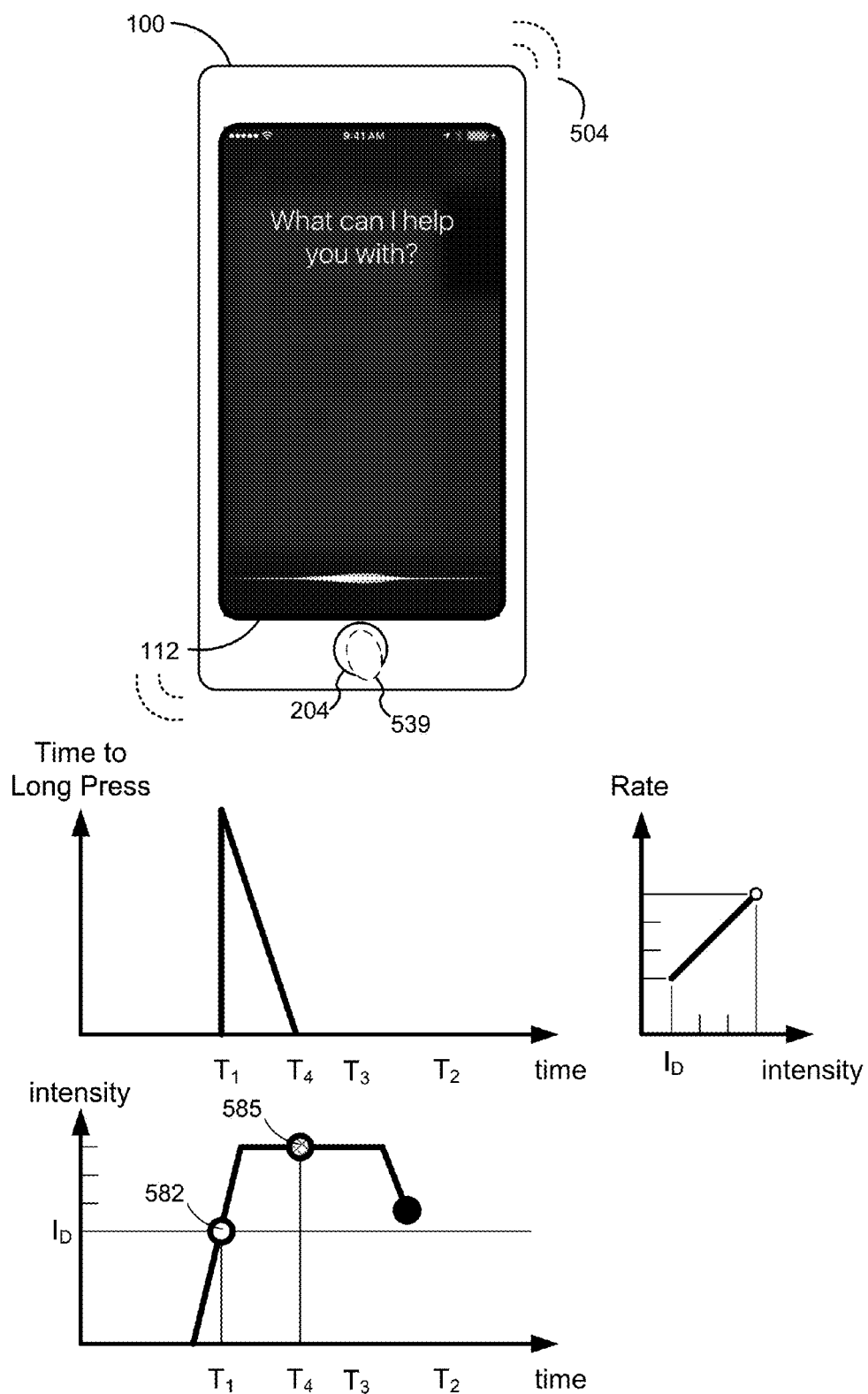
Figure 5G:
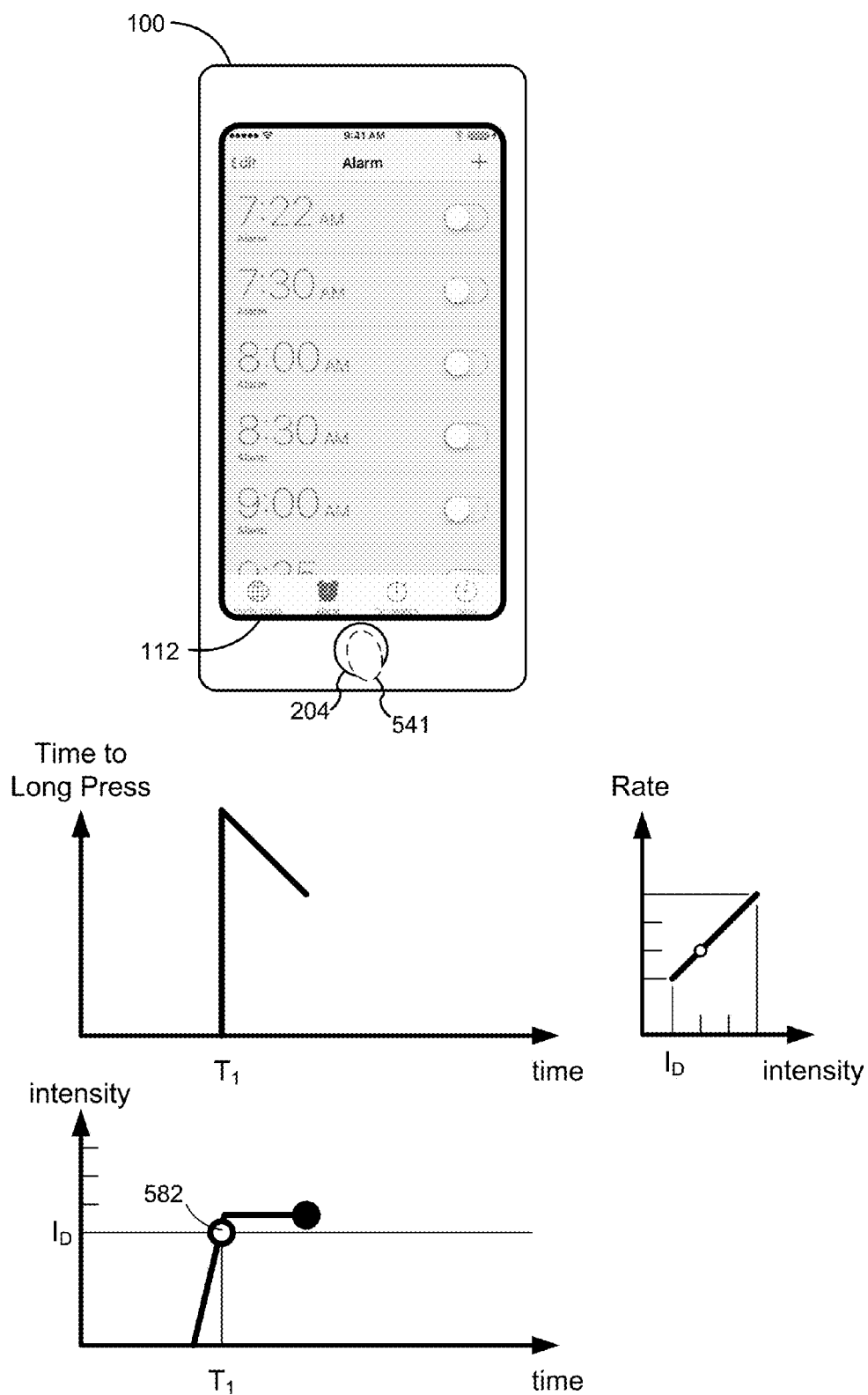
Figure 5H:
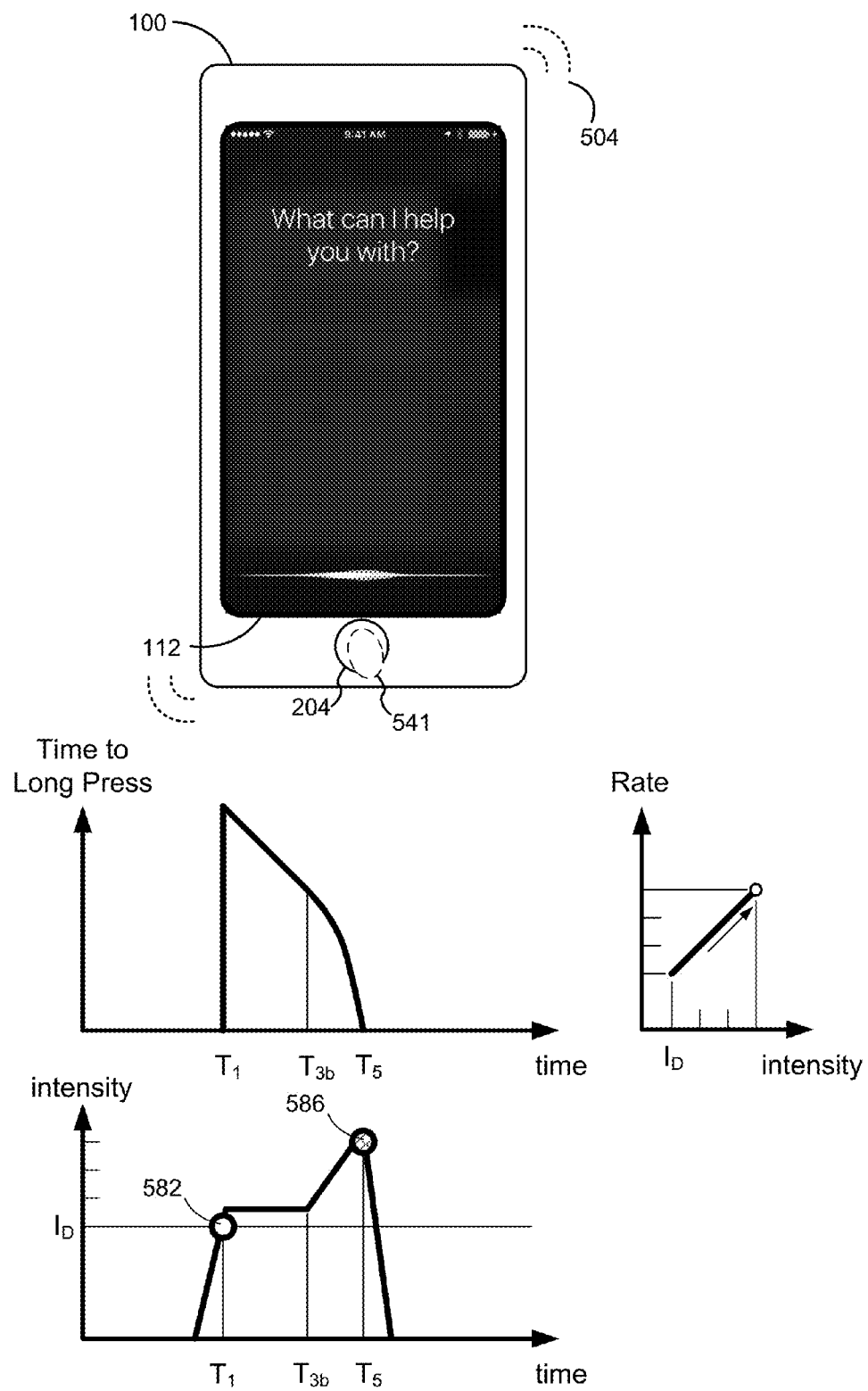
Figure 5I:
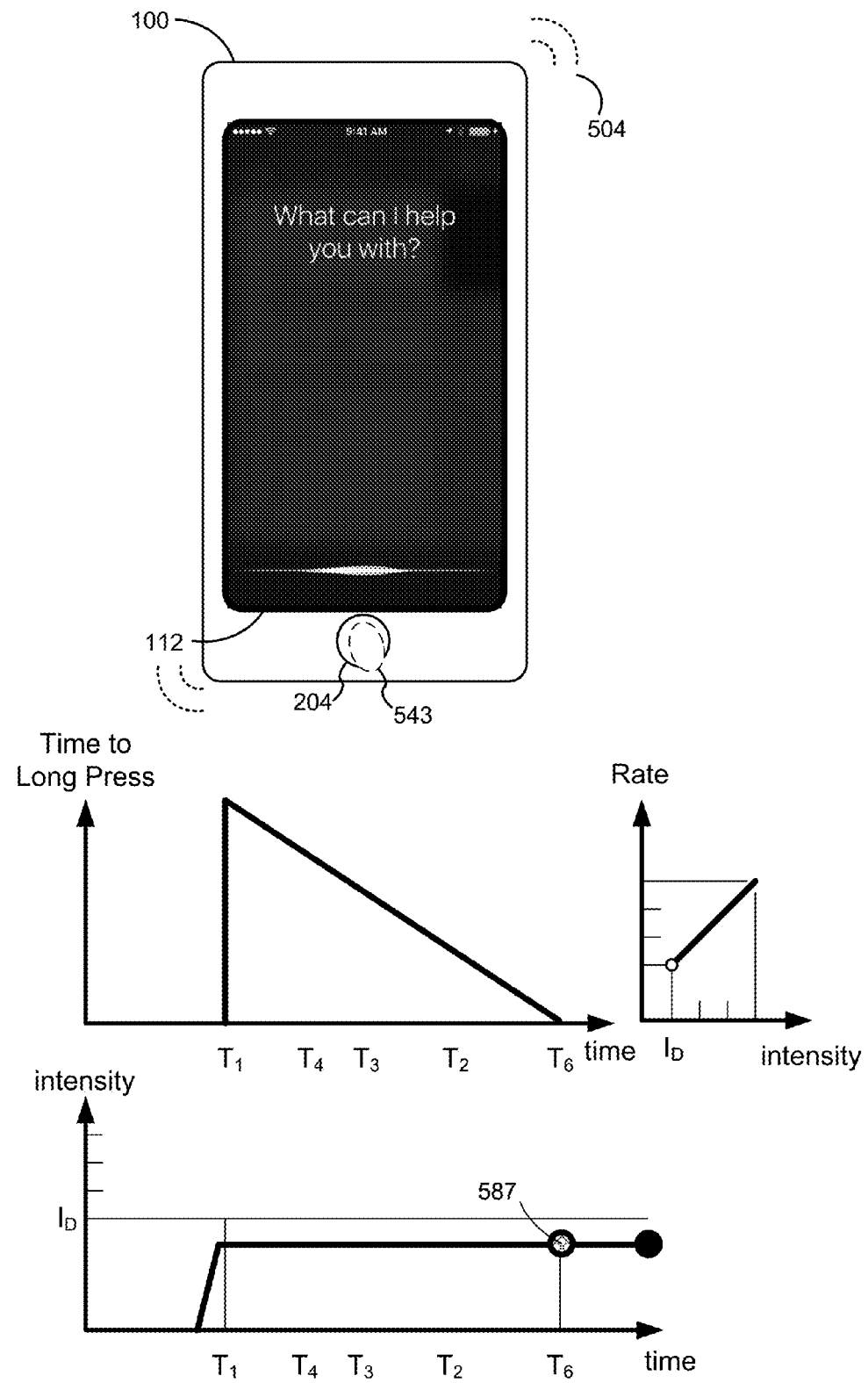
Figure 6B:
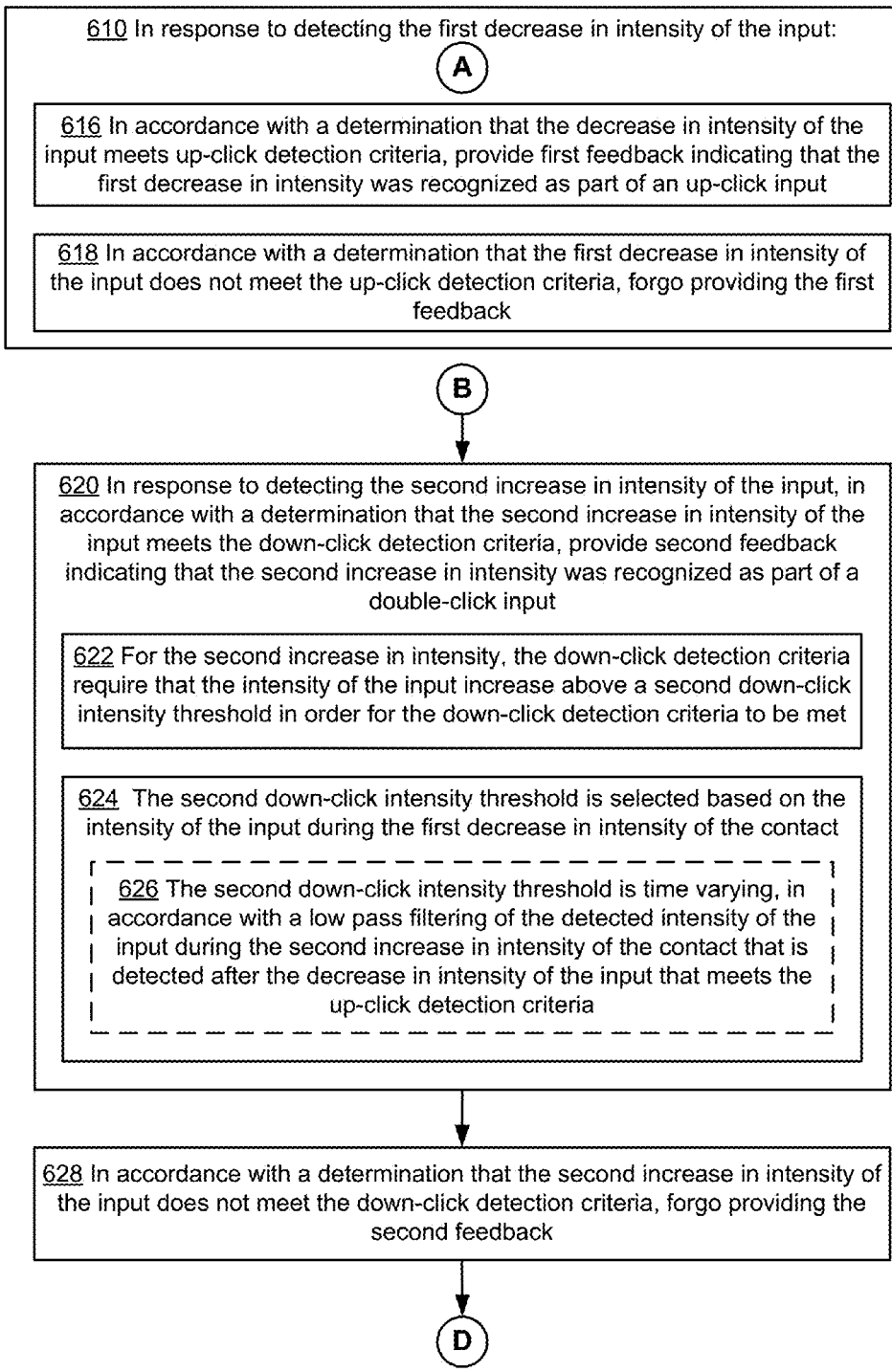
Figure 6E:
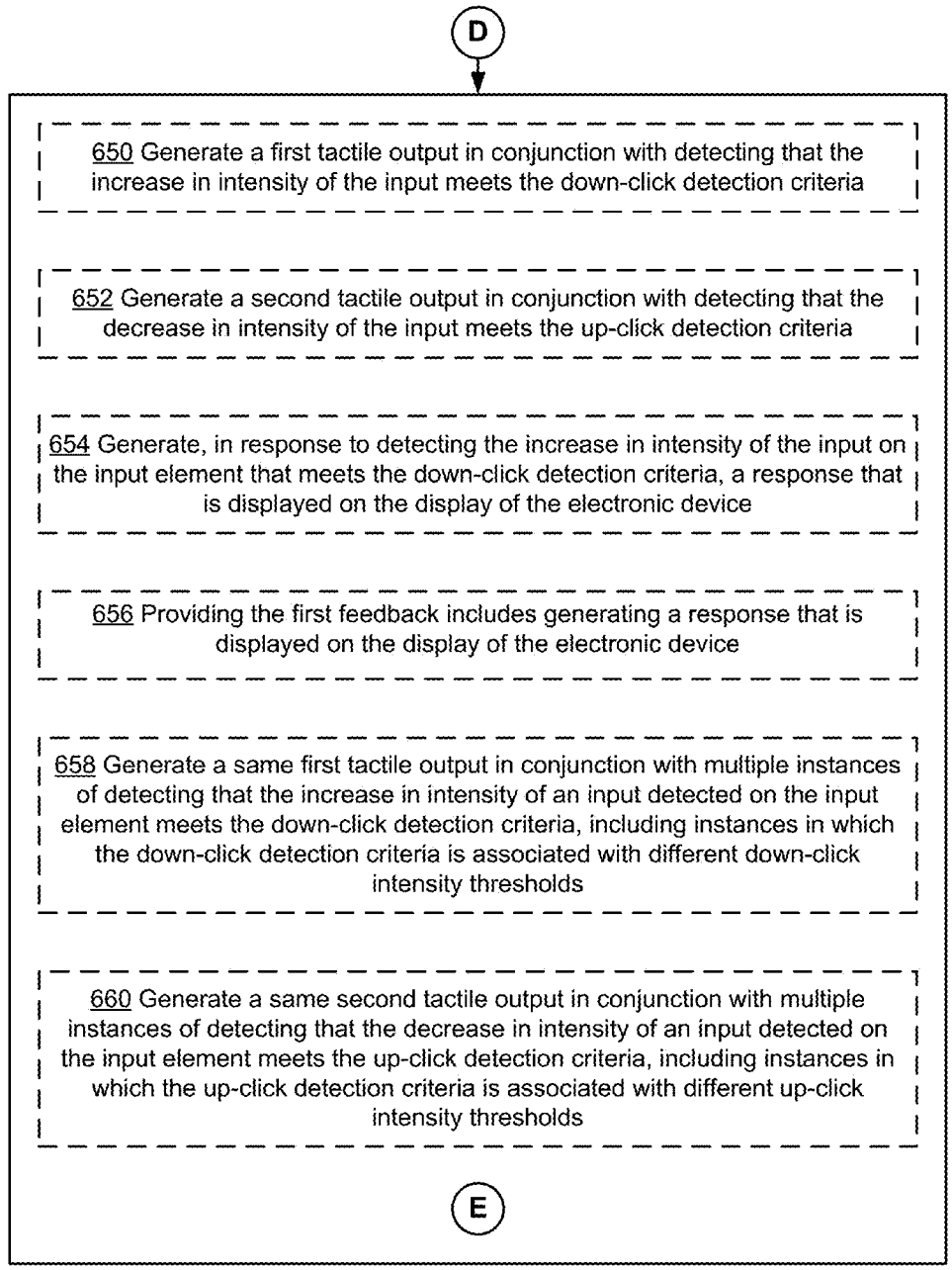
Figure 7B:
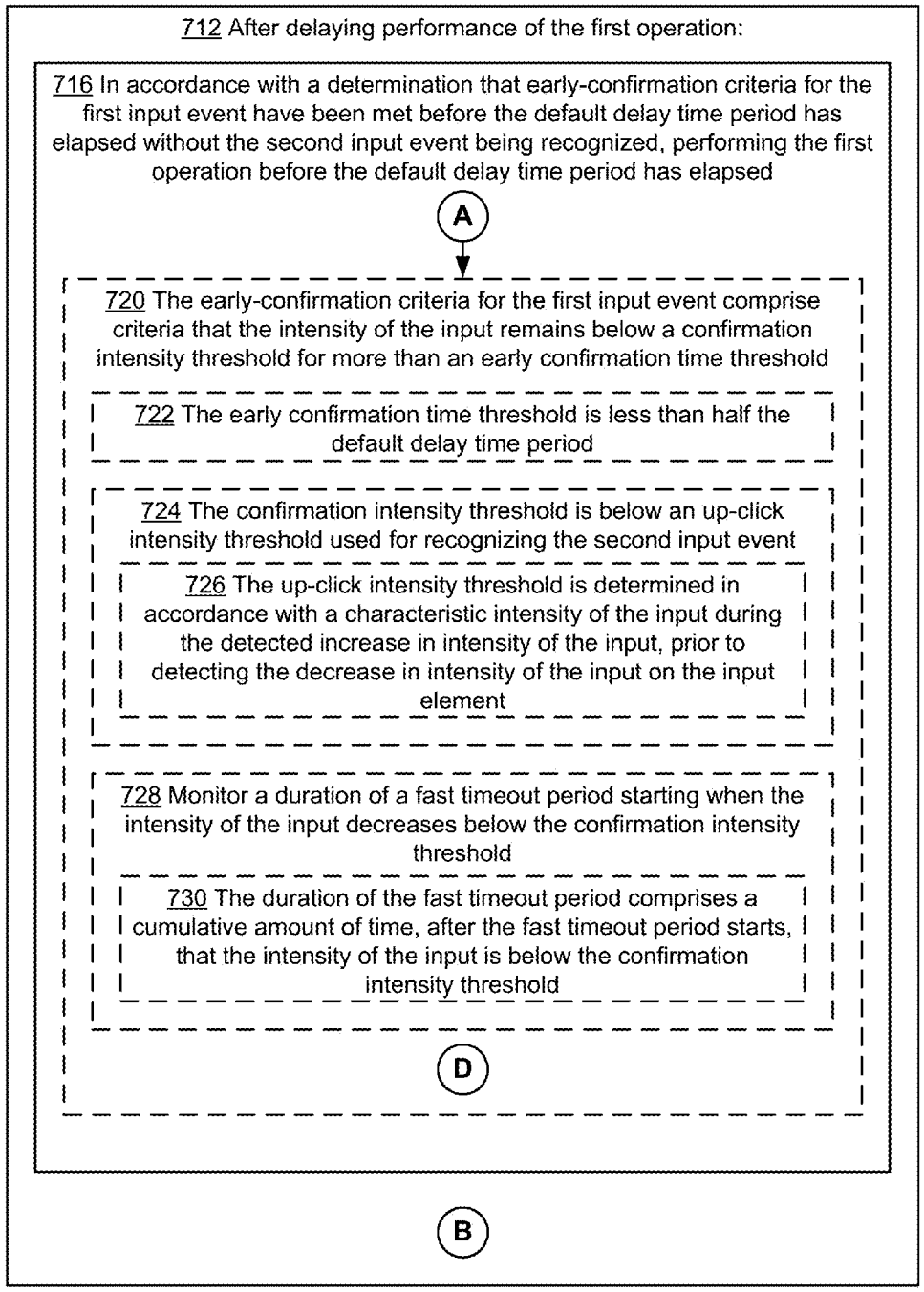
Figure 7D:
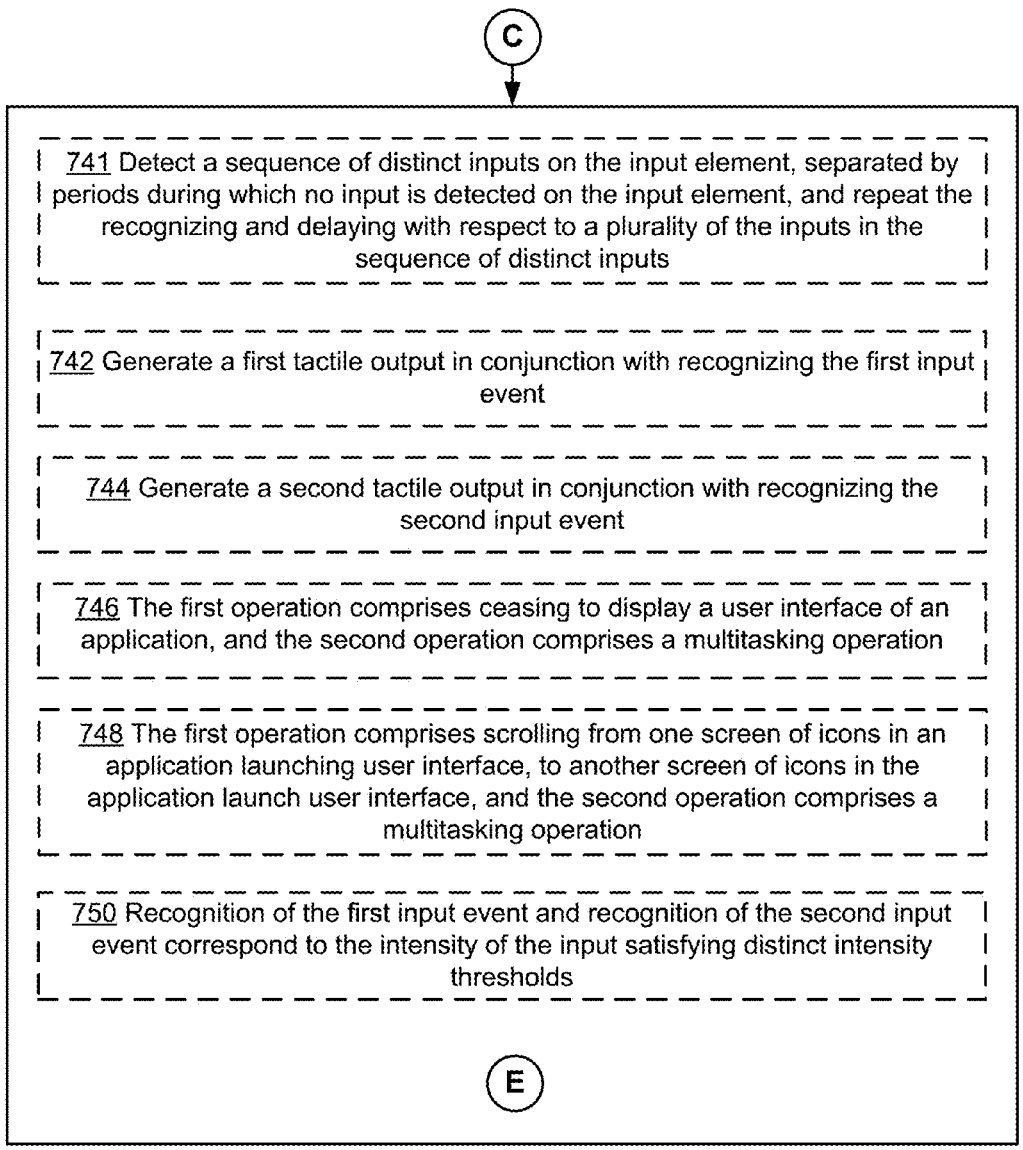
Figure 7E:
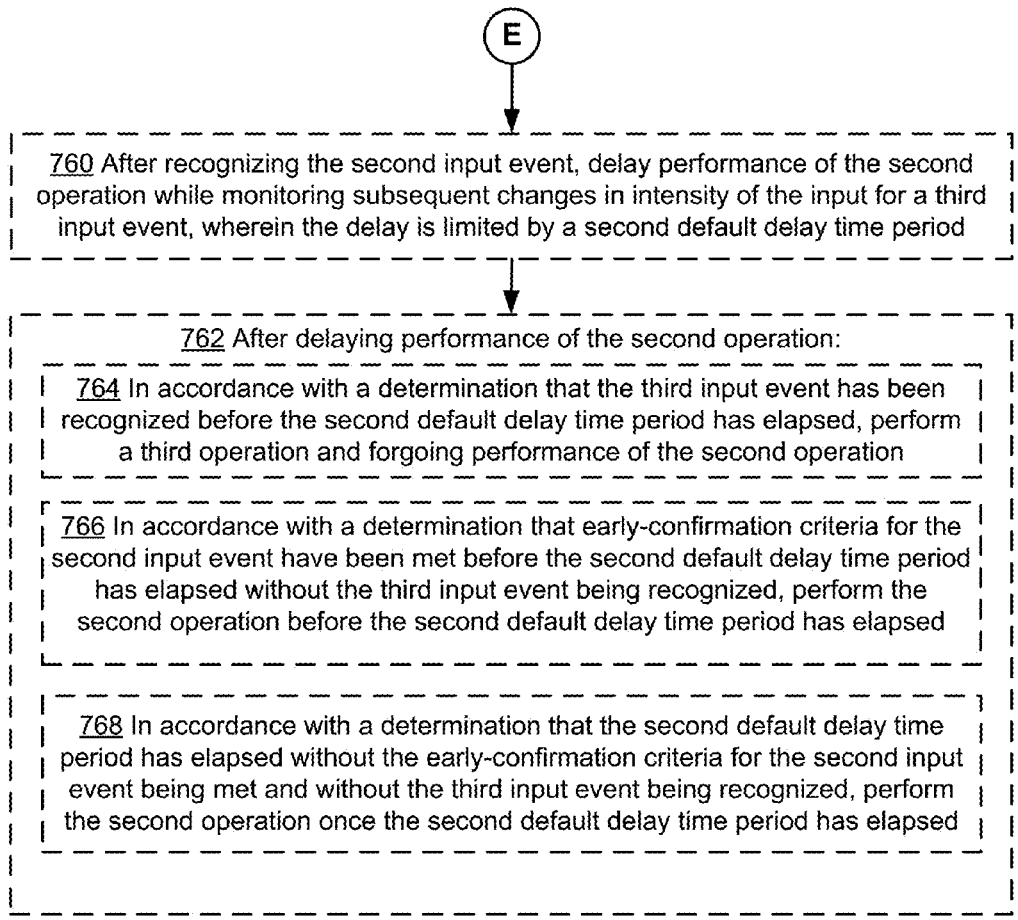

FIGS. 5Z-5II depict touch inputs scenarios in which the length of time in which it takes to recognize a "long press" depends on the intensity of the touch input. For example, if the default time for recognizing a long press input is, say, 500 ms, in accordance with some embodiments, the time for recognizing an input as a long press input decreases to 400 ms or even 300 ms if the intensity of the input reaches predefined or corresponding intensity levels.

FIG. 5Z shows a graph in which a rate, sometimes called a recognition rate or timer rate, changes with the intensity of an input. More specifically, when the intensity is below a first down-click intensity threshold $I_D$, the rate is a default rate, $r_0$. When the intensity is between the first down-click intensity threshold $I_D$ and a second down-click intensity threshold $I_{D+}$, the rate changes from a first rate, $r_1$ to a second rate $r_2$. In some embodiments, the rate changes linearly from the first rate, $r_1$ to the second rate $r_2$ as the intensity of the input changes from $I_D$ to $I_{D+}$. However, in some embodiments, the rates changes from the first rate $r_1$ to the second rate $r_2$ in a number of discrete steps, such as one or more steps, two or more steps, or three or more steps, as the intensity of the input changes from $I_D$ to $I_{D+}$.

In some embodiments, a timeout timer or counter is updated at periodic intervals in accordance with the current rate, as determined by the current or most recently measured input intensity. For example, in some embodiments, the timeout timer or counter is updated as indicated by pseudo-code representation in Table 1, of a timeout timer update function.

TABLE 1

Timeout Timer Update Function

```
timeout_value = start_value // e.g., 500 ms /
// e.g., repeat the following steps every 20 millisecond //
Repeat every N milliseconds until timeout_value ≤ 0 {
  timeout_value = timeout_value − rate (current_intensity)
  If current_intensity = 0 {
    return}
  }
Return timeout_event
```

In Table 1, "timeout_value" is the current value of the timer; start_value is the default timeout period, such as 500 ms; current_intensity is the current intensity, or last measured intensity, of the input; rate(current_intensity) is the rate function, which maps the current intensity to a rate, one example of which is shown in FIG. 5Z; and timeout_event is an event that is delivered to a respective software module, such as contact/motion module 130, or any of applications 136, when the timer "times out" (i.e., when the timeout_value reaches or falls below zero). In some embodiments, the timeout timer update function is first called when the intensity of the input reaches a predefined intensity threshold, such as the first down-click intensity threshold $I_D$, and thus the timeout_value of the timeout timer is initialized to the default timeout period when the intensity of the input reaches the predefined intensity threshold.

The amount of time that the timeout timer or counter takes to expire, and then issue a timeout event, varies depending on the intensity of the input. Also, in some embodiments, if the intensity of the input satisfies (e.g., reaches or falls below) an up-click intensity threshold, the timeout function terminates, without issuing a timeout event. For example, in some embodiments, the intensity of the input satisfies the up-click intensity threshold if there is liftoff of the contact. In some embodiments, the up-click intensity threshold is a dynamic intensity threshold as described above with reference to FIGS. 5A-5N.

In FIG. 5AA, electronic device 100 receives a touch input 535 on home button 204, the touch input having a measured or detected intensity, and displays a user interface on display 112. In this example, the displayed user interface is the user interface of an application. FIG. 5AA includes a first graph showing the intensity of an input 535 over a period of time, a second graph showing the value of the aforementioned timeout timer over the same period of time, and a third graph showing the timer rate during the same period of time, which is a function of the input intensity.

In FIG. 5AA, when the intensity of input 535 reaches, or rises above, the first down-click intensity threshold $I_D$, at time $T_1$ as indicated by indicator 582, the timeout timer is initialized to a starting value, such as the default timeout time for detecting a long press. Furthermore, the intensity of input 535 remains above the first down-click intensity threshold $I_D$, and the value of the timeout timer decreases at a rate determined by the intensity of input 535. Since, in this example, the intensity of input 535 remains constant during this period of time, the timeout timer decreases at a constant rate determined by the intensity of input 535.

In the example shown in FIG. 5BB, the intensity of input 543 remains constant from time $T_1$ through time $T_2$, as indicated by indicator 583, and at time $T_2$ the value of the timeout time reaches zero, indicating that the timeout period for detecting a long press has expired, sometimes called detecting a long press. Furthermore, as shown in FIG. 5BB, once the period for detecting a long press has expired, electronic device 100 performs an operation (e.g., transitioning to a user assistance user interface) in accordance with a corresponding determination. In some embodiments, the aforementioned determination includes a determination that the intensity of the input did not satisfy up-click detection criteria prior to expiration of the timeout period. Furthermore, in some, the operation performed when a long press is detected includes generating a tactile output 504. In some embodiments, tactile output 504 is a tactile output having the FullTap (125 Hz) tactile output pattern, FIG. 4F).

In contrast to FIG. 5BB, in FIG. 5II, electronic device 100 receives a touch input 543 on home button 204, the touch input having a measured or detected intensity, and displays a user interface on display 112 (not shown in FIG. 5II, but can be seen in FIG. 5AA). FIG. 5II includes a first graph showing the intensity of an input 543 over a period of time, a second graph showing the value of the aforementioned timeout timer over the same period of time, and a third graph showing the timer rate during the same period of time, which is a function of the input intensity.

In FIG. 5II, the intensity of input 543 remains below the first down-click intensity threshold $I_D$, through the time period from time $T_1$ to time $T_6$, as indicated by indicator 587. The timeout timer is initialized to a starting value, such as the default timeout time for detecting a long press. Furthermore, since the intensity of input 535 remains below the first down-click intensity threshold $I_D$, the value of the timeout timer decreases at a default rate. Since, in this example, the intensity of input 535 remains below the first down-click intensity threshold $I_D$ during this period of time, the value of the timeout timer decreases at a constant, default rate, and thus expires after a default time period, represented in FIG. 5II by the time from $T_1$ to $T_6$.

Furthermore, as shown in FIG. 5II, once the default time period for detecting a long press has expired, electronic device 100 performs an operation (e.g., transitioning to a user assistance user interface) in accordance with a corresponding determination. In some embodiments, the aforementioned determination includes a determination that the intensity of the input did not satisfy up-click detection criteria prior to expiration of the default timeout period. Furthermore, in some, the operation performed when a long press is detected includes generating a tactile output 504. In some embodiments, tactile output 504 is a tactile output having the FullTap (125 Hz) tactile output pattern, FIG. 4F).

In FIG. 5CC, electronic device 100 receives a touch input 537 on home button 204, the touch input having a measured or detected intensity, and displays a user interface on display 112. In this example, the displayed user interface is the user interface of an application. FIG. 5CC is similar to FIG. 5AA, except that the intensity of touch input 537 is higher, or has greater magnitude, than touch input 535 in FIG. 5AA. As a result, the timer rate in the example shown in FIG. 5CC is higher or greater than the timer rate in the example shown in FIG. 5AA, and the value of the timeout timer decreases at a faster rate in FIG. 5CC than in FIG. 5AA.

In the example shown in FIG. 5DD, the intensity of input 537 remains constant from time $T_1$ through time $T_3$, which is before time $T_2$, and the value of the timeout timer reaches zero at time $T_3$, as indicated by indicator 584, indicating that the timeout period for detecting a long press has expired. Thus, the timeout period ($T_1$ to $T_3$) for detecting a long press is shorter in the example shown in FIGS. 5CC-5DD than the timeout period ($T_1$ to $T_2$) in the example shown in FIGS. 5AA-5BB, because the intensity of the touch input in the example shown in FIGS. 5CC-5DD is higher than the example shown in FIGS. 5AA-5BB, and the corresponding timer rate in the example shown in FIGS. 5CC-5DD is higher than the example shown in FIGS. 5AA-5BB.

Furthermore, as shown in FIG. 5DD, once the period for detecting a long press has expired, electronic device 100 performs an operation (e.g., transitioning to a user assistance user interface) in accordance with a corresponding determination. In some embodiments, the aforementioned determination includes a determination that the intensity of the input did not satisfy up-click detection criteria prior to expiration of the timeout period.

In FIG. 5EE, electronic device 100 receives a touch input 539 on home button 204, the touch input having a measured or detected intensity, and displays a user interface on display 112. In this example, the displayed user interface is the user interface of an application. FIG. 5EE is similar to FIGS. 5AA and 5CC, except that the intensity of touch input 539 is higher, or has greater magnitude, than touch input 535 in FIG. 5AA and touch input 537 in FIG. 5CC. As a result, the timer rate in the example shown in FIG. 5EE is higher or greater than the timer rates in the examples shown in FIGS. 5AA and 5CC, and the value of the timeout timer decreases at a faster rate in FIG. 5EE than in FIGS. 5AA and 5CC.

In the example shown in FIG. 5FF, the intensity of input 539 remains constant from time $T_1$ through time $T_4$, which is before time $T_3$ and time $T_2$, and the value of the timeout timer reaches zero at time $T_4$, as indicated by indicator 585, indicating that the timeout period for detecting a long press has expired. Thus, the timeout period ($T_1$ to $T_4$) for detecting a long press is shorter in the example shown in FIG. 5EE-5FF than the timeout period ($T_1$ to $T_2$) in the example shown in FIG. 5AA-5BB and the timeout period ($T_1$ to $T_3$) in the example shown in FIG. 5CC-5DD, because the intensity of the touch input in the example shown in FIG. 5EE-5FF is higher than the examples shown in FIGS. 5AA-5BB and 5CC-5DD, and the corresponding timer rate in the example shown in FIG. 5EE-5FF is higher than the examples shown in FIGS. 5AA-5BB and 5CC-5DD.

Furthermore, as shown in FIG. 5FF, once the period for detecting a long press has expired, electronic device 100 performs an operation (e.g., transitioning to a user assistance user interface) in accordance with a corresponding determination. In some embodiments, the aforementioned determination includes a determination that the intensity of the input did not satisfy up-click detection criteria prior to expiration of the timeout period.

In FIG. 5GG, electronic device 100 receives a touch input 541 on home button 204, the touch input having a measured or detected intensity, and displays a user interface on display 112. In this example, the displayed user interface is the user interface of an application. FIG. 5GG is similar to FIG. 5AA, and touch input 541 has the same or a similar intensity as touch input 535 in FIG. 5AA. As a result, the timer rate in the example shown in FIG. 5GG is the same or similar to the timer rate in the example shown in FIG. 5AA, and the value of the timeout timer decreases at the same or a similar rate in FIG. 5GG as in FIG. 5AA.

In the example shown in FIG. 5HH, the intensity of input 541 varies or changes between time $T_1$ and time $T_5$. In this example, the intensity of input 541 at time $T_5$, indicated by indicator 586, is at or approximately at the intensity level associated with a maximum timer rate for the timeout timer. Due to the changes in intensity between time $T_1$ and time $T_5$, the timer rate changes between time $T_1$ and time $T_5$, in accordance with the intensity of input 541, and thus the rate at which the value of the timeout timer decreases changes between time $T_1$ and time $T_5$. In this example, the rate at which the value of the timeout timer decreases accelerates when the intensity of the input increases at time $T_{3b}$. Alternatively, had the intensity of the input decreased at time $T_{3b}$, the rate at which the value of the timeout timer decreases would have decelerated.

In this example, the value of the timeout timer reaches zero at time $T_5$, indicating that the timeout period for detecting a long press has expired. The timeout period in this example is the period for time $T_1$ to time $T_5$.

Furthermore, as shown in FIG. 5HH, once the period for detecting a long press has expired, electronic device 100 performs an operation (e.g., transitioning to a user assistance user interface) in accordance with a corresponding determination. In some embodiments, the aforementioned determination includes a determination that the intensity of the input did not satisfy up-click detection criteria prior to expiration of the timeout period.

FIGS. 6A-6F are flow diagrams illustrating a method 600 of monitoring an input on an intensity sensitive input element, and detecting an up-click and/or a down-click in the monitored input using one or more intensity thresholds that are based on prior input intensity of the input. Method 600 is performed at an electronic device (e.g., device 300, FIG. 3, or portable multifunction device 100, FIG. 1A) with a display, a touch-sensitive surface, and one or more sensors 165 to detect intensity of contacts with the touch-sensitive surface. In some embodiments, the electronic device at which method 600 is performed includes, in addition to the touch-sensitive surface, a home button 204 that includes one of sensors 165. In some embodiments, home button 204 is separate from the display and, optionally, includes a set of one or more intensity sensors that are separate from intensity sensors used to detect the intensity of inputs on the display. In some embodiments, home button 204 is a virtual home button that is displayed on the display (e.g., with a set of one or more intensity sensors that are separate from intensity sensors used to detect the intensity of inputs on the display or, optionally, using intensity sensors integrated into the display to determine an intensity of an input with the virtual home button). In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides a way to accurately determine user intent, with respect to whether a touch input includes an up-click or down-click, by taking into account the intensity of the user's input during a portion of the input immediately preceding a decrease in intensity, or immediately preceding an increase in intensity. Method 600 reduces "false positives," such as inputs incorrectly detected as including an up-click or down-click, as well as "false negatives," such as inputs incorrectly detected as not including a respective up-click or down-click, thereby creating a more efficient human-machine interface. For battery-operated electronic devices, taking into account the priority intensity of a user's touch input enables a user to enter gestures, such as one or more of a single click, double click and triple click gesture, faster and more efficiently, which conserves power and increases the time between battery charges.

The device detects (602) a first increase in intensity of an input on the input element that meets down-click detection criteria, and after detecting the first increase in intensity of the input on the input element, detects (608) a first decrease in intensity of the contact. For example, as shown in FIG. 5B, a touch input 505 on home button 204 has an intensity that changes over time, including a first increase in intensity 520, sometimes called a first down-click, reaching a peak intensity, $I_{Peak}$, that is above a first down-click intensity threshold $I_D$. As shown in FIG. 5C, after the first increase in intensity, the intensity of the touch input on home button 204 decreases, and the electronic device detects a first decrease in intensity of the contact 522, sometimes called a first up-click.

In some embodiments, the input on the input element comprises (604) an input on a touch-sensitive surface. In the example shown in FIGS. 5B and 5C, the input on the input element is an input 505 on home button 204. Furthermore, in some embodiments, for the first increase in intensity, the down-click detection criteria require (606) that the intensity of the input increase above a first down-click intensity threshold, such as first down-click intensity threshold $I_D$ shown in FIGS. 5B and 5C, in order for the down-click detection criteria to be met. In some embodiments, and in the example shown in FIGS. 5B and 5C, the down-click intensity threshold is a fixed, predefined value, and thus is neither time-varying nor based on the intensity of the input immediately prior to the detecting the first increase in intensity of the input (602).

In response to detecting (610) the first decrease in intensity of the input (e.g., decrease 552, FIG. 5C), method 600 includes determining (612) whether the first decrease in intensity of the input meets up-click detection criteria, where (A) for the first decrease in intensity, the up-click detection criteria require that the intensity of the input decrease below a first up-click intensity threshold (e.g., threshold $I_U$, FIG. 5C) in order for the up-click detection criteria to be met, and (B) the first up-click intensity threshold (e.g., threshold $I_U$, FIG. 5C) is selected based on the intensity of the input during the increase in intensity (e.g., first increase, 520, FIGS. 5B-5C) of the contact that was detected prior to detecting the first decrease in intensity of the input. As explained in more detail below, the first up-click intensity threshold is based on either a peak intensity, $I_{Peak}$ (see FIG. 5C), of the input prior to the first decrease 522, or another characteristic intensity or representative intensity of the input. In some embodiments, the peak intensity, or characteristic intensity or representative intensity is multiplied by a multiplier, such as a value between 0.6 and 0.75, to determine the first up-click intensity threshold.

In some embodiments, the first up-click intensity threshold is time varying (632), in accordance with a low pass filtering of the detected intensity of the input during the first decrease in intensity of the contact. For example, FIG. 5K illustrates the determination of an up-click intensity threshold $I_{U(t)}$ 546 that dynamically changes as intensity of the input changes during a first decrease in intensity 542. In the example discussed above with respect to FIG. 5K, during the first decrease in intensity 542, the intensity of the input is low pass filtered, producing a first time varying value $I_{LPup}$ 544. The first time varying value is then multiplied by either a fixed value, such as 0.7, or an intensity-based value, such as the ratio shown in FIG. 5J, to produce a time varying up-click intensity threshold $I_{U(t)}$, where the "(t)" symbol indicates that the value is time varying.

In some embodiments, as discussed above with reference to FIGS. 5J-5N, a ratio of the up-click intensity threshold $I_U$ to an intensity value that represents the intensity of the contact changes (642) based on the intensity value that represents the intensity of the contact (e.g., the low-pass filtered peak intensity value of the input) such that when the up-click intensity is based on a first intensity value (e.g., intensity $I_{D1}$, FIG. 5J) that represents the intensity of the contact, the ratio of the up-click intensity threshold to the first intensity value has a first value (e.g., $a_2$, FIG. 5J); and when the up-click intensity is based on a second intensity value (e.g., intensity $I_{D2}$, FIG. 5J) that represents the intensity of the contact that is greater than the first intensity value, the ratio of the up-click intensity threshold to the second intensity value has a second value (e.g., a1) that is different from (e.g., lower than or higher than) the first value (e.g., when the low-pass filtered current intensity of the contact is 500 g, the ratio is 0.6 and when the low-pass filtered current intensity of the contact is 300 g, the ratio is 0.73). In some embodiments, changing the ratio based on the intensity of the contact accounts for thermal drift that increases at higher intensity levels.

In some embodiments, as discussed above with reference to FIGS. 5J-5N, the magnitude of the up-click intensity threshold is set (644) by multiplying the intensity value that represents the intensity of the contact (e.g., the peak intensity of the contact before detecting the decrease in the intensity of the contact, or the low-pass filtered current intensity of the contact) by an adjustment value (e.g., a value between 0 and 1) that is determined based at least in part on the magnitude of the intensity value that represents the intensity of the contact (e.g., the peak intensity of the contact before detecting the decrease in the intensity of the contact, or the low-pass filtered current intensity of the contact).

In some embodiments, as discussed above with reference to FIGS. 5J-5N, the ratio of the up-click intensity threshold to an intensity value that represents the intensity of the contact changes (646) in accordance with a maximum characteristic intensity of the input. For example, the multiplier changes from a predefined maximum value when the detected intensity is below a first intensity value, e.g., 300 g, and to a predefined minimum value for when the detected intensity is above a second intensity value, e.g., 500 g.

In some embodiments, as shown in FIG. 5J, the ratio of the up-click intensity threshold to an intensity value that represents the intensity of the contact varies smoothly (648) from a predefined maximum value to a predefined minimum value as the intensity value that represents the intensity of the contact varies between the first intensity value and the second intensity value, where the first intensity value is less than the second intensity value. In some embodiments, "varying smoothly" means that the ratio changes from the predefined maximum value to the predefined minimum value in two or more steps, or three or more steps, as the intensity value that represents the intensity of the contact varies between the first intensity value and the second intensity value. More generally, the ratio of the up-click intensity threshold to an intensity value that represents the intensity of the contact varies monotonically from a predefined maximum value to a predefined minimum value as the intensity value that represents the intensity of the contact varies between the first intensity value and the second intensity value.

In some embodiments, the up-click intensity threshold is no less than a predefined minimum up-click intensity threshold (649). For example, while the aforementioned ratio or multiplier is applied to the intensity value that represents the intensity of the contact, the up-click intensity threshold is set to the greater of the predefined minimum up-click intensity threshold (e.g., 130 g) and the up-click intensity threshold determined using the ratio or multiplier. In equation form, the imposition of a predefined minimum up-click intensity threshold may be represented as:

$$I_U = \max(IT_{min}, I_{representative} * \beta)$$

where $IT_m$ is the predefined minimum up-click intensity threshold, $I_{representative}$ is the intensity value that represents the intensity of the contact, and $\beta$ is the aforementioned ratio or multiplier.

In some embodiments, examples of which are discussed above with reference to FIG. 5J-5N, the up-click intensity threshold is determined in accordance with a multiplier (634), having a value greater than zero and less than one, applied to a characteristic intensity of the input. The multiplier is, effectively, the aforementioned ratio, and is multiplied by the intensity value that represents the intensity of the contact. As discussed elsewhere in more detail, the intensity value that represents the intensity of the contact is, in some embodiments, the peak intensity before an up-click, or the lowest intensity immediately preceding a down-click. In some other embodiments, the intensity value that represents the intensity of the contact is a low-pass filtered intensity value for a respective portion of the input, as shown in FIG. 5L for second down-click) and as shown in FIGS. 5K and 5N for a first or second up-click.

In some embodiments, the multiplier changes (636) in accordance with the characteristic intensity of the input. For example, in some embodiments, the multiplier smoothly varies (638) from a predefined maximum value to a predefined minimum value as the characteristic intensity of the input varies between a first intensity value and a second intensity value, where the first intensity value is less than the second intensity value. In some embodiments, "varying smoothly" means that the multiplier changes from the predefined maximum value to the predefined minimum value in two or more steps, or three or more steps, as the intensity value that represents the intensity of the contact varies between the first intensity value and the second intensity value. For example, the multiplier changes from a predefined maximum value when the detected intensity is below a first intensity value, e.g., 300 g, and to a predefined minimum value for when the detected intensity is above a second intensity value, e.g., 500 g. More generally, the multiplier varies monotonically from a predefined maximum value to a predefined minimum value as the intensity value that represents the intensity of the contact varies between the first intensity value and the second intensity value.

In some embodiments, the up-click intensity threshold is the greater of a predefined minimum up-click intensity threshold and a value determined in accordance with the multiplier (e.g., a value greater than zero and less than one), applied to a characteristic intensity of the input (640). In equation form, the imposition of a predefined minimum up-click intensity threshold may be represented as:

$$I_u = \max(IT_{min}, I_{char} * \beta)$$

where $IT_m$ is the predefined minimum up-click intensity threshold, $I_{char}$ is the characteristic intensity of the contact, and $\beta$ is the aforementioned multiplier.

Furthermore, in accordance with a determination (616) that the first decrease in intensity of the input meets up-click detection criteria, the electronic device provides first feedback indicating that the first decrease in intensity of the input was recognized as an up-click, and in accordance with a determination (616) that the decrease in intensity of the input does not meet the up-click detection criteria, the electronic device forgoes providing the first feedback. For example, as illustrated in FIG. 5C, when decrease 522 in intensity of the input meets up-click detection criteria (indicated by indicator 512), the device provides tactile output 502 to indicate that decrease 522 in intensity of the input was recognized as an up-click, and as illustrated in FIG. 5F, when decrease 530 in intensity of the input does not meet the up-click detection criteria, the electronic device does not generate a tactile output (e.g., tactile output 502) that indicates recognition of a decrease (e.g., decrease 530) in intensity of the input as an up-click.

Having now considered detection of various aspects of a first click, we now consider detection of various aspects of a second click. In particular, after determining that the first decrease in intensity meets the up-click detection criteria, the electronic device detects (614) a second increase in intensity of the input. A variety of scenarios in which a second increase in intensity is detected are discussed above with reference to FIGS. 5D-5E, 5G-5I, and 5L-5N.

In response to detecting the second increase in intensity of the input (620), in accordance with a determination that the second increase in intensity of the input meets the down-click detection criteria, the electronic device provides second feedback indicating that the second increase in intensity was recognized as part of a double-click input. For example, as discussed above with reference to FIG. 5G, a second tactile output 503 is generated in conjunction with detecting the up-click of a second click of an input 511 on home button 204. For example, in some embodiments, the second (down-click) tactile output is generated with the one or more tactile output generators 167 (FIG. 1A) of the electronic device. In another example, providing the second feedback includes generating an audio output with one or more speakers (e.g., speaker 111, FIG. 1A), and/or displaying a change in the graphical user interface displayed on the electronic device's display (e.g., display 112, FIGS. 5G, 5H) in accordance with a double click operation, such as displaying a multitasking user interface, as shown in FIG. 5H.

For the second increase in intensity, the down-click detection criteria require (622) that the intensity of the input increase above a second down-click intensity threshold (e.g., intensity threshold $I_{D2}$, FIG. 5G) in order for the down-click detection criteria to be met, and the second down-click intensity threshold for the second increase in intensity is selected (624) based on the intensity of the input during the first decrease in intensity of the contact. In the example shown in FIG. 5G, the second down-click intensity threshold for the second increase in intensity is selected based on the lowest intensity, $I_{Valley}$, of the input during the first decrease 534 in intensity of the contact.

In some embodiments, the second down-click intensity threshold is time varying, and the second down-click intensity threshold is selected (626) based on a low pass filtering of the detected intensity of the input during the second increase in intensity of the contact that is detected after the first decrease in intensity of the input. For example, the decrease in intensity of the input meets the up-click detection criteria. FIG. 5L shows an example of a time varying second down-click intensity threshold, $I_{D(t)}$ 554, that is selected or determined based on a low pass filtering ($I_{LPdown}$ 552) of the detected intensity of the input during the second increase 550 in intensity of the contact. In some embodiments, the low pass filtered intensity ($I_{LPdown}$ 552) of the detected intensity of the input during the second increase 550 in intensity of the contact is initially set, at the start of the second increase 550 in intensity of the contact, to the lowest intensity, $I_{Valley}$, of the input during the first decrease 534 in intensity of the contact.

In response to detecting the second increase in intensity of the input (620), in accordance with a determination (628) that the second increase in intensity of the input does not meet the down-click detection criteria, the electronic device forgoes providing the second feedback. For example, in FIG. 5G, if the input were to stop (e.g., if the contact were to lift off) prior to the intensity reaching the second down-click intensity threshold $I_{D2}$, the second increase in intensity of the input would not meet the down-click detection criteria, and the electronic device would forgo providing the second feedback.

In some embodiments, method 600 includes generating (650) a first tactile output in conjunction with detecting that the increase in intensity of the input meets the down-click detection criteria. For example, as discussed above with reference to FIG. 5C, a first tactile output 502 is generated in conjunction with detecting a down-click during a decrease in intensity 522 of an input 505 on home button 204.

In some embodiments, method 600 includes generating (652) a second tactile output in conjunction with detecting that the decrease in intensity of the input meets the up-click detection criteria. For example, as discussed above with reference to FIG. 5G, a second tactile output 503 is generated in conjunction with detecting the up-click of a second click of an input 511 on home button 204.

In some embodiments, method 600 includes generating (654), in response to detecting the increase in intensity of the input on the input element that meets the down-click detection criteria, a response that is displayed on the display of the electronic device. In one example, the response that is displayed is response to that visually distinguishes an object in the user interface or a region of the user interface whose position corresponds to the input.

In some embodiments, providing the first feedback includes generating (656) a response that is displayed on the display of the electronic device. For example, in the example shown in FIGS. 5B-5C, the response, which may be called a first click or single click response, switching from displaying the user interface of a first application (e.g., a timer application) to displaying an application launch user interface.

In some embodiments, method 600 includes generating (658) a same first tactile output in conjunction with multiple instances of detecting that the increase in intensity of an input detected on the input element meets the down-click detection criteria, including instances in which the down-click detection criteria is associated with different down-click intensity thresholds. For example, even when a first down-click and a second down-click are detected at different intensity thresholds, the same tactile output (e.g., a tactile output having the MicroTap (270 Hz) tactile output pattern, FIG. 4F) is generated for both the first down-click and the second down-click.

In some embodiments, method 600 includes generating (660) a same second tactile output in conjunction with multiple instances of detecting that the decrease in intensity of an input detected on the input element meets the up-click detection criteria, including instances in which the up-click detection criteria is associated with different up-click intensity thresholds. For example, even when a first up-click and a second up-click are detected at different intensity thresholds, the same tactile output (e.g., a tactile output having the MiniTap (270 Hz) tactile output pattern, FIG. 4F) is generated for both the first up-click and the second up-click. In some embodiments, the up-click tactile output pattern has a lower gain than the down-click tactile output pattern (e.g., the up-click tactile output pattern is a reduced amplitude version of the down-click tactile output pattern).

In some embodiments, method 600 includes, after detecting the second increase in intensity of the input on the input element (e.g., increase 536 in intensity of input 513, FIG. 5H), detecting (662) a second decrease in intensity of the contact (e.g., decrease 538 in intensity of input 513, FIG. 5H), and providing third feedback (e.g., performing a double click operation, an example of which is described above with reference to FIG. 5H) indicating that the second decrease in intensity was recognized as an up-click input in response to detecting the second decrease in intensity of the input. In such embodiments, for the second decrease in intensity, the up-click detection criteria require that the intensity of the input decrease below a second up-click intensity threshold in order for the up-click detection criteria to be met; and the second up-click intensity threshold is selected based on the intensity of the input during the second increase in intensity of the contact. Furthermore, in accordance with a determination that the second decrease in intensity of the input does not meet the up-click detection criteria, the electronic device forgoes providing the third feedback (e.g., by forgoing performance of a double click operation).

In some embodiments, the third feedback is generated, or initiated, at or immediately following the time, indicated by indicator 522 in FIG. 5H, at which the second decrease in intensity satisfies the up-click detection criteria. In some embodiments, the third feedback is or includes transitioning to a multitasking user interface, as shown in FIG. 5H. In some embodiments, the third feedback is or includes generating a tactile output 503, as shown in FIG. 5H. In some embodiments, tactile output 503 is a tactile output having the MiniTap (270 Hz) tactile output pattern, FIG. 4F).

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6F. For example, method 600 of monitoring an input on an intensity sensitive input element, and detecting an up-click and/or a down-click in the monitored input using one or more intensity thresholds that are based on prior input intensity of the input, described above with reference to FIGS. 6A-6E, optionally has one or more of the characteristics of the method of accelerated detection of single clicks described herein with reference to method 700, and/or the method of accelerated detection of long press inputs described herein with reference to method 800. For brevity, these details are not repeated here.

Figure 9:
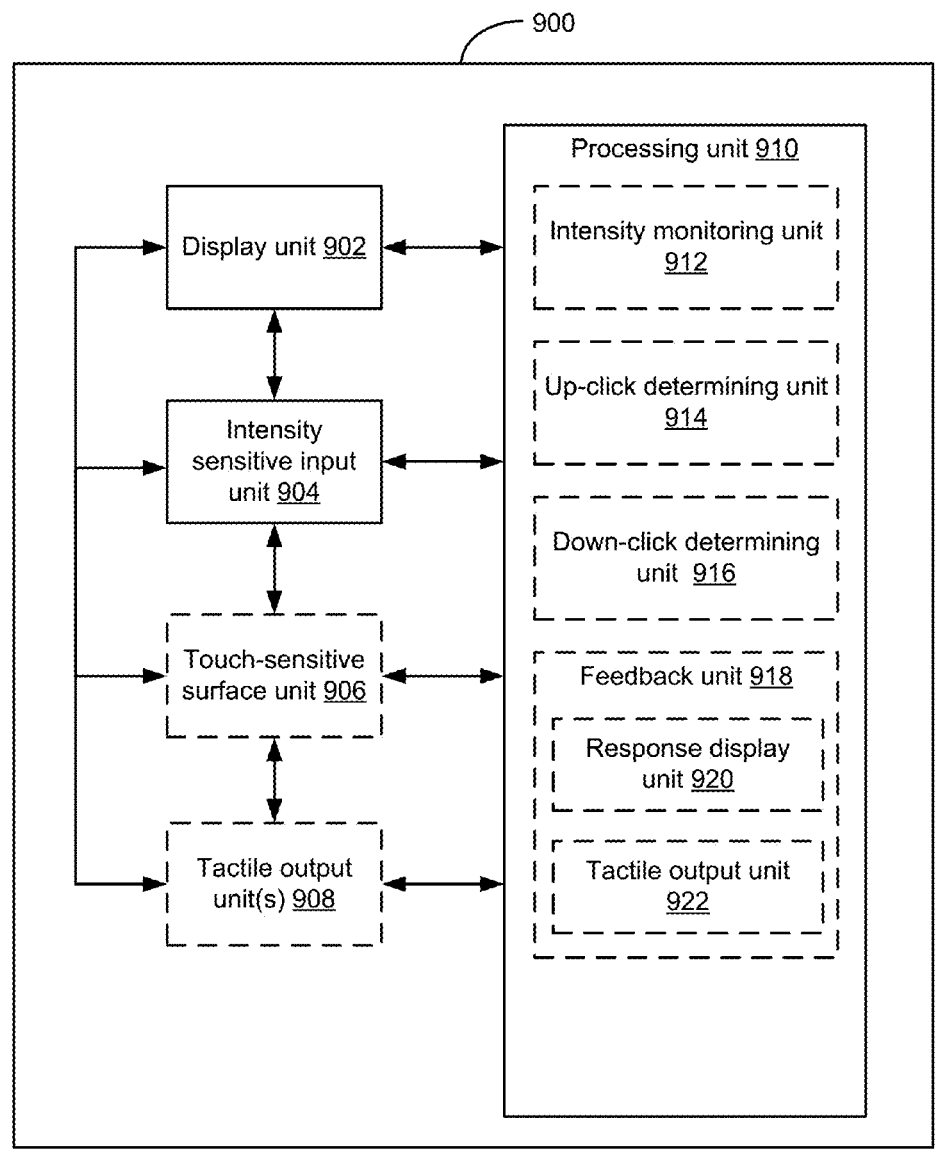
FIGS. 9-11 are functional block diagrams of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 (e.g., corresponding to display 112) configured to display a user interface, an intensity sensitive input unit 904 (e.g., corresponding to home button 204) configured to detect intensity of user inputs with the input element, and a processing unit 910 coupled with the display unit 902 and the intensity sensitive input unit 904. In some embodiments, electronic device 900 also includes touch-sensitive surface unit 906 for receiving touch inputs on a surface, such as a display surface of display unit 902, and one or more tactile output units 908 for generating tactile outputs, also coupled to processing unit 910. In some embodiments, processing unit 910 includes one or more of the following sub-units: intensity monitoring unit 912, up-click determining unit 914, down-click determining unit 916, and feedback unit 918. In some embodiments, feedback unit 918 includes response display unit 920 and tactile output unit 922.

Processing unit 910 is configured to: detect (e.g., using intensity monitoring unit 912) a first increase in intensity of an input on the input element that meets down-click detection criteria, and after detecting the first increase in intensity of the input on the input element, detect a first decrease in intensity of the contact. In response to detecting the first decrease in intensity of the input, processing unit 910 determines (e.g., using up-click determining unit) whether the first decrease in intensity of the input meets up-click detection criteria, wherein for the first decrease in intensity, the up-click detection criteria require that the intensity of the input decrease below a first up-click intensity threshold in order for the up-click detection criteria to be met, and the first up-click intensity threshold is selected based on the intensity of the input during the increase in intensity of the contact that was detected prior to detecting the first decrease in intensity of the input.

Processing unit 910, in accordance with a determination that the first decrease in intensity of the input meets up-click detection criteria, provides first feedback (e.g., using feedback unit 918) indicating that the first decrease in intensity of the input was recognized as an up-click, and in accordance with a determination that the decrease in intensity of the input does not meet the up-click detection criteria, forgoes providing the first feedback.

In some embodiments, for the first increase in intensity, the down-click detection criteria require that the intensity of the input increase above a first down-click intensity threshold in order for the down-click detection criteria to be met. In some such embodiments, processing unit 910 is further configured to, after determining that the first decrease in intensity meets the up-click detection criteria, detect (e.g., using intensity monitoring unit 912) a second increase in intensity of the input; and in response to detecting the second increase in intensity of the input, in accordance with a determination (e.g., using down-click determining unit 916)) that the second increase in intensity of the input meets the down-click detection criteria, provide second feedback (e.g., using feedback unit 918) indicating that the second increase in intensity was recognized as part of a double-click input. For the second increase in intensity, the down-click detection criteria require that the intensity of the input increase above a second down-click intensity threshold in order for the down-click detection criteria to be met. In these embodiments, the second down-click intensity threshold for the second increase in intensity is selected based on the intensity of the input during the first decrease in intensity of the contact, and in accordance with a determination (e.g., using down-click determining unit 916) that the second increase in intensity of the input does not meet the down-click detection criteria, processing unit 910 forgoes providing the second feedback.

In some embodiments, the second down-click intensity threshold is time varying, and the second down-click intensity threshold is selected by processing unit 912 (e.g., using down-click determining unit 916) based on a low pass filtering of the detected intensity of the input during the second increase in intensity of the contact that is detected after the first decrease in intensity of the input.

In some embodiments, for the first increase in intensity, the down-click detection criteria require that the intensity of the input increase above a first down-click intensity threshold in order for the down-click detection criteria to be met.

In some embodiments, the input on the intensity sensitive input unit 904 comprises an input on a touch-sensitive surface.

In some embodiments, the first up-click intensity threshold is time varying, in accordance with a low pass filtering of the detected intensity of the input during the first decrease in intensity of the contact.

In some embodiments, a ratio of the up-click intensity threshold to an intensity value that represents the intensity of the contact changes based on the intensity value that represents the intensity of the contact such that, when the up-click intensity is based on a first intensity value that represents the intensity of the contact, the ratio of the up-click intensity threshold to the first intensity value has a first value; and when the up-click intensity is based on a second intensity value that represents the intensity of the contact that is greater than the first intensity value, the ratio of the up-click intensity threshold to the second intensity value has a second value that is different from the first value.

In some embodiments, the magnitude of the up-click intensity threshold is set (e.g., by processing unit 910 or up-click determining unit 914) by multiplying the intensity value that represents the intensity of the contact by an adjustment value that is determined based at least in part on the magnitude of the intensity value that represents the intensity of the contact. In some embodiments, the ratio of the up-click intensity threshold to an intensity value that represents the intensity of the contact changes in accordance with a maximum characteristic intensity of the input. In some embodiments, the ratio of the up-click intensity threshold to an intensity value that represents the intensity of the contact varies smoothly from a predefined maximum value to a predefined minimum value as the intensity value that represents the intensity of the contact varies between the first intensity value and the second intensity value, wherein the first intensity value is less than the second intensity value.

In some embodiments, the up-click intensity threshold is no less than a predefined minimum up-click intensity threshold.

In some embodiments, the up-click intensity threshold is determined (e.g., by processing unit 910 or up-click determining unit 914) in accordance with a multiplier, having a value greater than zero and less than one, applied to a characteristic intensity of the input. In some embodiments, the multiplier changes in accordance with the characteristic intensity of the input. In some embodiments, the multiplier smoothly varies from a predefined maximum value to a predefined minimum value as the characteristic intensity of the input varies between a first intensity value and a second intensity value, wherein the first intensity value is less than the second intensity value.

In some embodiments, the up-click intensity threshold is the greater of a predefined minimum up-click intensity threshold and a value determined in accordance with a multiplier, having a value greater than zero and less than one, applied to a characteristic intensity of the input.

In some embodiments, processing unit 910 is further configured to generate (e.g., using tactile output unit 922 of feedback unit 918) a first tactile output in conjunction with detecting that the increase in intensity of the input meets the down-click detection criteria.

In some embodiments, processing unit 910 is further configured to generate (e.g., using tactile output unit 922 of feedback unit 918) a second tactile output in conjunction with detecting that the decrease in intensity of the input meets the up-click detection criteria.

In some embodiments, the processing unit is further configured to generate, in response to detecting the increase in intensity of the input on the input element that meets the down-click detection criteria, a response (e.g., using response display unit 920 of feedback unit 918) that is displayed by display unit 902 of the electronic device.

In some embodiments, providing the first feedback includes generating a response (e.g., using response display unit 920 of feedback unit 918) that is displayed by display unit 902 of the electronic device.

In some embodiments, the processing unit is further configured to generate a same first tactile output in conjunction with multiple instances of detecting that the increase in intensity of an input detected on the input element meets the down-click detection criteria, including instances in which the down-click detection criteria is associated with different down-click intensity thresholds.

In some embodiments, the processing unit is further configured to, after detecting the second increase in intensity of the input on the input element, detect a second decrease in intensity of the contact; and, in response to detecting the second decrease in intensity of the input, in accordance with a determination that the second decrease in intensity of the input meets the up-click detection criteria, provide third feedback indicating that the second decrease in intensity was recognized as an up-click input. In such embodiments, for the second decrease in intensity, the up-click detection criteria require that the intensity of the input decrease below a second up-click intensity threshold in order for the up-click detection criteria to be met; and the second up-click intensity threshold is selected based on the intensity of the input during the second increase in intensity of the contact. In such embodiment, the processing unit is configured, in accordance with a determination (e.g., by up-click determining unit 914) that the second decrease in intensity of the input does not meet the up-click detection criteria, to forgo providing the third feedback.

In some embodiments, the processing unit is further configured to generate (e.g., using tactile output unit 922 of feedback unit 918) a same second tactile output in conjunction with multiple instances of detecting that the decrease in intensity of an input detected on the input element meets the up-click detection criteria, including instances in which the up-click detection criteria is associated with different up-click intensity thresholds.

The operations in the information processing methods described above with reference to FIGS. 6A-6F are, optionally implemented by running one or more functional modules in information processing apparatus such as general purpose processors (e.g., as described above with respect to FIGS. 1A and 3) or application specific chips.

The operations described above with reference to FIGS. 6A-6F are, optionally, implemented by components depicted in FIGS. 1A-1B or FIG. 3. For example, detection operations 602, 608, 614, etc., and determine operations 612, etc. are, optionally, implemented by contact/motion module 130, and feedback operations that provide tactile outputs are implemented by haptic feedback module 133, while some other operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7E are flow diagrams illustrating a method 700 of monitoring an input on an intensity sensitive input element, and detecting whether the input is a single click or double click. Method 700 is performed at an electronic device (e.g., device 300, FIG. 3, or portable multifunction device 100, FIG. 1A) with a display, a touch-sensitive surface, and one or more sensors 165 to detect intensity of contacts with the touch-sensitive surface. In some embodiments, the electronic device at which method 700 is performed includes, in addition to the touch-sensitive surface, a home button 204 that includes one of sensors 165. In some embodiments, home button 204 is separate from the display and, optionally, includes a set of one or more intensity sensors that are separate from intensity sensors used to detect the intensity of inputs on the display. In some embodiments, home button 204 is a virtual home button that is displayed on the display (e.g., with a set of one or more intensity sensors that are separate from intensity sensors used to detect the intensity of inputs on the display or, optionally, using intensity sensors integrated into the display to determine an intensity of an input with the virtual home button). In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides a way to accurately determine user intent, with respect to whether a touch input is a single click or double click, on an accelerated basis, by taking into account the intensity of the user's input during a portion of the input immediately following recognition of a first event (e.g., that a first decrease in intensity of the input has fallen below an up-click intensity threshold). Method 700 reduces latency, by recognizing single click inputs faster than would otherwise be possible, while avoiding "false positives," such as inputs incorrectly detected as a single click, thereby creating a more efficient human-machine interface. For battery-operated electronic devices, taking into account the priority intensity of a user's touch input enables a user to enter gestures, such as a single click or double click, faster and more efficiently, which conserves power and increases the time between battery charges.

The device detects (702) a change in intensity of an input on an input element (e.g., input 523 on home button 204, FIG. 5O) that includes detecting (702) an increase in intensity of the input (e.g., increase 532, FIG. 5O) on the input element followed by a decrease in intensity of the input (e.g., decrease 534, FIG. 5O) on the input element. The increase in intensity followed by a decrease in intensity is sometimes called a click, or first click or single click, depending on the circumstances. In some embodiments, the input on the input element is or includes an input on a touch-sensitive surface (704), such as surface of home button 204 (FIG. 5O) or a touch-sensitive surface of the electronic device's touch-sensitive display 112. In some embodiments, detecting a change in intensity of the input on the input element includes continuously detecting (706) the input on the input element.

Method 700 further includes recognizing (708) at least a portion of the change in intensity of the input as a first input event that is associated with a first operation. As noted above, the first input event is sometimes called a click or first click. An example is described above with reference to FIG. 5O.

After recognizing the first input event, method 700 includes delaying (710) performance of the first operation while monitoring subsequent changes in intensity of the input for a second input event, wherein the delay is limited by a default delay time period. Thus, performance of the first operation, such as changing the displayed user interface from an application user interface currently display to home screen or application launching user interface, is delayed or deferred while the device continues to monitor changes in intensity of the input. As noted above with reference to FIG. 5P, in some embodiments, if there is liftoff of the contact, the monitoring of changes in the intensity of the input stops, and therefore performance of the first operation is not deferred after liftoff of the is detected.

Method 700 further includes, after delaying performance of the first operation (712): in accordance with a determination that the second input event (e.g., has been recognized before the default delay time period has elapsed, performing (714) a second operation and forgoing performance of the first operation. As explained above with reference to FIG. 5W, this circumstance corresponds to detection of a double click, sometimes by detecting "one and half" clicks prior to expiration of the default delay time.

Method 700 further includes, after delaying performance of the first operation (712): in accordance with a determination that early-confirmation criteria for the first input event have been met before the default delay time period has elapsed without the second input event being recognized, performing (716) the first operation before the default delay time period has elapsed. As explained above with reference to FIGS. 5Q-5V, when the early-confirmation criteria are met before the default delay time period has elapsed without the second input event being recognized, a single click is recognized and acted upon, by performing the first operation, on an accelerated basis (e.g., before the default delay time period has elapsed). This reduces the latency of the device in recognizing the user input as a single click. Various ways that the early-confirmation criteria for the first input event can be met are described in more detail below with respect to operations 722-738, and are also explained in some detail above with respect to FIGS. 5Q-5V.

Method 700 further includes, after delaying performance of the first operation (712): in accordance with a determination that the default delay time period has elapsed without the early-confirmation criteria for the first input event being met and without the second input event being recognized, performing (718) the first operation once the default delay time period has elapsed. As explained above with reference to FIG. 5S, this circumstance occurs when the early-confirmation criteria are not met before the default delay time period has elapsed without the second input event being recognized, and thus a single click is recognized and acted upon, by performing the first operation, only after the default delay time period has elapsed. This is effectively the backup or default, where detecting that the input is single click and is not a double click takes the normal or default amount of time.

In some embodiments, the early-confirmation criteria (used in operation 716, described above) for the first input event comprise criteria that the intensity of the input remains below a confirmation intensity threshold for more than an early confirmation time threshold (720). For example, in FIG. 5Q, the early-confirmation criteria for the first input event comprise criteria that the intensity of the input remains below confirmation intensity threshold $I_A$, which is lower than the up-click intensity threshold $I_U$, for more than an early confirmation time threshold, which corresponds to the length of time between $T_2$ and $T_3$ in FIGS. 5Q and 5R. For comparison, the default delay time period is shown in FIG. 5S, as corresponding to the length of time between $T_1$ (down-click detection) and $T_4$, or alternatively the length of time between $T_{2A}$ (up-click detection) and $T_4$, as described in more detail above with reference to FIG. 5S.

In some embodiments, the early confirmation time threshold is less than half the default delay time period (722). For example, in some embodiments, the default delay time period is 500 ms, while the early confirmation time threshold is 150 ms, or 200 ms, or a value between 150 ms and 240 ms.

In some embodiments, the confirmation intensity threshold (e.g., confirmation intensity threshold $I_A$ in FIGS. 5O-5Y) is below an up-click intensity threshold (e.g., up-click intensity threshold $I_U$ in FIGS. 5O-5Y) used for recognizing the second input event (724). For example, in some embodiments, the confirmation intensity threshold is 150 g while the up-click intensity threshold is 200 g. In some other embodiments, the confirmation intensity threshold is less than 150 g while the up-click intensity threshold is more than 150 g. Furthermore, in some such embodiments, the up-click intensity threshold is determined (726) in accordance with a characteristic intensity of the input during the detected increase in intensity of the input in which the input reached a peak intensity prior to detecting the decrease in intensity of the input on the input element. Examples of up-click intensity thresholds that are determined in this manner, sometimes called time-varying intensity thresholds, are discussed above with reference to FIGS. 5K and 5M. FIGS. 5K and 5M show examples in which the up-click intensity threshold is determined using a low pass filtered intensity of the contact.

In some embodiments, method 700 includes monitoring a duration of a fast timeout period, starting when the intensity of the input decreases below the confirmation intensity threshold (728). This is shown, for example in FIGS. 5Q, 5R and 5T-5V, with the monitoring of the fast timeout period starting at time $T_2$, which is when the intensity of the input decreases below the confirmation intensity threshold $I_A$ in those examples.

In some embodiments, the duration of the fast timeout period is a cumulative amount of time, after the fast timeout period starts, that the intensity of the input is below the confirmation intensity threshold (730). Measurement of the duration of the fast timeout period as a cumulative amount of time, after the fast timeout period starts, that the intensity of the input is below the confirmation intensity threshold is discussed in more detail above with reference to FIGS. 5T-5V.

In some embodiments, method 700 includes determining (732) the confirmation intensity threshold (e.g., threshold $I_A$ in FIGS. 5O-5Y) in accordance with a peak characteristic intensity of the input (e.g., $I_{NA}$, FIG. 5O) detected during the detected increase in intensity of the input, prior to detecting the decrease in intensity of the input on the input element. Further explanation and examples of how the confirmation intensity threshold is determine are provided above with respect to FIG. 5O.

In some embodiments, the confirmation intensity threshold is independent of a peak characteristic intensity of the input detected during the detected increase in intensity of the input (734). For example, the confirmation intensity threshold is set to a fixed intensity threshold, such as 100 g or 150 g, independent of the peak characteristic intensity of the input detected during the detected increase in intensity of the input.

In some embodiments, method 700 includes monitoring (736) a duration of the default timeout period starting when the intensity of the input increases to a down-click intensity threshold. In some other embodiments, method 700 includes monitoring (738) a duration of the default timeout period starting when the intensity of the input decreases to an up-click intensity threshold. Both of these options for monitoring the duration of the default timeout period are described above with reference to FIG. 5S. In FIG. 5S, time $T_1$ is the time at which the intensity of the input has increased to the down-click intensity threshold $I_D$, while time $T_{2A}$ is the time at which the intensity of the input has decreased to the up-click intensity threshold $I_U$.

In some embodiments, method 700 includes, after delaying performance of the first operation, in accordance with a determination that a second input event has been recognized after the default delay time period has elapsed, performing (739) a third operation. For example, referring to FIG. 5S, after the default time period has expired, at time $T_4$, if a second input event is recognized, it would be treated as a separate event, such as a separate single click, and the third operation would correspond to the operation to be performed by the electronic device in response to a single client. A similar example is shown in FIG. 5R, in which the input includes a single click after the early-confirmation criteria are satisfied at time $T_3$. In that example, the resulting third operation is scrolling from one screen of icons in an application launching user interface, including a first set of application launch icons, to another screen of icons in the application launch user interface.

In some embodiments, method 700 includes detecting (741) a sequence of distinct inputs on the input element, separated by periods during which no input is detected on the input element, and repeating the recognizing and delaying with respect to a plurality of the inputs in the sequence of distinct inputs. For example, as shown in FIG. 5E and described above with respect to FIG. 5E, the device may detect a touchdown of a first input (e.g., touch input 505, FIGS. 5B-5C) on the input element followed by liftoff of the first input and touchdown of a second input (e.g., touch input 507, FIG. 5E) on the input element. In response, the electronic device repeats the recognizing of the first input event, and delays performance of the first operation, with respect to each input in the sequence of distinct inputs.

In some embodiments, method 700 includes, after delaying performance of the first operation, in accordance with a determination that the first input event meets (740) long press input criteria before the second input event has been recognized, performing a third operation and forgoing performance of the first operation and the second operation. For example, the first input event may be a down-click, and the third operation in this circumstance may be a long press operation, such as invoking a virtual assistant or a dictation mode of operation. Recognition of long press inputs and responding to long press inputs are discussed in more detail with respect to FIGS. 5Z to 5II and FIGS. 8A-8C.

In some embodiments, method 700 includes generating (742) a first tactile output (e.g., first tactile output 502, FIG. 5O) in conjunction with recognizing the first input event (e.g., recognizing a down-click at time $T_1$, or recognizing an up-click at time $T_{2a}$, FIG. 5O).

In some embodiments, method 700 includes generating (744) a second tactile output in conjunction with recognizing the second input event, as described above with reference to FIG. 5W.

In some embodiments, the first operation is or includes (746) ceasing to display a user interface for an application (and, optionally returning to displaying a home screen or application launch screen for the device), for example as shown in the transition for FIGS. 5O to 5Q, and the second operation comprises a multitasking operation (e.g., switching between applications or displaying a user interface that provides options for switching between a plurality of different applications such as concurrently open applications or recently used applications, as shown in FIG. 5W).

In some embodiments, the first operation is or includes (748) scrolling from one screen of icons in an application launching user interface (e.g., an application launching user interface including a first set of application launch icons), to another screen of icons in the application launch user interface (e.g., including a second set of application launch icons that include application launch icons not in the first set of application launch icons), as shown in the transition from FIG. 5Q to 5R, and the second operation comprises a multitasking operation (e.g., switching between applications or displaying a user interface that provides options for switching between a plurality of different applications such as concurrently open applications or recently used applications, as shown in FIG. 5W).

In some embodiments, recognition of the first input event is based on detection of a change in a characteristic intensity of an input with reference to a first intensity threshold (e.g., an up-click intensity threshold); and recognition of the second input event is based on detection of a change in a characteristic intensity of an input with reference to a second intensity threshold (e.g., a down-click intensity threshold) that is different from the first intensity threshold. For example, with reference to FIG. 5Y, the up-click intensity threshold $I_U$, used for recognition of the first event, is distinct from (e.g., lower than) the down-click intensity threshold $I_D$, used for recognition of the second event.

In some embodiments, method 700 includes, after recognizing the second input event (e.g., a second up-click event, corresponding to indicator 522 in FIG. 5Y), delaying (760) performance of the second operation while monitoring subsequent changes in intensity of the input for a third input event (e.g., a third down-click, sometimes called a triple click event, corresponding to indicator 579), where the delay is limited by a second default delay time period. Method 700 further includes, after delaying (762) performance of the second operation, in accordance with a determination that the third input event has been recognized (e.g., corresponding to indicator 579, FIG. 5Y) before the second default delay time period has elapsed, performing (764) a third operation (e.g., a triple click operation) and forgoing performance of the second operation (e.g., a double click operation). Otherwise, after delaying (762) performance of the second operation, method 700 includes, in accordance with a determination that early-confirmation criteria for the second input event have been met before the second default delay time period has elapsed (e.g., as indicated by indictor 577, FIG. 5Y) without the third input event being recognized, performing (766) the second operation (e.g., the double click operation) before the second default delay time period has elapsed. Further, after delaying (762) performance of the second operation, method 700 includes, in accordance with a determination that the second default delay time period has elapsed without the early-confirmation criteria for the second input event being met (e.g., as indicated by indictor 578, FIG. 5Y) and without the third input event being recognized, performing (768) the second operation (e.g., the double click operation) once the second default delay time period has elapsed. In some embodiments, the second default delay time period is the same as the first default delay time period. In some other embodiments, the second default delay time period is longer or shorter than the first default delay time period.

Figure 10:
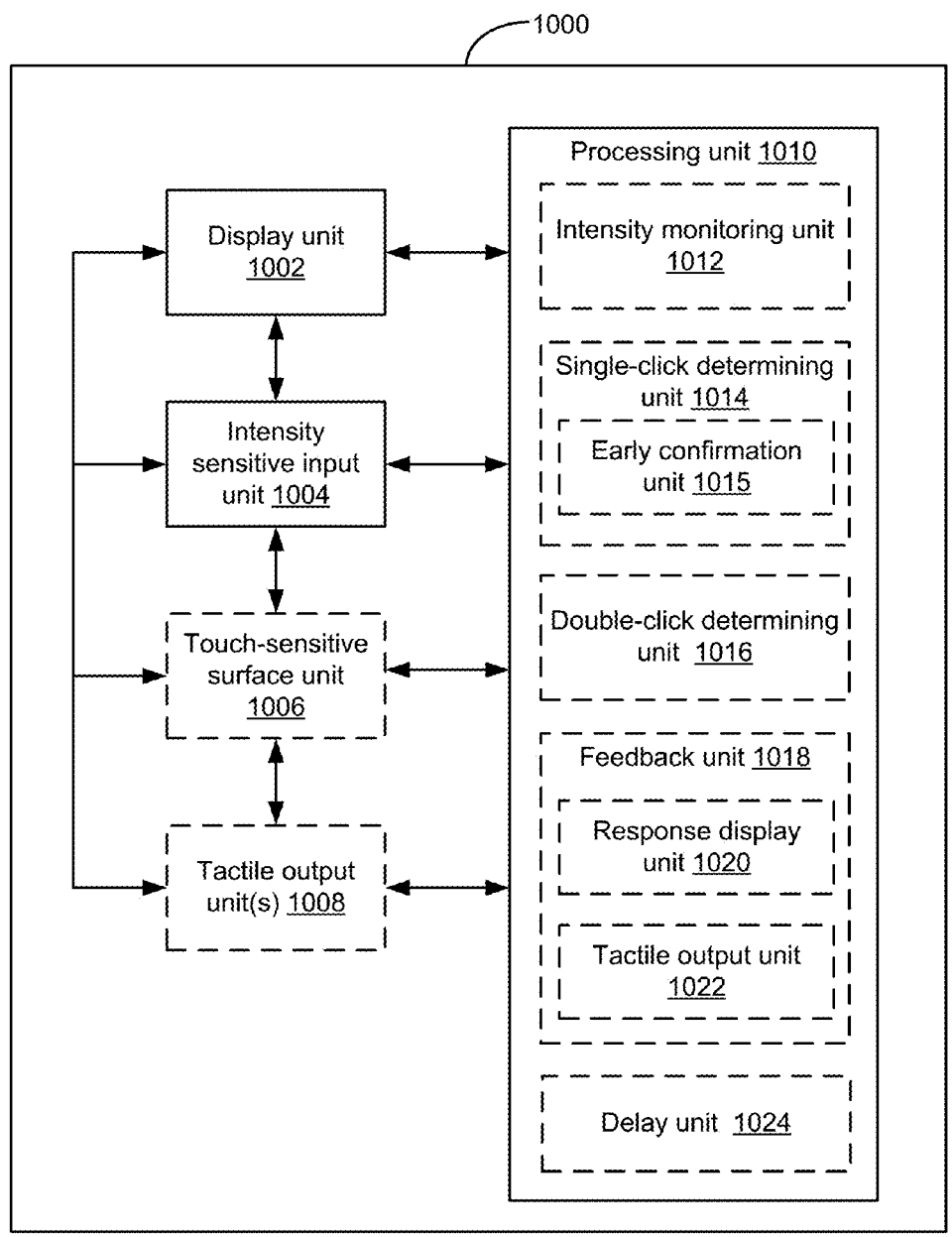

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 (e.g., corresponding to display 112) configured to display a user interface, an intensity sensitive input unit 1004 (e.g., corresponding to home button 204) configured to detect intensity of user inputs with the input element, and a processing unit 1010 coupled with the display unit 1002 and the intensity sensitive input unit 1004. In some embodiments, electronic device 1000 also includes touch-sensitive surface unit 1006 for receiving touch inputs on a surface, such as a display surface of display unit 1002, and one or more tactile output units 1008 for generating tactile outputs, also coupled to processing unit 1010. In some embodiments, processing unit 1010 includes one or more of the following sub-units: intensity monitoring unit 1012, single-click determining unit 1014, double-click determining unit 1016, feedback unit 1018 and delay unit 1024. In some embodiments, single-click determining unit 1014 includes early confirmation unit 1015. In some embodiments, feedback unit 1018 includes response display unit 1020 and tactile output unit 1022.

Processing unit 1010 is configured to: detect (e.g., using intensity monitoring unit 912) a change in intensity of an input on the intensity sensitive input unit that includes detecting an increase in intensity of the input on the intensity sensitive input unit followed by a decrease in intensity of the input on the intensity sensitive input unit; recognize (e.g., using single-click determining unit 1014) at least a portion of the change in intensity of the input as a first input event that is associated with a first operation; and delay performance of the first operation (e.g., using delay unit 1024), after recognizing the first input event, while monitoring subsequent changes in intensity of the input for a second input event, wherein the delay is limited by a default delay time period.

Processing unit 1010 is further configured to, after delaying performance of the first operation: in accordance with a determination that the second input event has been recognized (e.g., using double-click determining unit 1016) before the default delay time period has elapsed, perform a second operation and forgoing performance of the first operation; in accordance with a determination that early-confirmation criteria for the first input event have been met (e.g., using early confirmation unit 1014) before the default delay time period has elapsed without the second input event being recognized, perform the first operation before the default delay time period has elapsed; and in accordance with a determination that the default delay time period has elapsed without the early-confirmation criteria for the first input event being met (e.g., using early confirmation unit 1014) and without the second input event being recognized (e.g., using double-click determining unit), perform the first operation once the default delay time period has elapsed.

In some embodiments, the processing unit is further configured to perform a third operation, after delaying performance of the first operation, in accordance with a determination that a second input event has been recognized (e.g., using double-click determining unit 1016) after the default delay time period has elapsed.

In some embodiments, the input on the intensity sensitive input unit is or includes an input on a touch-sensitive surface. In some embodiments, detecting a change in intensity of the input on the intensity sensitive input unit includes continuously detecting the input on the intensity sensitive input unit.

In some embodiments, the processing unit is further configured to detect a sequence of distinct inputs on the intensity sensitive input unit, separated by periods during which no input is detected on the intensity sensitive input unit, and repeating the recognizing (e.g., using the single-click determining unit) and delaying (e.g., using delay unit 1024) with respect to a plurality of the inputs in the sequence of distinct inputs.

In some embodiments, the early-confirmation criteria for the first input event are or include criteria that the intensity of the input remains below a confirmation intensity threshold for more than an early confirmation time threshold. In some embodiments, the early confirmation time threshold is less than half the default delay time period. In some embodiments, the confirmation intensity threshold is below an up-click intensity threshold used for recognizing the second input event.

In some embodiments, the up-click intensity threshold is determined (e.g., using single-click determining unit 1014) in accordance with a characteristic intensity of the input during the detected increase in intensity of the input in which the input reached a peak intensity prior to detecting the decrease in intensity of the input on the intensity sensitive input unit.

In some embodiments, the processing unit is further configured to monitor a duration of a fast timeout period (e.g., using early confirmation unit 1015) starting when the intensity of the input decreases below the confirmation intensity threshold. In some embodiments, the duration of the fast timeout period is a cumulative amount of time, after the fast timeout period starts, that the intensity of the input is below the confirmation intensity threshold.

In some embodiments, the processing unit is further configured to determine the confirmation intensity threshold (e.g., using single-click determining unit 1014 or early confirmation unit 1015) in accordance with a peak characteristic intensity of the input detected during the detected increase in intensity of the input, prior to detecting the decrease in intensity of the input on the intensity sensitive input unit. In some other embodiments, the confirmation intensity threshold is independent of a peak characteristic intensity of the input detected during the detected increase in intensity of the input.

In some embodiments, the processing unit is further configured to monitor a duration of the default timeout period (e.g., using single-click determining unit 1014) starting when the intensity of the input increases to a down-click intensity threshold. In some other embodiments, the processing unit is further configured to monitor a duration of the default timeout period starting when the intensity of the input decreases to an up-click intensity threshold.

In some embodiments, the processing unit is further configured to generate a first tactile output (e.g., using tactile output unit 1022) in conjunction with recognizing the first input event. In some embodiments, the processing unit is further configured to generate a second tactile output (e.g., using tactile output unit 1022) in conjunction with recognizing the second input event.

In some embodiments, the processing unit is further configured to, after recognizing the second input event (e.g., using double-click determining unit), delay performance of the second operation (e.g., using delay unit 1024) while monitoring subsequent changes in intensity of the input for a third input event, where the delay is limited by a second default delay time period. The processing unit is further configured to, after delaying performance of the second operation, in accordance with a determination that the third input event has been recognized before the second default delay time period has elapsed, perform a third operation and forgoing performance of the second operation. The processing unit is also configured to, in accordance with a determination that early-confirmation criteria for the second input event have been met before the second default delay time period has elapsed without the third input event being recognized, perform the second operation before the second default delay time period has elapsed. Further, the processing unit is configured to, in accordance with a determination that the second default delay time period has elapsed without the early-confirmation criteria for the second input event being met and without the third input event being recognized, perform the second operation once the second default delay time period has elapsed.

In some embodiments, the first operation comprises ceasing to display a user interface for an application, and the second operation comprises a multitasking operation. In some other embodiments, the first operation comprises scrolling from one screen of icons in an application launching user interface, to another screen of icons in the application launch user interface, and the second operation comprises a multitasking operation.

In some embodiments, the processing unit is further configured to, after delaying performance of the first operation (e.g., using delay unit 1024), perform a third operation and forgo performance of the first operation and the second operation in accordance with a determination that the first input event meets long press input criteria before the second input event has been recognized.

In some embodiments, recognition of the first input event is based on detection of a change in a characteristic intensity of an input with reference to a first intensity threshold; and recognition of the second input event is based on detection of a change in a characteristic intensity of an input with reference to a second intensity threshold that is different from the first intensity threshold.

The operations in the information processing methods described above with reference to FIGS. 7A-7E are, optionally implemented by running one or more functional modules in information processing apparatus such as general purpose processors (e.g., as described above with respect to FIGS. 1A and 3) or application specific chips.

The operations described above with reference to FIGS. 7A-7E are, optionally, implemented by components depicted in FIGS. 1A-1B or FIG. 3. For example, detection operations 702, 706, etc., and recognize and determine operations 708, 714, 716, 718, etc. are, optionally, implemented by contact/motion module 130, and feedback operations that provide tactile outputs are implemented by haptic feedback module 133, while some other operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8C are flow diagrams illustrating a method 800 of monitoring an input on an intensity sensitive input element, detecting a long press on an accelerated basis, and if a long press is detected, performing a corresponding operation. Method 800 is performed at an electronic device (e.g., device 300, FIG. 3, or portable multifunction device 100, FIG. 1A) with a display, a touch-sensitive surface, and one or more sensors 165 to detect intensity of contacts with the touch-sensitive surface. In some embodiments, the electronic device at which method 800 is performed includes, in addition to the touch-sensitive surface, a home button 204 that includes one of sensors 165. In some embodiments, home button 204 is separate from the display and, optionally, includes a set of one or more intensity sensors that are separate from intensity sensors used to detect the intensity of inputs on the display. In some embodiments, home button 204 is a virtual home button that is displayed on the display (e.g., with a set of one or more intensity sensors that are separate from intensity sensors used to detect the intensity of inputs on the display or, optionally, using intensity sensors integrated into the display to determine an intensity of an input with the virtual home button). In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides a way to accurately determine user intent, with respect to whether a touch input is a long press, on an accelerated basis, by taking into account the intensity of the user's input. Method 800 reduces latency, by recognizing long press inputs faster than would otherwise be possible, while avoiding "false positives," such as inputs incorrectly detected as a long press, thereby creating a more efficient human-machine interface. For battery-operated electronic devices, taking into account the intensity of a user's touch input enables a user to enter gestures, such as a long press, faster and more efficiently, which conserves power and increases the time between battery charges.

The device detects (802) an input sequence that includes an increase in intensity of an input that corresponds to a first input event (e.g., a down-click event). In some embodiments, the input on the input element is or includes (804) an input on a touch-sensitive surface. In some embodiments, or in some circumstances, the increase in intensity of the input is followed by a decrease in intensity of the input, for example as shown in FIG. 5BB. Method 800 includes, in response to detecting the input sequence (806), in accordance with a determination that a second input event (e.g., an up-click event), including a decrease in intensity of the input after the first input event, is detected within a first time period after the first input event is detected, performing (808) a first operation (e.g., a single click operation). For example, FIG. 5X shown an input having an increase in intensity 532 followed by a decrease in intensity 534. If a second input event corresponding to the decrease occurs within the first time period after the first input event is detected, then a long press has not been detected and the first operation, such as a single click operation, is performed.

Method 800 further includes, in accordance with a determination that the second input event (e.g., an event that corresponds to a reversal of the first input event such as an up-click event) is not detected within a second time period that is longer than the first time period and that the input had a characteristic intensity above a respective intensity threshold between when the first input event was detected and when the second time period elapsed (e.g., as shown in FIG. 5BB, the characteristic intensity of the input was above the respective intensity threshold (e.g., $I_D$) between when the first input event was detected and when the second time period elapsed), performing (809) a second operation (e.g., a long press operation) once the second time period has elapsed (e.g., in response to the second time period elapsing (e.g., sooner/faster than the normal long press operation), wherein the second time period is determined based at least in part on an intensity of the input after the first input event is detected.

Method 800 further includes, in accordance with a determination that the second input event is not detected within a third time period (e.g., the default time period discussed above with reference to FIG. 5II) that is longer than the second time period and that the input did not have a characteristic intensity above the respective intensity threshold between when the first input event was detected and when the second time period elapsed, performing (810) the second operation (e.g., the long press operation) once the third time period has elapsed (e.g., in response to the third time period elapsing, corresponding to time $T_5$ in FIG. 5II; see above discussion of FIGS. 5A, 5B and 5II).

Optionally, method 800 includes, in accordance with a determination that the second input event is not detected within the second time period and that the input did not have a characteristic intensity above the respective intensity threshold between when the first input event was detected and when the second time period elapsed (e.g., as shown in FIG. 5II), forgoing (512) performance of the second operation (e.g., the long press operation) once the second time period has elapsed until at least the third time period (e.g., called the default time period in the above discussion of FIG. 5II) has elapsed. Thus, in this circumstance, because the intensity of the input is not above the respective intensity threshold, the long press operation is not accelerated.

In some embodiments, method 800 includes recognizing (814) the first input event in accordance with an increase in intensity of the input that satisfies a first intensity threshold and recognizing the second input event in accordance with an decrease in intensity of the input that satisfies a second intensity threshold that is distinct from the first intensity threshold. For example, FIG. 5X shown an input having an increase in intensity 532 that satisfies a down-click intensity threshold $I_D$, followed by a decrease in intensity 534 that satisfies an up-click intensity threshold $I_U$ that is distinct from the down-click intensity threshold $I_D$. In some embodiments, the respective intensity threshold is greater (816) than the first intensity threshold (e.g., referring to FIGS. 5Z and 5AA, the respective intensity threshold is an intensity threshold such as $I_{D+}$, which is greater than the down-click intensity threshold $I_D$), and the second intensity threshold (e.g., up-click intensity threshold $I_U$) is less than the first intensity threshold (e.g., down-click intensity threshold $I_D$).

In some embodiments, method 800 includes monitoring (818) a duration of a timeout period starting when the increase in intensity of the input satisfies the first intensity threshold, and comparing the duration of the timeout period with at least one of the first time period, second time period and third time period. See examples described above with respect to FIGS. 5BB, 5DD and 5FF.

In some embodiments, method 800 includes stopping (820) the monitoring of the duration of the timeout period when the decrease in intensity of the input satisfies the second intensity threshold. For example, referring to FIG. 5X, if the intensity of the input falls below the up-click intensity threshold $I_U$, the monitoring of the duration of the timeout period is stopped.

In some embodiments, method 800 includes accelerating (822) a rate at which the timeout period accumulates when intensity of the input exceeds a first predefined intensity threshold (e.g., the respective intensity threshold), wherein the accelerated rate is higher than a default rate. As described above with reference to FIGS. 5BB, 5DD and 5FF, when the intensity of the input exceeds the first predefined intensity threshold, which in those examples is the down-click intensity threshold $I_D$, the rate of which the timeout period accumulates is an accelerated rate. In some embodiments, method 800 further includes decelerating (824) a rate at which the timeout period accumulates when intensity of the input decreases.

In some embodiments, the third time period is (826) a maximum duration of the timeout period before performing the second operation (e.g., a default timeout period, such as 500 ms). In some embodiments, monitoring the duration of the timeout period continues until either a determination that the second input event is detected, or duration of the timeout period is equal to the third time period, whichever occurs first, and the second time period comprises a minimum duration of the timeout period before performing the second operation.

In some embodiments, the second time period is constrained (828) to a least a minimum duration (e.g., in some embodiments, the time to detect a long press input does not decrease below 300 ms, no matter how high the intensity of the input reaches). In some embodiments, the minimum duration (e.g., 300 ms) is more than half of the maximum duration (e.g., 500 ms).

In some embodiments, monitoring the duration of the timeout period includes decaying (830) a time value, starting at an initial time value, at a rate that changes in accordance with the intensity of the input. For examples, see FIGS. 5BB, 5DD, 5FF and 5HH, and the discussion, above, of those figures.

In some embodiments, the first operation is or includes closing (832) an application, and the second operation comprises displaying a virtual assistant user interface.

In some embodiments, the first operation is or includes (834) scrolling from one screen of icons in an application launching user interface (e.g., an application launching user interface including a first set of application launch icons), to another screen of icons in the application launch user interface (e.g., including a second set of application launch icons that include application launch icons not in the first set of application launch icons), as shown in the transition from FIG. 5Q to 5R, and the second operation is or includes displaying a virtual assistant user interface (e.g., as shown in FIGS. 5BB, 5DD, 5FF and 5HH).

Figure 11:
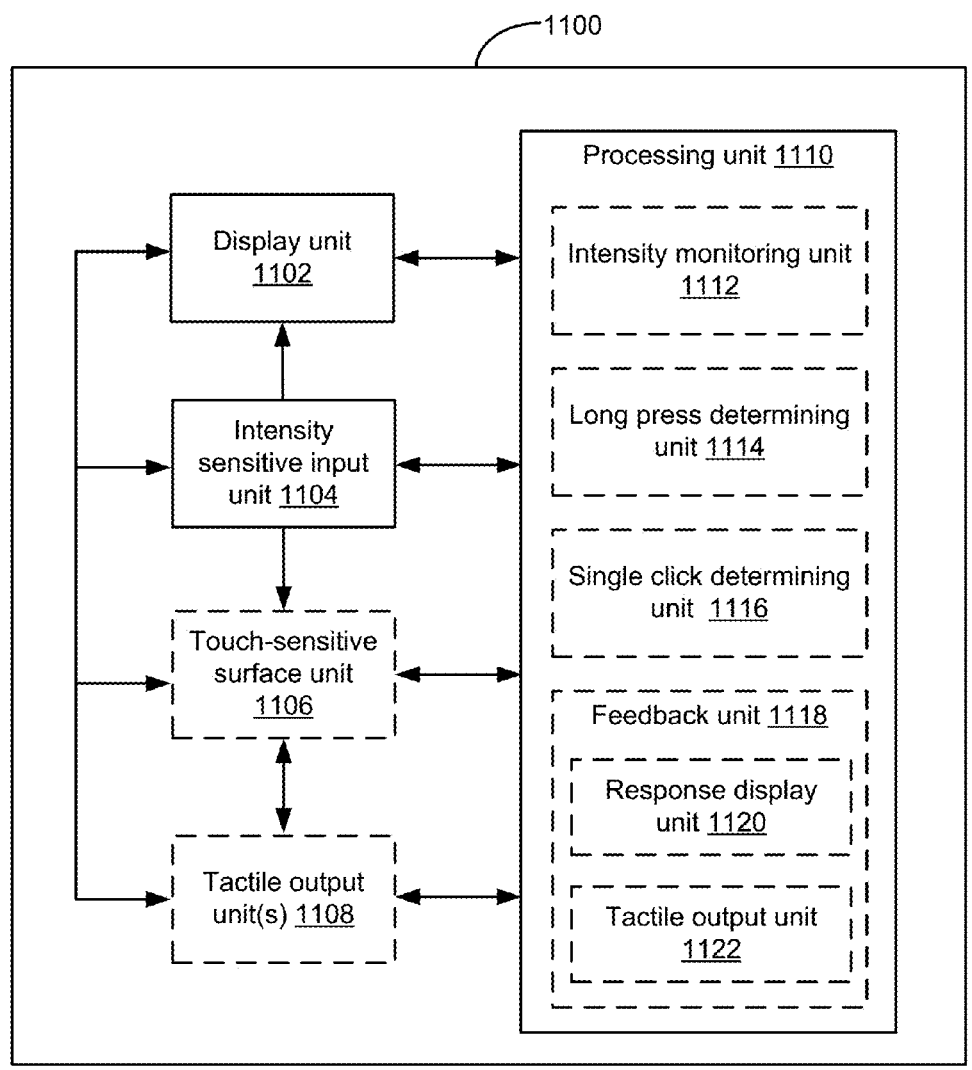

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1002 (e.g., corresponding to display 112) configured to display a user interface, an intensity sensitive input unit 1104 (e.g., corresponding to home button 204) configured to detect intensity of user inputs with the input element, and a processing unit 1110 coupled with the display unit 1102 and the intensity sensitive input unit 1104. In some embodiments, electronic device 1000 also includes touch-sensitive surface unit 1106 for receiving touch inputs on a surface, such as a display surface of display unit 1102, and one or more tactile output units 1108 for generating tactile outputs, also coupled to processing unit 1010. In some embodiments, processing unit 1110 includes one or more of the following sub-units: intensity monitoring unit 1112, long press determining unit 1114, single-click determining unit 1116, and feedback unit 1118. In some embodiments, feedback unit 1118 includes response display unit 1120 and tactile output unit 1122.

Processing unit 1110 is configured to: detect (e.g., using intensity monitoring unit 912) an input sequence that includes detecting an increase in intensity of an input that corresponds to a first input event; and, in response to detecting the input sequence: in accordance with a determination (e.g., using single click determining unit 1116) that a second input event, including a decrease in intensity of the input after the first input event, is detected within a first time period after the first input event is detected, perform a first operation; in accordance with a determination (e.g., using single click determining unit 1116) that the second input event is not detected within a second time period that is longer than the first time period and (e.g., using long press determining unit 1114) that the input had a characteristic intensity above a respective intensity threshold between when the first input event was detected and when the second time period elapsed, perform a second operation once the second time period has elapsed, wherein the second time period is determined based at least in part on an intensity of the input after the first input event is detected; and in accordance with a determination that the second input event is not detected (e.g., using single click determining unit 1116) within a third time period that is longer than the second time period and (e.g., using long press determining unit 1114) that the input did not have a characteristic intensity above the respective intensity threshold between when the first input event was detected and when the second time period elapsed, perform the second operation once the third time period has elapsed.

In some embodiments, processing unit 1110 is further configured to, in accordance with a determination (e.g., using single click determining unit 1116) that the second input event is not detected within the second time period and (e.g., using single click determining unit 1116) that the input did not have a characteristic intensity above the respective intensity threshold between when the first input event was detected and when the second time period elapsed, forgo performance of the second operation once the second time period has elapsed until at least the third time period has elapsed.

In some embodiments, the input on the intensity sensitive input unit comprises an input on a touch-sensitive surface.

In some embodiments, processing unit 1110 is further configured to recognize the first input event in accordance with an increase in intensity of the input that satisfies a first intensity threshold and recognize (e.g., using single click determining unit 1116) the second input event in accordance with an decrease in intensity of the input that satisfies a second intensity threshold that is distinct from the first intensity threshold.

In some embodiments, the respective intensity threshold is greater than the first intensity threshold, and the second intensity threshold is less than the first intensity threshold. See discussion of FIG. 5X with respect to down-click intensity threshold $I_D$ (corresponding to the first intensity threshold) and up-click intensity threshold $I_U$ (corresponding to the first intensity threshold).

In some embodiments, processing unit 1110 is further configured to monitor (e.g., using intensity monitoring unit 1112 and/or long press determining unit 1114) a duration of a timeout period starting when the increase in intensity of the input satisfies the first intensity threshold, and comparing the duration of the timeout period with at least one of the first time period, second time period and third time period. In some embodiments, processing unit 1110 is further configured to stop the monitoring of the duration of the timeout period when the decrease in intensity of the input satisfies the second intensity threshold. In some embodiments, processing unit 1110 is further configured to accelerate a rate at which the timeout period accumulates when intensity of the input exceeds a first predefined intensity threshold, wherein the accelerated rate is higher than a default rate. In some embodiments, processing unit 1110 is further configured to decelerate a rate at which the timeout period accumulates when intensity of the input decreases.

In some embodiments, the third time period comprises a maximum duration of the timeout period before performing the second operation. In some embodiments, the second time period is constrained to a least a minimum duration.

In some embodiments, monitoring the duration of the timeout period comprises decaying a time value, starting at an initial time value, at a rate that changes in accordance with the intensity of the input.

In some embodiments, the first operation is or includes closing an application, and the second operation comprises displaying a virtual assistant user interface. In some other embodiments, the first operation is or includes scrolling from one screen of icons in an application launching user interface (e.g., an application launching user interface including a first set of application launch icons, an example of which is shown in FIG. 5Q), to another screen of icons in the application launch user interface (e.g., an application launching user interface including a second set of application launch icons that include application launch icons not in the first set of application launch icons, an example of which is shown in FIG. 5R), and the second operation comprises displaying a virtual assistant user interface (e.g., an example of which is shown in FIGS. 5BB, 5DD, and 5FF).

The operations in the information processing methods described above with reference to FIGS. 8A-8C are, optionally implemented by running one or more functional modules in information processing apparatus such as general purpose processors (e.g., as described above with respect to FIGS. 1A and 3) or application specific chips.

The operations described above with reference to FIGS. 8A-8C are, optionally, implemented by components depicted in FIGS. 1A-1B or FIG. 3. For example, detection operations 802, 808, etc., and recognize and determine operations 808, 810, 812, etc. are, optionally, implemented by contact/motion module 130, and feedback operations that provide tactile outputs are implemented by haptic feedback module 133, while some other operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display and an intensity sensitive input element for detecting intensity of user inputs with the input element:
        detecting a change in intensity of an input on the input element that includes an increase in intensity of the input on the input element followed by a decrease in intensity of the input on the input element;
        recognizing at least a portion of the change in intensity of the input as a first input event that is associated with a first operation;
        after recognizing the first input event, delaying performance of the first operation while monitoring subsequent changes in intensity of the input for a second input event, wherein the delay is limited by a default delay time period; and
        after delaying performance of the first operation:
            in accordance with a determination that the second input event has been recognized before the default delay time period has elapsed, performing a second operation and forgoing performance of the first operation;
            in accordance with a determination that early-confirmation criteria for the first input event have been met before the default delay time period has elapsed without the second input event being recognized, performing the first operation before the default delay time period has elapsed, wherein the early-confirmation criteria for the first input event comprise criteria that the intensity of the input remains below a confirmation intensity threshold for more than an early confirmation time threshold; and
            in accordance with a determination that the default delay time period has elapsed without the early-confirmation criteria for the first input event being met and without the second input event being recognized, performing the first operation once the default delay time period has elapsed.

2. The method of claim 1, further comprising:
    after delaying performance of the first operation:
        in accordance with a determination that a second input event has been recognized after the default delay time period has elapsed, performing a third operation.

3. The method of claim 1, wherein detecting a change in intensity of the input on the input element includes continuously detecting the input on the input element.

4. The method of claim 1, including detecting a sequence of distinct inputs on the input element, separated by periods during which no input is detected on the input element, and repeating the recognizing and delaying with respect to a plurality of the inputs in the sequence of distinct inputs.

5. The method of claim 1, wherein the early confirmation time threshold is less than half the default delay time period.

6. The method of claim 1, wherein the confirmation intensity threshold is below an up-click intensity threshold used for recognizing the second input event.

7. The method of claim 6, wherein the up-click intensity threshold is determined in accordance with a characteristic intensity of the input during the detected increase in intensity of the input in which the input reached a peak intensity prior to detecting the decrease in intensity of the input on the input element.

8. The method of claim 1, including monitoring a duration of a fast timeout period starting when the intensity of the input decreases below the confirmation intensity threshold.

9. The method of claim 8, wherein the duration of the fast timeout period comprises a cumulative amount of time, after the fast timeout period starts, that the intensity of the input is below the confirmation intensity threshold.

10. The method of claim 1, including determining the confirmation intensity threshold in accordance with a peak characteristic intensity of the input detected during the detected increase in intensity of the input, prior to detecting the decrease in intensity of the input on the input element.

11. The method of claim 1, wherein the confirmation intensity threshold is independent of a peak characteristic intensity of the input detected during the detected increase in intensity of the input.

12. The method of claim 1, including:
monitoring a duration of the default timeout period starting when the intensity of the input increases to a down-click intensity threshold; and/or
monitoring a duration of the default timeout period starting when the intensity of the input decreases to an up-click intensity threshold.

13. The method of claim 1, including:
generating a first tactile output in conjunction with recognizing the first input event; or
generating a second tactile output in conjunction with recognizing the second input event; or
generating the first tactile output in conjunction with recognizing the first input event and generating the second tactile output in conjunction with recognizing the second input event.

14. The method of claim 1, further including:
after recognizing the second input event, delaying performance of the second operation while monitoring subsequent changes in intensity of the input for a third input event, wherein the delay is limited by a second default delay time period; and
after delaying performance of the second operation:
in accordance with a determination that the third input event has been recognized before the second default delay time period has elapsed, performing a third operation and forgoing performance of the second operation;
in accordance with a determination that early-confirmation criteria for the second input event have been met before the second default delay time period has elapsed without the third input event being recognized, performing the second operation before the second default delay time period has elapsed; and
in accordance with a determination that the second default delay time period has elapsed without the early-confirmation criteria for the second input event being met and without the third input event being recognized, performing the second operation once the second default delay time period has elapsed.

15. The method of claim 1, wherein:
the first operation comprises:
ceasing to display a user interface for an application, or
scrolling from one screen of icons in an application launching user interface, to another screen of icons in the application launch user interface, and
the second operation comprises a multitasking operation.

16. The method of claim 1, further comprising, after delaying performance of the first operation:
in accordance with a determination that the first input event meets long press input criteria before the second input event has been recognized, performing a third operation and forgoing performance of the first operation and the second operation.

17. The method of claim 1, wherein:
recognition of the first input event is based on detection of a change in a characteristic intensity of an input with reference to a first intensity threshold; and
recognition of the second input event is based on detection of a change in a characteristic intensity of an input with reference to a second intensity threshold that is different from the first intensity threshold.

18. An electronic device, comprising:
a display;
an intensity sensitive input element for detecting intensity of user inputs with the input element;
one or more processors;
memory; and
one or more programs, wherein the one or more programs are stored in the memory and configured to be executed by the one or more processors, the one or more programs including instructions for:
detecting a change in intensity of an input on the input element that includes an increase in intensity of the input on the input element followed by a decrease in intensity of the input on the input element;
recognizing at least a portion of the change in intensity of the input as a first input event that is associated with a first operation;
after recognizing the first input event, delaying performance of the first operation while monitoring subsequent changes in intensity of the input for a second input event, wherein the delay is limited by a default delay time period; and
after delaying performance of the first operation:
in accordance with a determination that the second input event has been recognized before the default delay time period has elapsed, performing a second operation and forgoing performance of the first operation;
in accordance with a determination that early-confirmation criteria for the first input event have been met before the default delay time period has elapsed without the second input event being recognized, performing the first operation before the default delay time period has elapsed, wherein the early-confirmation criteria for the first input event comprise criteria that the intensity of the input remains below a confirmation intensity threshold for more than an early confirmation time threshold; and
in accordance with a determination that the default delay time period has elapsed without the early-confirmation criteria for the first input event being met and without the second input event being recognized, performing the first operation once the default delay time period has elapsed.

19. A non-transitory computer readable storage medium storing one or more programs, the one or more programs comprising instructions, which when executed by an electronic device with a display, and an intensity sensitive input element for detecting intensity of user inputs with the input element, cause the electronic device to:
detect a change in intensity of an input on the input element that includes an increase in intensity of the input on the input element followed by a decrease in intensity of the input on the input element;
recognize at least a portion of the change in intensity of the input as a first input event that is associated with a first operation;
after recognizing the first input event, delay performance of the first operation while monitoring subsequent changes in intensity of the input for a second input event, wherein the delay is limited by a default delay time period; and
after delaying performance of the first operation:
in accordance with a determination that the second input event has been recognized before the default delay time period has elapsed, perform a second operation and forgo performance of the first operation;

in accordance with a determination that early-confirmation criteria for the first input event have been met before the default delay time period has elapsed without the second input event being recognized, perform the first operation before the default delay time period has elapsed, wherein the early-confirmation criteria for the first input event comprise criteria that the intensity of the input remains below a confirmation intensity threshold for more than an early confirmation time threshold; and in accordance with a determination that the default delay time period has elapsed without the early-confirmation criteria for the first input event being met and without the second input event being recognized, perform the first operation once the default delay time period has elapsed.

20. The electronic device of claim 18, wherein the one or more programs further include instructions for:

after delaying performance of the first operation:
in accordance with a determination that a second input event has been recognized after the default delay time period has elapsed, performing a third operation.

21. The electronic device of claim 18, wherein detecting a change in intensity of the input on the input element includes continuously detecting the input on the input element.

22. The electronic device of claim 18, wherein the one or more programs further include instructions for detecting a sequence of distinct inputs on the input element, separated by periods during which no input is detected on the input element, and repeating the recognizing and delaying with respect to a plurality of the inputs in the sequence of distinct inputs.

23. The electronic device of claim 18, wherein the early confirmation time threshold is less than half the default delay time period.

24. The electronic device of claim 18, wherein the confirmation intensity threshold is below an up-click intensity threshold used for recognizing the second input event.

25. The electronic device of claim 24, wherein the up-click intensity threshold is determined in accordance with a characteristic intensity of the input during the detected increase in intensity of the input in which the input reached a peak intensity prior to detecting the decrease in intensity of the input on the input element.

26. The electronic device of claim 18, wherein the one or more programs further include instructions for monitoring a duration of a fast timeout period starting when the intensity of the input decreases below the confirmation intensity threshold.

27. The electronic device of claim 26, wherein the duration of the fast timeout period comprises a cumulative amount of time, after the fast timeout period starts, that the intensity of the input is below the confirmation intensity threshold.

28. The electronic device of claim 18, wherein the one or more programs further include instructions for determining the confirmation intensity threshold in accordance with a peak characteristic intensity of the input detected during the detected increase in intensity of the input, prior to detecting the decrease in intensity of the input on the input element.

29. The electronic device of claim 18, wherein the confirmation intensity threshold is independent of a peak characteristic intensity of the input detected during the detected increase in intensity of the input.

30. The electronic device of claim 18, wherein the one or more programs further include instructions for:

monitoring a duration of the default timeout period starting when the intensity of the input increases to a down-click intensity threshold; and/or monitoring a duration of the default timeout period starting when the intensity of the input decreases to an up-click intensity threshold.

31. The electronic device of claim 18, wherein the one or more programs further include instructions for:

generating a first tactile output in conjunction with recognizing the first input event; or generating a second tactile output in conjunction with recognizing the second input event; or generating the first tactile output in conjunction with recognizing the first input event and generating the second tactile output in conjunction with recognizing the second input event.

32. The electronic device of claim 18, wherein the one or more programs further include instructions for:

after recognizing the second input event, delaying performance of the second operation while monitoring subsequent changes in intensity of the input for a third input event, wherein the delay is limited by a second default delay time period; and after delaying performance of the second operation:
in accordance with a determination that the third input event has been recognized before the second default delay time period has elapsed, performing a third operation and forgoing performance of the second operation;

in accordance with a determination that early-confirmation criteria for the second input event have been met before the second default delay time period has elapsed without the third input event being recognized, performing the second operation before the second default delay time period has elapsed; and in accordance with a determination that the second default delay time period has elapsed without the early-confirmation criteria for the second input event being met and without the third input event being recognized, performing the second operation once the second default delay time period has elapsed.

33. The electronic device of claim 18, wherein:
the first operation comprises:
ceasing to display a user interface for an application, or
scrolling from one screen of icons in an application launching user interface, to another screen of icons in the application launch user interface, and
the second operation comprises a multitasking operation.

34. The electronic device of claim 18, wherein the one or more programs further include instructions for, after delaying performance of the first operation:

in accordance with a determination that the first input event meets long press input criteria before the second input event has been recognized, performing a third operation and forgoing performance of the first operation and the second operation.

35. The electronic device of claim 18, wherein:
recognition of the first input event is based on detection of a change in a characteristic intensity of an input with reference to a first intensity threshold; and recognition of the second input event is based on detection of a change in a characteristic intensity of an input with reference to a second intensity threshold that is different from the first intensity threshold.

36. The non-transitory computer readable storage medium of claim 19, wherein the one or more programs further include instructions which, when executed by the electronic device, cause the electronic device to:
after delaying performance of the first operation:
in accordance with a determination that a second input event has been recognized after the default delay time period has elapsed, perform a third operation.

37. The non-transitory computer readable storage medium of claim 19, wherein detecting a change in intensity of the input on the input element includes continuously detecting the input on the input element.

38. The non-transitory computer readable storage medium of claim 19, wherein the one or more programs further include instructions which, when executed by the electronic device, cause the electronic device to detect a sequence of distinct inputs on the input element, separated by periods during which no input is detected on the input element, and repeat the recognizing and delaying with respect to a plurality of the inputs in the sequence of distinct inputs.

39. The non-transitory computer readable storage medium of claim 19, wherein the early confirmation time threshold is less than half the default delay time period.

40. The non-transitory computer readable storage medium of claim 19, wherein the confirmation intensity threshold is below an up-click intensity threshold used for recognizing the second input event.

41. The non-transitory computer readable storage medium of claim 40, wherein the up-click intensity threshold is determined in accordance with a characteristic intensity of the input during the detected increase in intensity of the input in which the input reached a peak intensity prior to detecting the decrease in intensity of the input on the input element.

42. The non-transitory computer readable storage medium of claim 19, wherein the one or more programs further include instructions which, when executed by the electronic device, cause the electronic device to monitor a duration of a fast timeout period starting when the intensity of the input decreases below the confirmation intensity threshold.

43. The non-transitory computer readable storage medium of claim 42, wherein the duration of the fast timeout period comprises a cumulative amount of time, after the fast timeout period starts, that the intensity of the input is below the confirmation intensity threshold.

44. The non-transitory computer readable storage medium of claim 19, wherein the one or more programs further include instructions which, when executed by the electronic device, cause the electronic device to determine the confirmation intensity threshold in accordance with a peak characteristic intensity of the input detected during the detected increase in intensity of the input, prior to detecting the decrease in intensity of the input on the input element.

45. The non-transitory computer readable storage medium of claim 19, wherein the confirmation intensity threshold is independent of a peak characteristic intensity of the input detected during the detected increase in intensity of the input.

46. The non-transitory computer readable storage medium of claim 19, wherein the one or more programs further include instructions which, when executed by the electronic device, cause the electronic device to:
monitor a duration of the default timeout period starting when the intensity of the input increases to a down-click intensity threshold; and/or
monitor a duration of the default timeout period starting when the intensity of the input decreases to an up-click intensity threshold.

47. The non-transitory computer readable storage medium of claim 19, wherein the one or more programs further include instructions which, when executed by the electronic device, cause the electronic device to:
generate a first tactile output in conjunction with recognizing the first input event; or
generate a second tactile output in conjunction with recognizing the second input event; or
generate the first tactile output in conjunction with recognizing the first input event and generate the second tactile output in conjunction with recognizing the second input event.

48. The non-transitory computer readable storage medium of claim 19, wherein the one or more programs further include instructions which, when executed by the electronic device, cause the electronic device to:
after recognizing the second input event, delay performance of the second operation while monitoring subsequent changes in intensity of the input for a third input event, wherein the delay is limited by a second default delay time period; and
after delaying performance of the second operation:
in accordance with a determination that the third input event has been recognized before the second default delay time period has elapsed, perform a third operation and forgo performance of the second operation;
in accordance with a determination that early-confirmation criteria for the second input event have been met before the second default delay time period has elapsed without the third input event being recognized, perform the second operation before the second default delay time period has elapsed; and
in accordance with a determination that the second default delay time period has elapsed without the early-confirmation criteria for the second input event being met and without the third input event being recognized, perform the second operation once the second default delay time period has elapsed.

49. The non-transitory computer readable storage medium of claim 19, wherein:
the first operation comprises:
ceasing to display a user interface for an application, or
scrolling from one screen of icons in an application launching user interface, to another screen of icons in the application launch user interface, and
the second operation comprises a multitasking operation.

50. The non-transitory computer readable storage medium of claim 19, wherein the one or more programs further include instructions which, when executed by the electronic device, cause the electronic device to, after delaying performance of the first operation:
in accordance with a determination that the first input event meets long press input criteria before the second input event has been recognized, perform a third operation and forgo performance of the first operation and the second operation.

51. The non-transitory computer readable storage medium of claim 19, wherein:
  recognition of the first input event is based on detection of a change in a characteristic intensity of an input with reference to a first intensity threshold; and
  recognition of the second input event is based on detection of a change in a characteristic intensity of an input with reference to a second intensity threshold that is different from the first intensity threshold.

* * * * *